United States Patent

Funke et al.

[11] Patent Number: 5,918,171
[45] Date of Patent: *Jun. 29, 1999

[54] SUBSCRIBER RF TELEPHONE SYSTEM HAVING DISTRIBUTED CHANNEL SWITCHING CAPABILITY

[75] Inventors: Klaus E. Funke; Helena W. Roth, both of Marin County; Kevin A. Jaeger, Sonoma County; William S. Tighe, Sonoma County; James L. Horn, Sonoma County, all of Calif.; Lie Gendo, Jakarta Barat; Hardianto Karmarga, Jakarta Selatan, both of Indonesia; Walter E. Noller, Sonoma County, Calif.

[73] Assignee: Nusantara Communications Inc., Petaluma, Calif.

[*] Notice: This patent is subject to a terminal disclaimer.

[21] Appl. No.: 08/765,985
[22] PCT Filed: Jun. 30, 1995
[86] PCT No.: PCT/US95/07868
  § 371 Date: Dec. 10, 1997
  § 102(e) Date: Dec. 10, 1997
[87] PCT Pub. No.: WO96/01543
  PCT Pub. Date: Jan. 18, 1996
[51] Int. Cl.$^6$ ........................................... H04Q 7/00
[52] U.S. Cl. ............................................... 455/403
[58] Field of Search ................... 455/403; 375/39; 370/50

[56] References Cited

U.S. PATENT DOCUMENTS 3,562,431  2/1971  Inose et al. .
4,675,863  6/1987  Paneth et al. .
5,050,189  9/1991  Cox et al. ................................. 375/39

*Primary Examiner*—William Cumming
*Attorney, Agent, or Firm*—Cooley Godward LLP

[57] ABSTRACT

A radio communication system for processing information signals received from telephone trunk lines for transmission over a plurality of RF subscriber channels. The system includes a network interface exchange for sampling the received information signals and for sequentially combining the resulting sampled information signals into a multiplexed transmit channel bit stream, each of the sampled information signals occupying a repetitive slot position in the multiplexed transmit channel bit steam. The network interface exchange further includes a processor for assigning a first of the sampled information signals from one of the trunk lines to the repetitive slot position corresponding to a first of the RF subscriber channels associated with a call request signal received over the one trunk line. A transmitter is provided for transmitting a forward interface signal over a network interface channel in response to the multiplexed channel bit stream. The system further includes a remove telephone exchange, in RF communication with the network interface exchange over the network interface channel, for extracting the first sampled information signal from the forward interface signal. The remote telephone exchange also generates a first subscriber signal on the basis of the extracted first sampled information signal, and transmits the first subscriber signal over the first RF subscriber channel to a first intelligent subscriber unit.

10 Claims, 34 Drawing Sheets

SUBSCRIBER RF TELEPHONE SYSTEM HAVING DISTRIBUTED CHANNEL SWITCHING CAPABILITY

The present invention relates generally to trounced radio telephone systems and more particularly, to a subscriber telephone system for providing multiple information signals simultaneously over at least one radio frequency (RF) channel.

BACKGROUND OF THE INVENTION

Many developing countries have begun to investigate the possibility of providing telephone service to a larger percentage of their respective citizenry. In many developing countries the number of telephones per person (telephone density) in rural regions is typically only one-fifth to one tenth of the telephone densities characteristic of urban areas. For example, telephone densities in China's urban centers typically exceed 30 telephones per 1,000 population, while telephone density in China's rural areas is roughly 4 telephones per 1,000 population.

In order to improve service to rural areas many developing countries have attempted to identify telephone systems enabling cost-effective switching, transmission, and distribution suitable for the low capacity requirements of rural installation. At the same time, however, it is desired that the system be expandable to accommodate higher traffic, a larger subscriber base, and allow for advanced billing and data communication functions to be supported as rural areas develop.

Radio equipment has been used, particularly in rural areas, for providing telephone service to a distributed set of users. The highly variable distribution requirements of the rural networks in developing countries has spurred efforts to develop cost effective radio telephone systems. Radio transmission offers several advantages relative to communication facilitated by satellite or cable networks. For example, it may be impractical to bury cable in regions having uncultivatable (e.g., rocky or hardpan) soil, and aerial cable has proven to be relatively costly to install and maintain. In contrast, the cost of microwave radio links is relatively insensitive to distance due to the extended coverage capability afforded by repeater stations.

Satellite telephone systems are often used to service remote rural areas, or to provide service over wide geographic regions of diffuse subscriber concentration. However, a minimum number of subscribers is required to justify the significant investment required by the provision of satellite base stations and related facilities. Low capacity radio links can be a less expensive alternative to satellite systems when providing service to remote areas (e.g., islands) with relatively low levels of telephone traffic. Moreover, radio links can meet the transmission demands of low density demand pockets, particularly those located off of larger demand routes.

In trunked radio communication systems a number of radio users (subscribers) share a group of communication channels, where typically each user will require a channel for only a small percentage of the time. A base station serves as an exchange between the subscribers and a set of dedicated lines, i.e., trunks, from the public network. Subscribers may use mobile or portable two way and fixed base communication modules, with radio repeaters generally being used to provide the communication channels over an extended range. Conventional repeaters do not perform any call switching functions, but rather merely relay information signals linearly between subscribers and the base station. It follows that when one subscriber desires to communicate with another located nearby, the call must nonetheless be transmitted to the base station and rebroadcast to the intended recipient subscriber. Accordingly, a radio telephone system operative to provide localized call routing among proximately located subscribers would allow a base station of a given traffic capacity to service a larger number of subscribers.

Each repeater unit within trunked systems typically receives communication signals from subscriber units on a first path, and rebroadcasts the signals at higher power on a second path to other subscriber units. Trunking systems generally use different assigned frequencies for these simultaneous paths. Each pair of frequencies assigned to a repeater unit constitutes one of the several communication channels of the trunked system. Channels carrying voice and other message communications are known as information channels, those carrying signal and control information are known as control channels.

In trunked systems it is often necessary that a user desiring to communicate first request permission to access the group of channels and then wait for permission and for an assignment to a particular channel. In transmission-trunking systems a user retains his channel assignment for only a single transmission, while in message-trunking systems the channel is retained until an entire message comprising multiple transmissions is completed. Because trunked systems involve sharing resources, subscribers must often wait for availability of information channels. The trunk controller responds to a request for channel with a busy signal and notifies the subscriber when a channel later becomes available. Upon notification of channel availability the subscriber may be allowed only a brief response interval to claim the assigned channel. This procedure is not only inconvenient, but also leads to subscriber access delays and to the consumption of communications resources during the response interval.

Access to the public telephone network from a trunked system requires a call origination procedure. One procedure often used is for a radio subscriber to place a request for a channel capable of providing interconnection to the public network. When such a channel becomes available, the controller grants permission to use it and generates a dial tone. The radio subscriber originates the call by transmitting tone or data signaling information, which couples to the public network. The radio subscriber hears busy tones or ringing tones and eventually becomes connected with the requested party or terminates his call attempt.

In conventional trunked systems the inbound and outbound frequencies associated with a given channel are typically assigned simultaneously and maintained for the duration of a conversation. This is so even though the radio subscriber typically cannot make use of them simultaneously. That is, while transmitting the radio subscriber does not hear, and cannot be interrupted, by a party from the public network. Such unnecessary assignment of paired frequencies removes resources from the collection of frequencies available to interconnect calls.

Many existing trunked radio telephone systems are designed to be in conformance with standards derived from recommendations made by the International Telecommunications Union (ITU). One objective of the ITU is to promote adherence to a universal set of equipment interface conventions. Widespread compliance with the body of recommendations promulgated by the ITU enables interoperability between radio and telephone equipment, particularly when crossing of international boundaries is involved. Under the ITU recommendations standard interfaces are to be provided for each manufactured equipment component. Hence, radio telephone systems are generally composed of a collection of "stand-alone" components, each disposed to communicate using a prescribed public domain protocol. Unfortunately, the need for standard interfaces to facilitate compatibility between stand-alone components tends to increase the cost of the radio telephone networks in which such components are incorporated.

OBJECTS OF THE INVENTION

Accordingly, it is an object of the present invention to provide a radio telephone system employing a channel allocation procedure which obviates the need for subscribers to wait for a particular channel assignment prior to generation of a dial tone.

It is a further object of the present invention that such a radio telephone system efficiently assign the available frequency band to requesting subscribers.

It is yet another object of the present invention to provide a radio telephone system which is compatible with accepted public domain protocol, but in which the constituent network components are not each required to be supplied with a standard interface capable of supporting such a protocol.

A still further object of the present invention is to provide a radio telephone system operative to provide localized call routing among proximately located subscribers.

SUMMARY OF THE INVENTION

In summary, the present invention comprises a radio communication system for processing information signals received from telephone trunk lines for transmission over a plurality of RF subscriber channels. The system includes a network interface exchange for sampling the received information signals and for sequentially combining the resultant plurality of sampled information signals into a multiplexed transmit channel bit stream, each of the sampled information signals occupying a repetitive slot position in the multiplexed transmit channel bit stream. The network interface exchange further includes a processor for assigning a first of the sampled information signals from one of the trunk lines to the repetitive slot position corresponding to a first of the RF subscriber channels associated with a call request signal received over the one trunk line.

A transmitter is provided for transmitting a forward interface signal over a network interface channel in response to the multiplexed channel bit stream. The system further includes a remote telephone exchange, in RF communication with the network interface exchange over the network interface channel, for extracting the first sampled information signal from the forward interface signal. The remote telephone exchange also generates a first subscriber signal on the basis of the extracted first sampled information signal, and transmits the first subscriber signal over the first RF subscriber channel to a first intelligent subscriber unit.

In a preferred embodiment the call request signal has accompanied therewith a subscriber identification signal associated with the first intelligent subscriber unit. The network interface exchange processor assigns the first sampled information signal to the repetitive slot position corresponding to the first RF subscriber channel at least partially on the basis of the subscriber identification signal.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

I. System Overview

Figure 1:
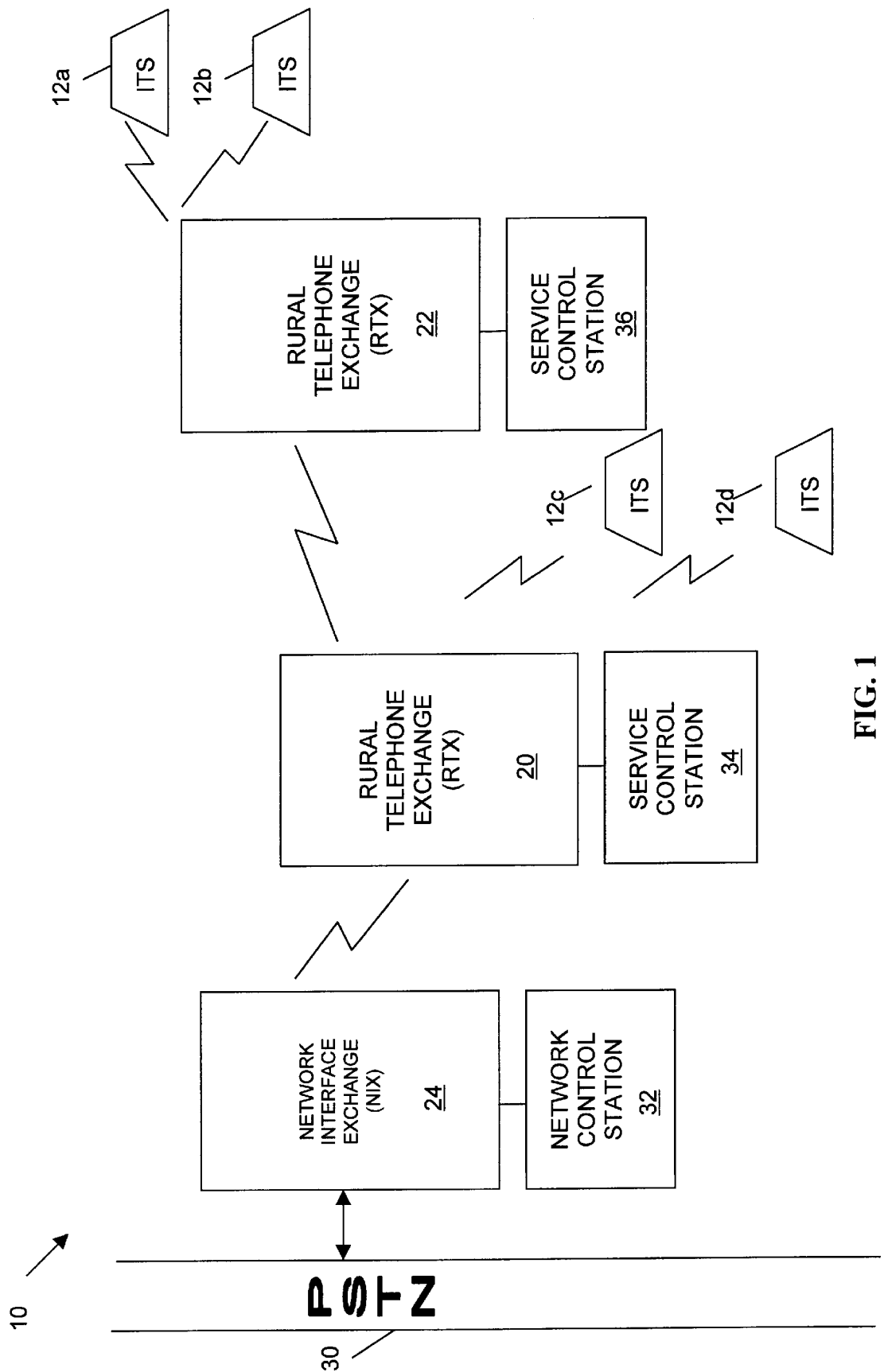
FIG. 1 is a block diagram of the system of the present invention in which telephone service is provided among subscribers associated with a plurality of intelligent telephone sets, as well as between such subscribers and users of a conventional public switched telephone network (PSTN).

Referring to FIG. 1, the system of the present invention provides telephone service among subscribers associated with a plurality of intelligent telephone sets 12, as well as between such subscribers and users of a conventional public switched telephone network (PSTN). The system includes at least a first "remote", or equivalently, "rural" telephone exchange (RTX) unit, and in a preferred embodiment includes one or more additional "remote" or "rural" telephone exchange units represented in FIG. 1 by a second telephone exchange 22. The RTX units 20 and 22 provide call connections between the intelligent telephone set (ITS) units 12, and further serve to link each ITS unit 12 with a network interface exchange (NIX) unit 24. The NIX unit 24 is connected to an external PSTN trunk line 30 in order to facilitate call connection to or from users outside of the system 10.

In an exemplary embodiment the radios of system 10 operate on common carrier frequency channels within, for example, the 1427 to 1525 MHz band specified for use in various international jurisdictions. Channels are transmitted over:

(i) the air interface between the NIX 24 and the RTX unit 20, (ii) over the air interfaces between RTX units, and (iii) between RTX units and each ITS 12.

The 1427 to 1525 MHz may be separated into a set of 24 frequency division multiplexed (FDM) channel, each of which will typically be spaced apart by 4 MHz and operate at a nominal data rate of 4 Mbps. Each FDM channel is used for both transmission and reception, and hence is used for communication in both directions in a time division duplexed mode. In each of the transmission directions between the NIX unit 24 and the RTX unit 20, the transmission is in the form of time division multiplexed (TDM) communication. Transmission between the RTX units 20 and 22 is also effected in a TDM format. In addition, the transmission from an ITS unit 12 to either the RTX unit 20 or to the RTX unit 22 is time division multiple access (TDMA) in one direction (incoming) and TDM (outgoing) to an ITS.

Communication over each air interface, i.e., the NIX/RTX and the RTX/ITS air interfaces, is accomplished digitally by modified offset quadrature phase shift keying (MOQPSK) modulation. That is, a "1" results in a shift in carrier phase of +/−90°, while a "0" results in no phase change. As is described in further detail below, inter-network communication between the PSTN trunk line 30 and the system 10 will preferably be accomplished using R2-SMFC signaling [Semicompelled Multifrequency Coded]. See, for example, CCITT Recommendation Q.400.

The system 10 is non-hierarchical in that each RTX unit is equipped with a database enabling a particular call to be transmitted to an ITS unit within the surrounding service area, or to be routed to an RTX unit at another network node. In addition, the system 10 is distance independent since the routing of calls through 10 each network node is transparent to system users.

As shown in FIG. 1, a network control station (NCS) 32 is connected to the NIX unit 24. In an exemplary embodiment the NCS 32 is implemented using a microcomputer having a 486SX-type processor, a minimum of 8 Mb RAM memory, VGA graphics capability, approximately 200 Mb of permanent memory and an optional connection to a modem. The NCS 32 allows an operator access to, and control over, the system 10. In brief, the NCS 32 presents a graphical user interface through which:

(i) the current network configuration of the system 10 may be displayed, (ii) the current network configuration may be modified, (iii) information relating to the hardware configuration of each RTX unit may be displayed, (iv) statistical and call record information is gathered from the system 10, (v) telephone identification numbers from an equipment identification database which identify each ITS unit with a given RTX may be supplied to the system 10, and (vi) telephone numbers associating a particular user with a given ITS unit are supplied to the system 10 from a subscriber database.

For telephone numbers identifying destinations within local calling areas, the phone number will be examined to determine to which RTX node the number is assigned. A set of three phone lists are preferably maintained, and are referenced in a particular order, in order to identify the RTX node associated with the dialed phone number. The first list termed the "Special Phone Number List" includes a configurable number of special and emergency numbers. This first list is designed to allow the destination node associated with such special and emergency numbers to vary depending upon the location of the node from which the call was placed.

The second list surveyed includes a configurable list of mapped phone numbers, and is identified as the "Mapped Phone Number List". The third list of phone numbers includes a configurable range of phone numbers (i.e., the "Ranged Phone Number List"), with each range being associated with a particular RTX node. If it is determined that a dialed number indicates a destination within the system and a matching phone number is not found in the phone directory within the node, the phone number is considered invalid an unallocated number indication is broadcast to the calling party.

Once the call information associated with a particular dialed number has been routed to the specified destination RTX node the phone number is again examined and the number is identified in the node phone directory to identify the intended recipient ITS unit. In an exemplary implementation each RTX unit will typically be provided with a phone directory with a configurable number of associated telephone numbers. If a match is not found the dialed number is considered invalid and an unallocated number indication is returned to the calling party.

Again referring to FIG. 1, the RTX unit 20 is connected to a first service control station (SCS) 34, while the RTX unit 22 is connected a second SCS 36. Each SCS will generally be implemented using a portable microcomputer having a hardware capability substantially similar to an NCS. The SCS's 34 and 36 provide portable access to the system 10, and enable external control of local RTX units as well as limited inquiries regarding the status of the entire system. Each SCS is capable of making transaction inquiries (e.g., # of calls from a particular ITS) from the RTX.

Although in the exemplary system configuration of FIG. 1 there is shown only a single NIX unit 24 and a pair of RTX units 20 and 22, other implementations may involve installation of many RTX units and a single NIX unit. In the preferred embodiment, the system 10 is capable of accommodating up to 32 "nodes", where each node consists of multiple RTX units and an NIX unit.

Figure 2D:
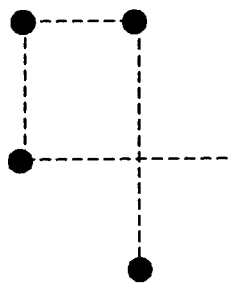
FIGS. 2C and 2D illustrate permissible nodal topologies having an even number of inter-node transmission links.
Figure 2C:
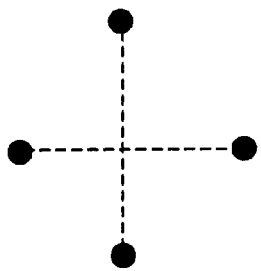
Figure 2B:
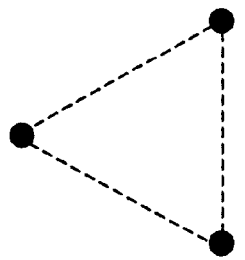
FIG. 2B depicts a three-node triangular topology resulting in a transmission loop having an impermissible odd number of transmission links.
Figure 2A:
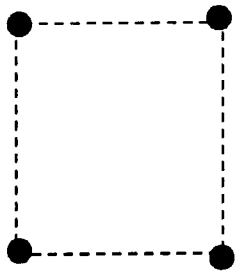
FIG. 2A illustrates an inter-node transmission link topology capable of being implemented within the inventive network.

In the preferred embodiment each network node is designed to alternately transmit and receive during successive system intervals in a time division duplex mode. Accordingly, the network is designed such that there are an even number of inter-node transmission links included within each closed transmission loop. Referring to FIG. 2A, a nodal topology comprising a square with four network nodes is permitted. In contrast, the three-node triangular topology of FIG. 2B is not permitted since this would allow a closed transmission loop having an odd number of inter-node transmission links. Similarly, the nodal topologies of FIGS. 2C and 2D are permissible as having an even number of inter-node transmission links.

Figure 3A:
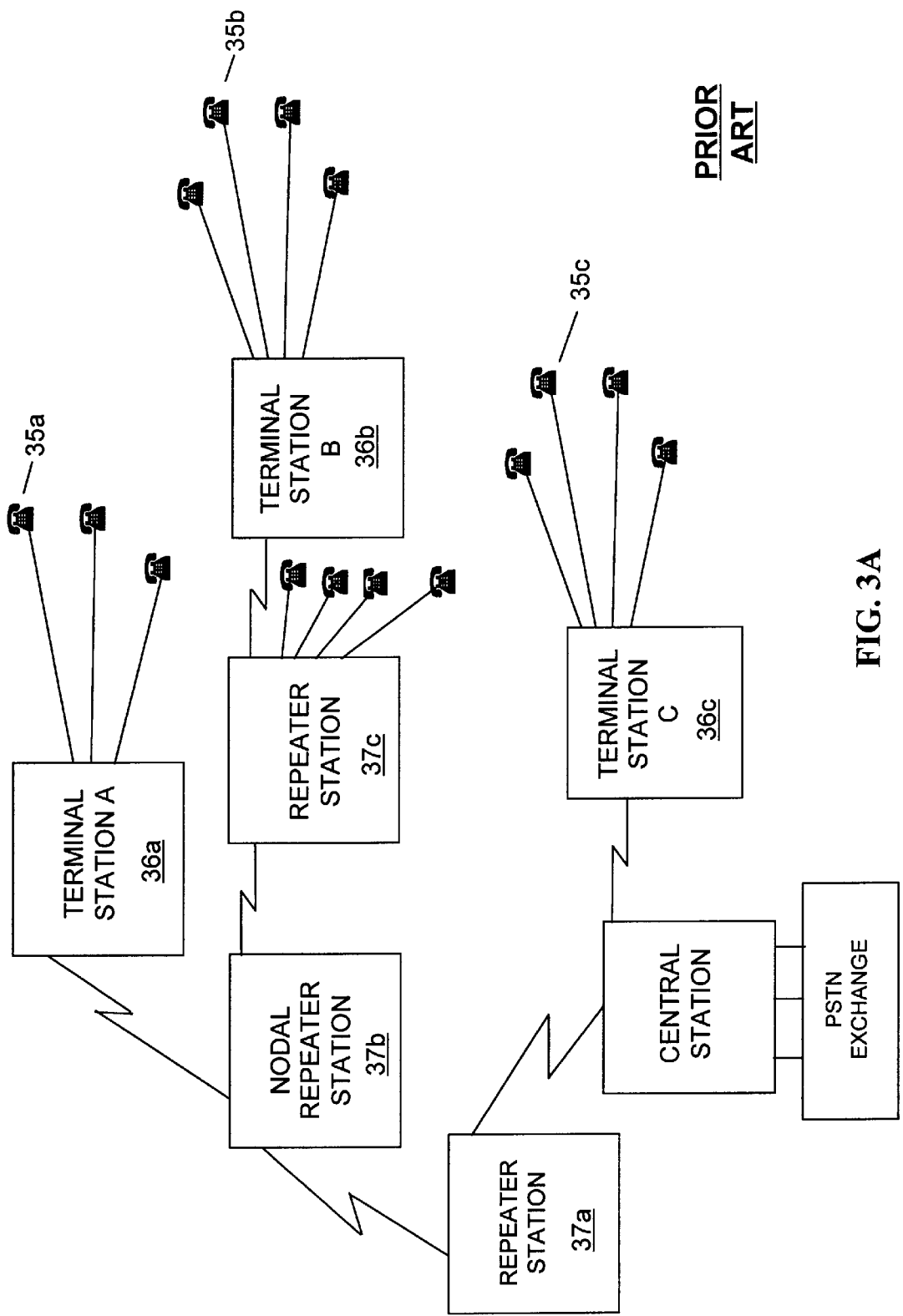
FIG. 3A depicts a typical manner in which calls are routed within a conventional multiple access radio telephone system.
Figure 3B:
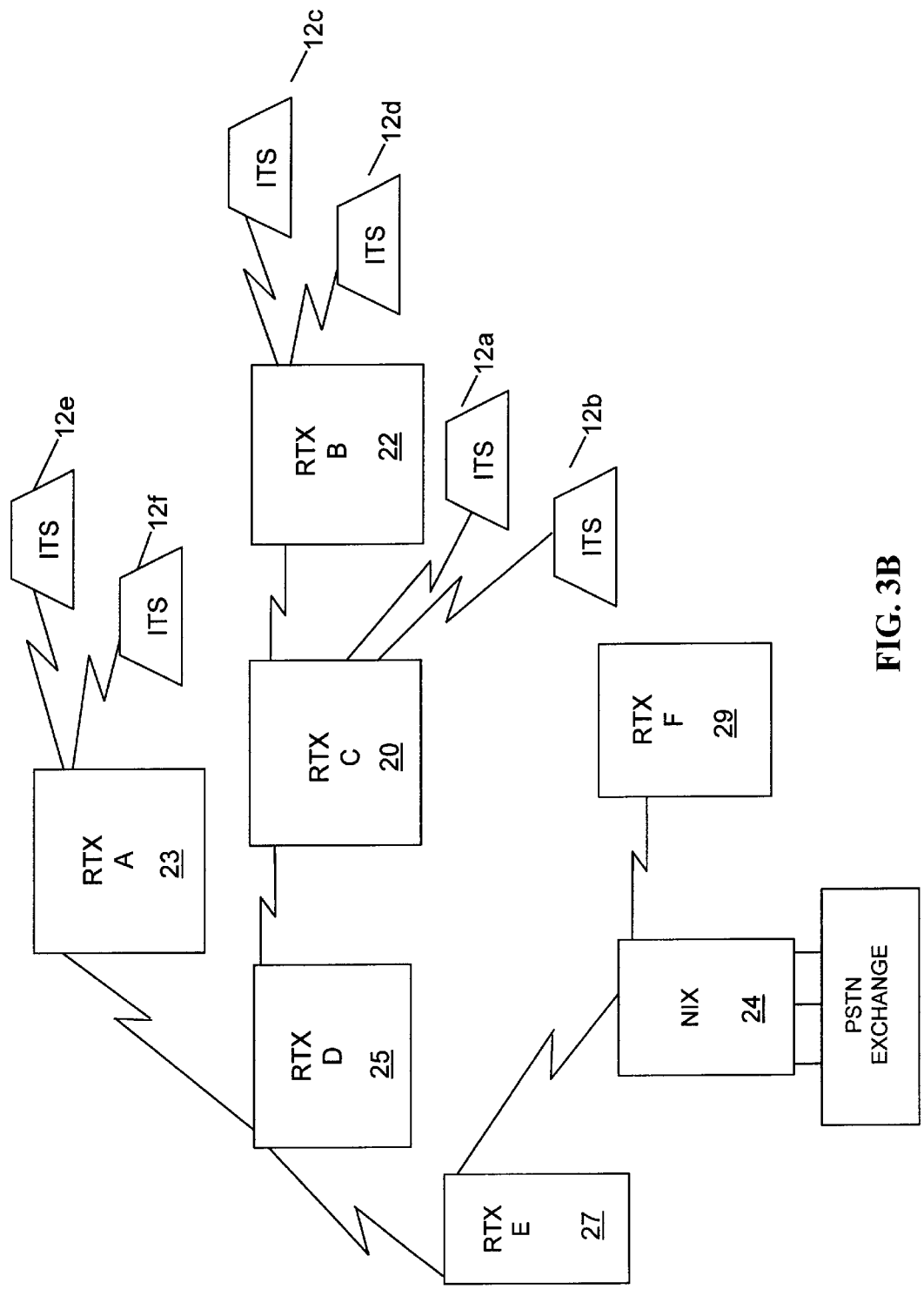
FIG. 3B illustratively represents the call routing technique contemplated by the present invention.

Various features and advantages of the distributed telephone system of the present invention may be appreciated by reference to the call routing diagrams of FIGS. 3A and 3B. In particular, FIG. 3A depicts a typical manner in which calls are routed within a conventional multiple access radio telephone system, while the call routing contemplated by the present invention is illustrated within FIG. 3B.

In the conventional system of FIG. 3A, conventional "intra-call" routing allows only a limited number of users within the same geographic area to communicate through the local terminal station. For example, users of a limited number of telephones 35a may communicate via terminal station 36a, users of a limited number of telephones 35b may communicate by way of terminal station 36b, and so forth. However, if a user of a telephone 35a desires to place a call to a telephone 35b, the call is first routed "up-stream" from terminal station 36a through repeater stations 37b and 37a to a central station 38 and into the public exchange. It is then routed back into the central station 38, and from the central station 38 the call is relayed to terminal station 36b by way of repeater stations 37a, 37b and 37c. This "up-stream/downstream" inefficiently occupies system resources by requiring call routing through the public switched telephone exchange and central station 38 even when it is merely desired to establish a communication link between neighboring terminal stations (e.g., between terminal stations 36a and 36b). This inefficiency becomes even more apparent when it is considered that neighboring terminal stations may be separated by only a few miles, while a relatively large distance may exist between the central station and the neighboring pair of terminal stations. As is described hereinafter, the distributed telephone system of the present invention affords a more efficient use network resources by providing a distributed call switching capability.

Turning now to FIG. 3B, the distributed "switching fabric" (i.e., distributed call routing capability) of the present invention enables a communication link to be locally established between neighboring RTX units without the assistance of the NIX unit 24. For example, assume a call is placed from the ITS unit 12e to the ITS unit 12c. In this case the call would proceed through the RTX units 23 and 25, and through the RTX unit 20 to the RTX unit 22. The call would then be relayed by the RTX unit 22 to the ITS unit 12c. In this way the call switching capability inherent within each RTX unit enables the most direct available communication link to be established between the ITS units associated with different RTX units. Accordingly, the present invention preserves trunk resources of the NIX by only routing calls there through when necessary to establish a direct communication path (e.g., between the RTX units 27 and 29).

II. Overview of Network Communication

A. Network Architecture

Figure 4A:
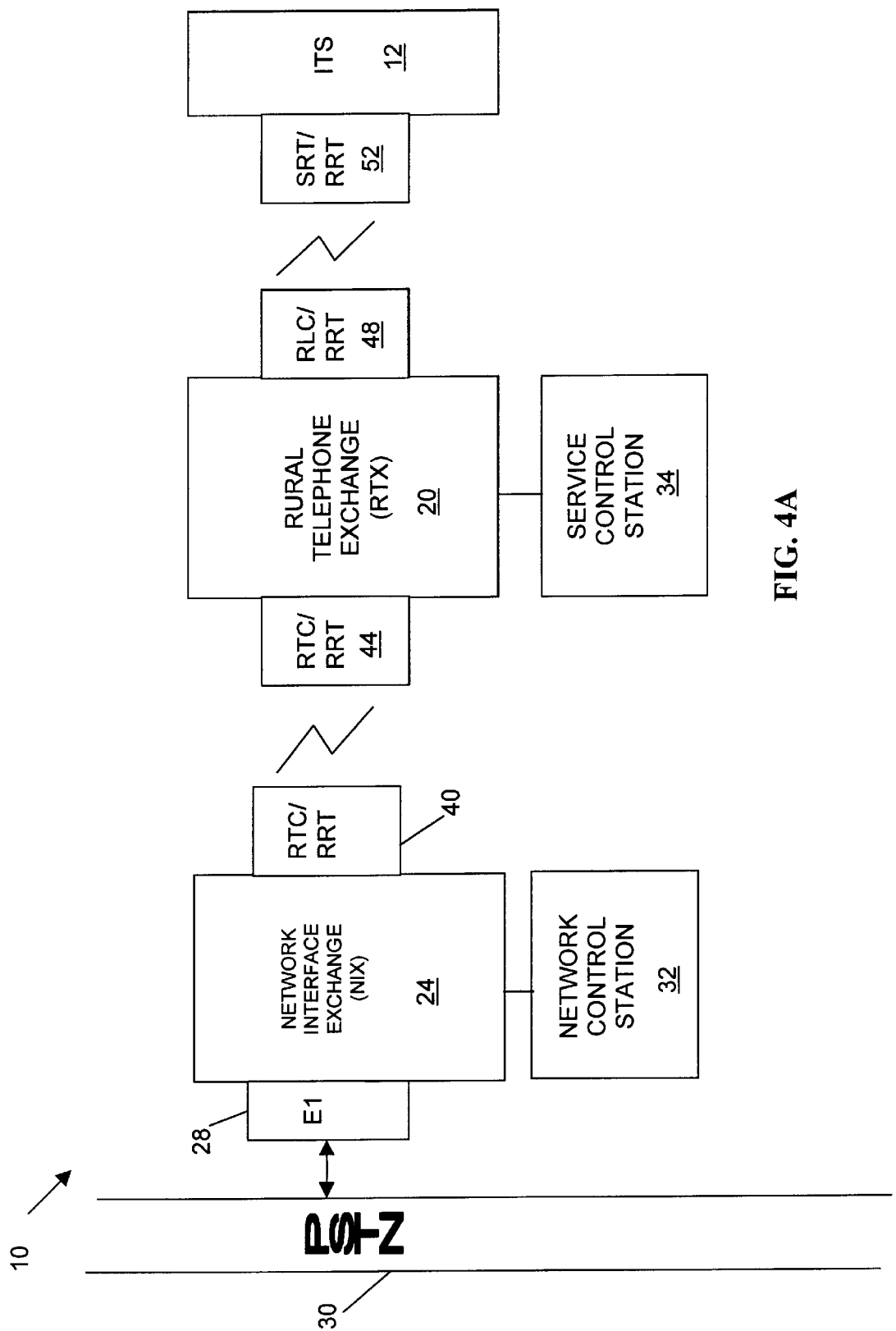
FIG. 4A shows a more detailed block diagrammatic representation of the hardware architecture of the system of the invention.

Referring to FIG. 4A, there is shown a more detailed block diagrammatic representation of the hardware architecture of the system 10. As is indicated by FIG. 4A, the NIX unit 24 interfaces with the RTX unit 20 through a radio trunk card (RTC) in combination with a rural radio transceiver (RRT), collectively represented as the RTC/RRT module 40. Similarly, the RTX unit 20 is connected to an RTC/RRT module 44 operative to communicate with the RTC/RRT 40 module. The RTX unit 20 is also connected to a radio line card (RLC) in combination with a rural radio transceiver (transmitter/receiver) (RRT), collectively represented as RLC/RRT 48 module, for facilitating communication with intelligent telephone set (ITS) 12. The ITS 12 is linked to a subscriber remote terminal (SRT) in combination with a rural radio transceiver (RRT). The SRT and RRT supporting intelligent telephone set 12 are collectively represented as SRT/RRT module 52.

In a preferred implementation each SRT unit operates on a single radio frequency, and hence traffic channel information is alternately transmitted in the forward and reverse directions over each communication link. This "ping-pong" communications protocol, which results in time-sharing of the available frequency band, reduces the number of frequencies required by the coverage area of each RTX unit.

Figure 4B:
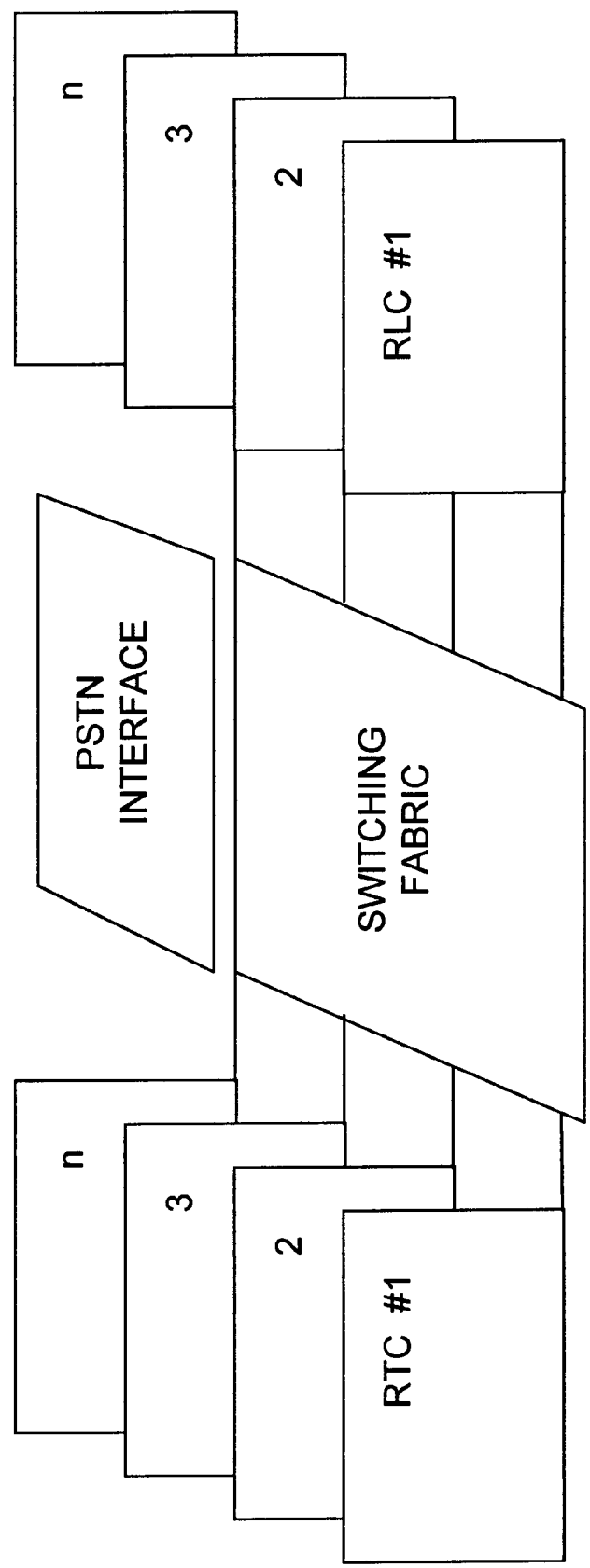
FIG. 4B provides a generalized representation of the "switching fabric" embedded 25 within the system architecture of FIG. 4A.

Turning now to FIG. 4B, a generalized representation is provided of the "switching fabric" embedded within the system architecture of FIG. 4A. The "switching fabric" depicted in FIG. 4B provides the interconnection of the multiple network elements comprising a given network realization. The switching fabric is operative to route calls, via the RLC/RRT and RTC/RRT cards of each RTX unit, between selected system nodes as well as to and from the PSTN. As is described hereinafter, the network interconnection facilitating the efficient call routing contemplated by the invention is made possible by the novel communications hardware and switching/control software integrated within the system RTX and NIX units. A switching fabric comprised of a plurality of RTX units, and one or more NIX units, is believed to be unique in the telecommunications industry and to represent a significant advance in the state of the art.

Figure 4C:
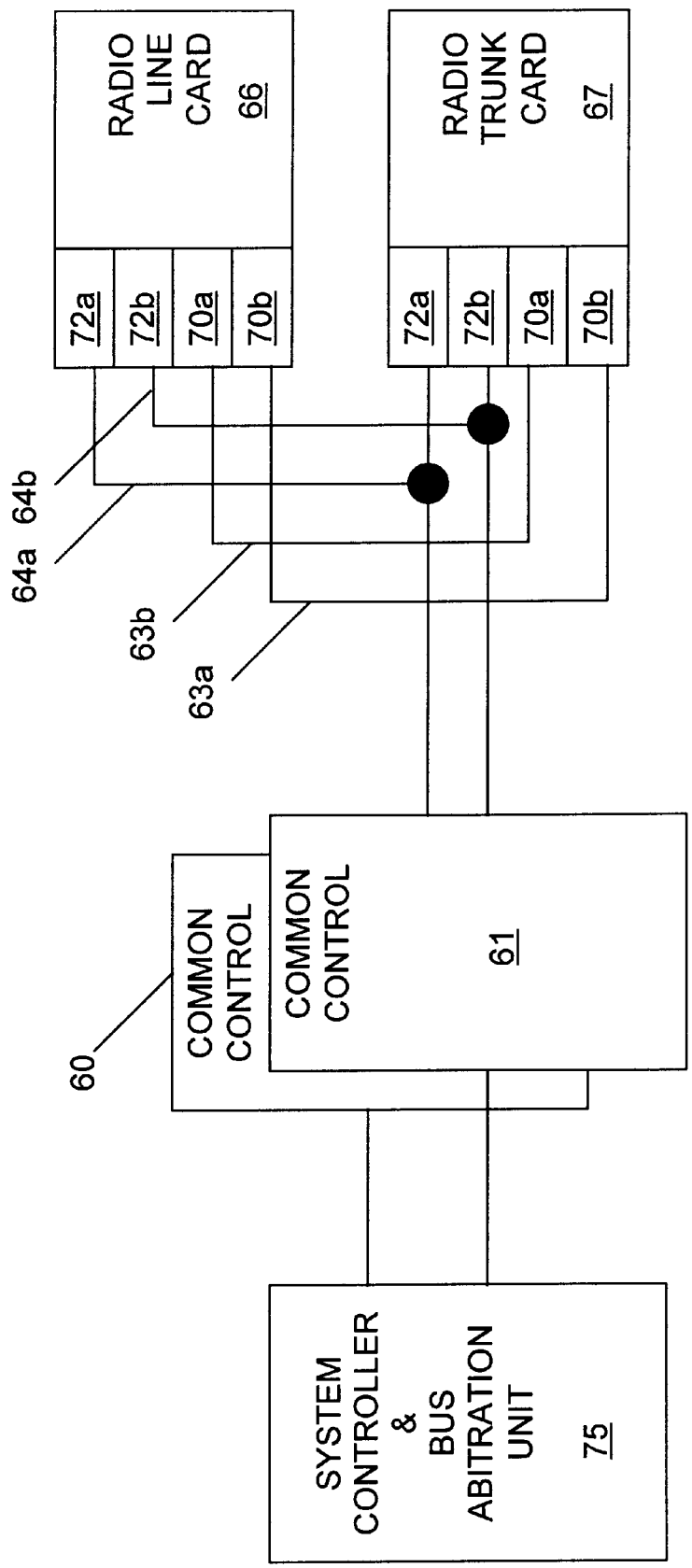
FIG. 4C illustratively represents the hardware and software elements included within each of the networked RTX units comprising the switching fabric generally represented in FIG. 4B.

FIG. 4C illustratively represents the hardware and software elements included within each of the networked RTX units comprising the switching fabric generally represented in FIG. 4B. Each RTX unit is seen to include a pair of Common Control modules 60 and 61, which are linked to various interface cards within the RTX unit by way of a set of communication and control buses. More particularly, Common Control module 60 and 61 is connected to a Parallel Common Control (PCC) bus 64a. Under these circumstances Common Control module 61 would be assigned to the PCC bus 64b. As is indicated by FIG. 4C, PCC buses 64a, 64b facilitate communication between the Common Control modules 60, 61 and a Radio Line Card (RLC) 66, and between the Common Control modules and a Radio Trunk Card (RTC) 67. The RLC and RTC interface cards are coupled to the TDM and PCC buses through TDM bus drivers 70a, 70b and PCC bus drivers 72a, 72b, respectively. For convenience, the term "Common Control" will be employed hereinafter to refer to the control software or firmware embedded within the Common Control modules of the networked RTX units.

The Common Control is coupled to the PCC Bus through the PCC bus driver. The redundant (i.e., non-active) Common Control enables uninterrupted system operation in the case of failure of the active Common Control, it being understood that only a single Common Control and/or a single TDM/PCC bus may be provided in alternate embodiments.

Again, the Radio Line Card (RLC) 66 provides an interface for radio communication between a given RTX unit and the multiplicity of ITS units within the coverage area thereof. The Radio Trunk Card (RTC) 67 relays traffic channel information, in the above-described TDM format, between the RTX unit in which it is disposed and neighboring RTX/NIX units.

Of the two TDM buses 63a and 63b, only a single one is active at any one time. The active TDM bus is used exclusively for data communication (i.e., voice and/or packet data). That is, the active TDM bus is not used to carry control functions, and is not directly accessible by the Common Control modules 60 and 61. The active TDM bus is selected via a global control signal SYSSEL, which is issued by a controller and bus arbitration unit 75. Since the control signal SYSSEL is "global", all call switching between interface cards within a given RTX unit are performed solely over the active TDM bus.

As is the case with the TDM buses 63a, 63b, each interface card is capable of using either of the two PCC buses 64a, 64b within the switching fabric of an RTX/NIX unit. The active Common Control, as determined by the system controller and bus arbitration unit 75, also selects the active PCC bus via the control signal SYSSEL. The redundant Common Control is then assigned by default to the alternate PCC bus. Since the PCC buses facilitate communication between the Common Control units, both the primary and alternate PCC buses are continuously exercised. Each PCC bus may be viewed as an extension of the ISA bus (IEEE Standard P966) of the central processing unit (CPU) within the system controller 75, and appears in the address space of the CPU. The PCC Bus provides a control path between the active Common Control and all interface cards (e.g., the Radio Line Card, Radio Trunk Card, DE1 card, and redundant Common Control card.

In an exemplary embodiment the PCC bus is a moderate speed (e.g., 700 kHz) multiplexed parallel bus, consisting of 16 data lines (corresponding to CPU data lines D0 through D15) and 19 address lines. Since A0 does not appear on the bus, all PCC bus accesses are by even addressed words. The PCC bus is derived from the ISA bus with 16 multiplexed address and data lines, three dedicated address lines, and three control lines. In addition, the PCC address space maps into a predetermined amount (e.g, 16 k) of Common Control address space. For Common Control addressing, the low twelve address lines of the PCC bus correspond to CPU address lines A1 through A12, and the high seven address lines of the PCC bus are set to zero.

Figure 4D:
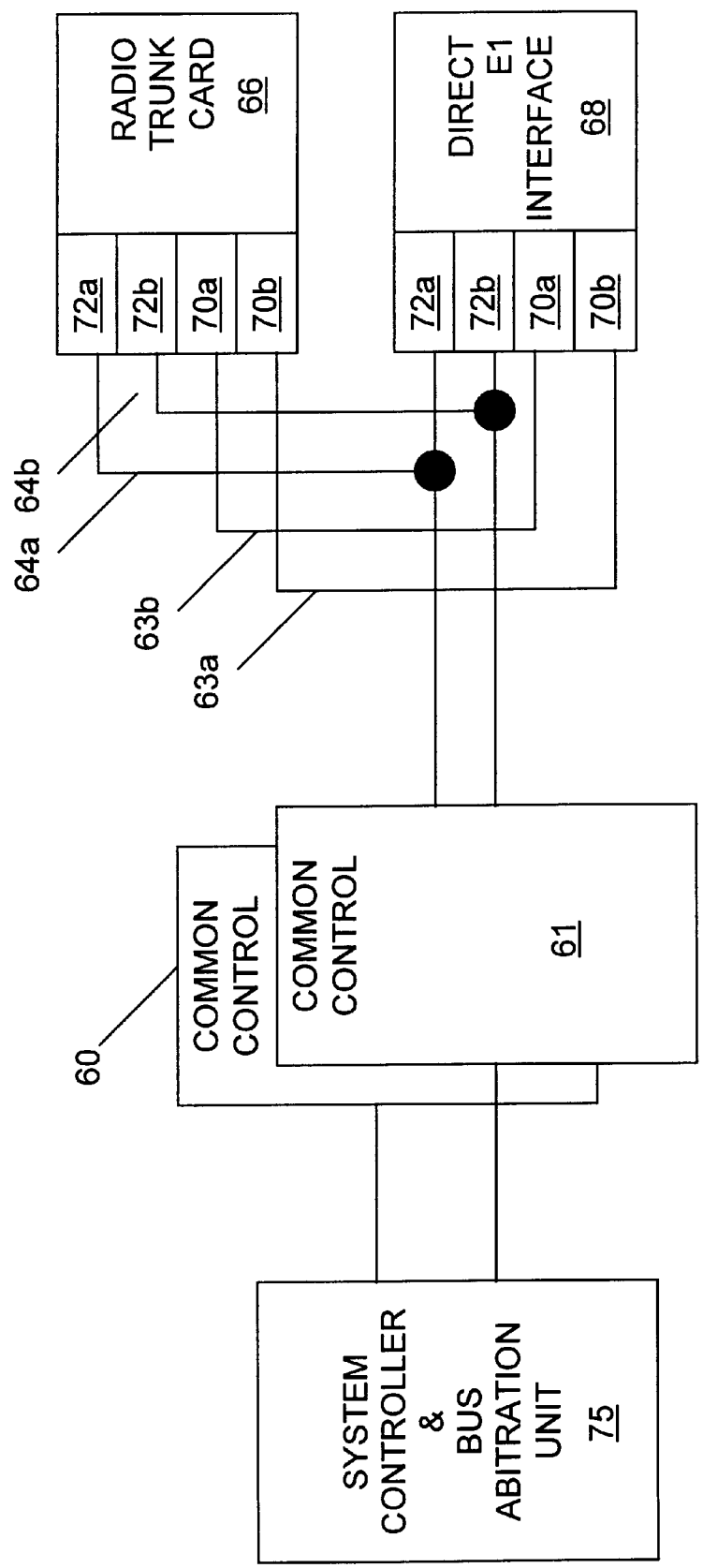
FIG. 4D illustratively represents the hardware and software elements included within each NIX unit included within the switching fabric presented in FIG. 4B.

FIG. 4D illustratively represents the hardware and software elements included within each NIX unit included within the switching fabric generally represented in FIG. 4B. In the representation of FIG. 4D, like reference numerals are employed to identify elements substantially identical to those present within the RTX unit of FIG. 4C. Referring to FIG. 4D, in the case of NIX units the TDM and PCC buses serve to link the Common Control modules to a Direct E1 Interface Card 68, as well as to the RTC card 67. The DE1 Interface Card 68 provides an interface between the NIX unit and the Public Switched Telephone Network (PSTN). Again, the RTC card 67 relays traffic channel information between the NIX unit in which it is disposed and neighboring RTX units.

B. Network Call Handling

In what follows, the term "originating node" refers to the RTX unit with which an ITS unit is in communication upon placing a call. If the intended call recipient is another ITS unit, then the RTX unit servicing the recipient ITS is identified as the "terminating" or "destination" node. All other RTX units involved in relaying the call are identified as "intermediary nodes". If the party initiating or receiving the call is in the public switched telephone network (PSIN), then the NIX unit connected to the PSTN corresponds to either the terminating or originating node.

Call Routing

Figure 4E:
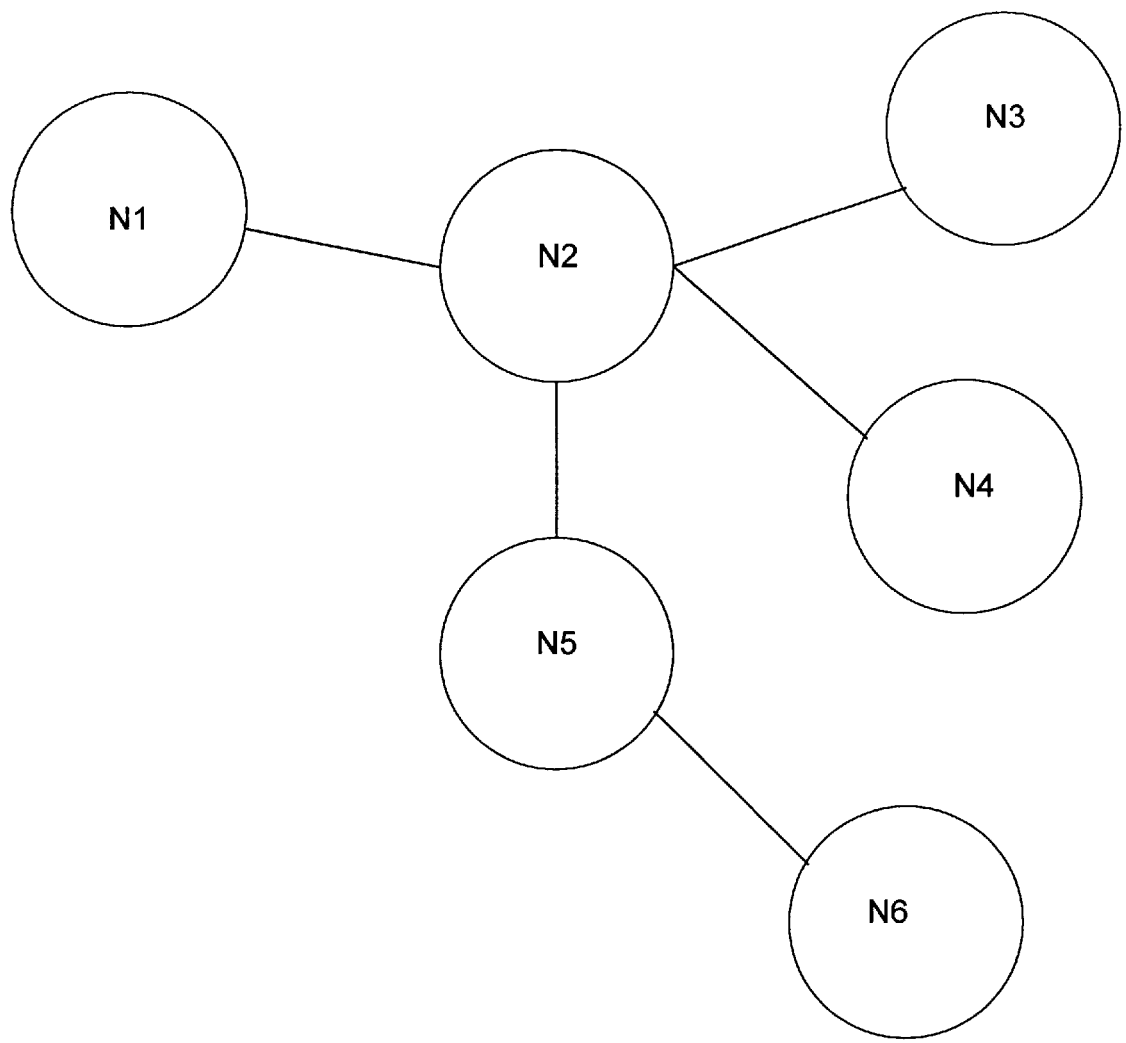
FIG. 4E shows a network which includes six RTX units, which are represented as network nodes N1–N6.

In the exemplary embodiment, during initial system installation an "adjacency list" of those network nodes with which a given RTX unit is capable of establishing radio communication is stored therein by way of a network control station (NCS) 32. The adjacency list at each node facilitates routing in accordance with a Depth First Search Technique, which will now be described with reference to FIG. 4E and TABLE I. In FIG. 4E a network is shown which includes six RTX units, which are represented as network nodes N1–N6. The adjacency list for the RTX unit represented as network node N5 is given below in TABLE I.

TABLE I

| Originating Node | First Intermediate Node | Second Intermediate Node |
|---|---|---|
| N1 | N1 | N2 |
| N2 | N2 | N1 |
| N3 | N2 | N1 |
| N4 | N2 | N1 |
| N5 | — | — |
| N6 | N6 | — |

As an example of the use of the adjacency list of TABLE I, assume that a call is placed from an ITS unit in the vicinity of node N4 to another particular ITS unit. The called phone number is relayed to the local RTX unit (i.e., to node N4), and the phone number lists therein are surveyed to determine the destination node. If it is determined that the destination node is node N5, the adjacency list of TABLE I is examined to determine the first intermediary node to which the call is to be routed. In this instance node N4 corresponds to the "originating node", and hence node N2 comprises the first intermediate node. At node N2, a channel Map is consulted to ascertain if a TDM communication channel exists from node N2 to the originating node N4. If at this time a TDM channel is unavailable, the call is forwarded to the second intermediate node (i.e., to node N1). If a TDM channel is available, the call is relayed from the first intermediate node N2 to the originating node N4.

For more complex networks, the adjacency list at each intermediate node may need to be examined several times until another intermediate node having an available TDM communication channel is identified. That is, in larger networks the adjacency list at each node may specify three or more alternative intermediate nodes associated with each originating node. Of course, the use of an adjacency list is not required for calls to ITS units serviced by the same RTX unit; that is, for calls in which the originating and terminating nodes are identical.

The following summarizes the call routing procedure described above:

1. Locate the terminating node specified by the called phone number by consulting the phone number lists.

2. Attempt channel allocation for the node using the Depth First Search technique facilitated by the adjacency list at each node:
  2.1 Consult adjacency list for intermediate node, If available, find TDM communication channel to the intermediate node If unavailable, return call request to previous node, repeat step 2 until the previous node equals the original node, at which time abort the call.
  2.2 Find a TDM communication channel to the intermediate node If available, If Unavailable, go back to 2.1 and obtain another intermediate node.
  2.3 Pass the call request to that node and repeat Step 2 for that node until the intermediate node is the terminating node.

If there remain no more alternative intermediate nodes, the call request is returned to the previous node and the same algorithm is repeated from step 2.1.

Call Processing

A general description is provided of selected call processing software routines included within the Common Control of each RTX/NIX unit. These call processing routines are designed to facilitate the distributed call handling and routing techniques contemplated by the present invention. Included among such routines is a Call Handler Task for performing call set up, call take down and channel connection functions.

TABLE II provides a list of the call states included in a preferred implementation of the Call Handler Task:

TABLE II

| FUNCTION | DESCRIPTION |
| --- | --- |
| CALL SETUP | Setup a path from the calling to the called party |
| CALL FAILURE | No path including both originating and destination nodes can be setup for the call |
| CALL IN PROGRESS | Status between stall and end of a connection |
| CALL TEAR DOWN | Call being disconnected or torn down |

The various types of calls processed by the Call Handler Task may be categorized based on the respective locations of the parties involved in placing and receiving a call. A "local call", or refers to one in which only a single RTX unit is involved; that is, a single RTX serves as both the originating and terminating node. A "intra-network" call requires that more than one RTX units participate in relaying the call, and further requires the originating and receiving parties to each be serviced by an ITS unit. Finally, an "outside network" call refers to a call in which at least one of the parties is included within the PSTN. "Incoming" calls from the PSTN are first detected in the connecting NIX, and "outgoing" calls are routed through the connecting NIX to the PSTN. NIX units are not involved in handling local calls, and may not be included in the call path of intra-system calls.

As employed herein, the term "call state" refers to the status of a call as it progresses through the system. In what follows call state "A" refers to the process of call origination at the originating node. Call state "B" indicates that a call is being terminated at the destination node, while call state "C" indicates that a call is being routed through an intermediary node. Call state "D" refers to the process of call disconnection or tear down.

When, for example, a call originates and terminates at the same node, i.e., an intra-node call, the applicable call states at the node are "A" and "B". When calls proceed from one to another node, the applicable call state in the originating node is "A" and in the terminating node is "B". If an intermediary node is used to route the call, the applicable call state within the intermediary node is "C".

Call states "A" and "B" may be further divided into substates "A1", "A2", and "B1", "B2", depending on whether a call originates (i.e., is requested) from within the network 10 or from within the PSTN. A call request ("A1") from an ITS within the network 10 is distinguished from a call request ("A2") from the PSTN by the DE1 interface card 68. Similarly, substate "B1" corresponds to a call outgoing to an ITS, and substate "B2" refers to a call outgoing to the DE1. In an exemplary embodiment, the Common Control is programmed to process only calls characterized by selected substates. For example, the Common Control will not process a call characterized by states A2 and B2, since this would correspond to a call which originates and terminates outside of the network 10.

Call Session

A "call session" refers to the data structure, or "call session record", accompanying each call processed within the network 10. Each call session is designated with a unique identifier, which is included within the call session record stored at the originating node for the call. The call session record identifies the state of the call, as well las other information about the call such as, for example, TDM assignment and channel usage. During the process of terminating a call, the call session record is also stored within the intermediate and terminating nodes.

Call Setup

A. Overview

When the Common Control identifies a call request, the call request is classified as originating either from within the network 10 (state "A1") or from within the PSTN (state "A2"). The Common Control then extracts the called number from the call request, and consults the stored hierarchy of phone lists to ascertain the terminating node. If the terminating node is identified as the current node, the "intra-node" call is processed by simply relaying the call to recipient ITS. If the terminating node is identified as being different from the originating node, the call is processed in accordance with the Depth First Search technique described above.

B. Common Control Call Setup Procedure

When a call is initiated by an ITS unit, an Incoming Request message is received by an RTX from the calling ITS. The RLC associated with the RTX then forwards the Incoming Request message over the PCC Bus to the RTX Common Control. The Incoming Request message includes the numbers of the SRT and ITS units from which the call was received, a channel number, and the dialed number identifying the recipient party. An Interface Card (IFC) Receive Task (FIG. 21) within the Common Control receives the message, removes the PCC header information, and copies the remaining information to an operating system envelope. The Incoming Request message as modified by the IFC Receive Task is then provided to the Call Handler Task, which performs the following operation based upon information within the envelope header:

Determination of the number of the destination node (NDES) associated with a destination RTX/NIX unit. The Call Handler Task ascertains the number of NDES by searching through the aforementioned Special, Mapped, and Ranged phone number lists as follows:

(a) Search the Special Phone Number List (b) If NDES not found in (a), then search the Mapped Phone Number List, (c) If NDES not found in either (a) or (b), then search the Ranged Phone Number List.

(d) If NDES is not found in either the Special, Mapped or Ranged Phone Number lists, then the called party is assigned to a default zone associated with the PSTN.

The call setup technique contemplated by the invention effects the routing of calls through the network 10 via the most direct available communication link, and hence conserves channel resources by not operating to reroute each call through a central switch station or the like. This intelligent routing among RTX network nodes contrasts with conventional call processing techniques, in which repeater stations inflexibly relay each call through a central switch.

C. Call Setup Diagrams

Figure 5A:
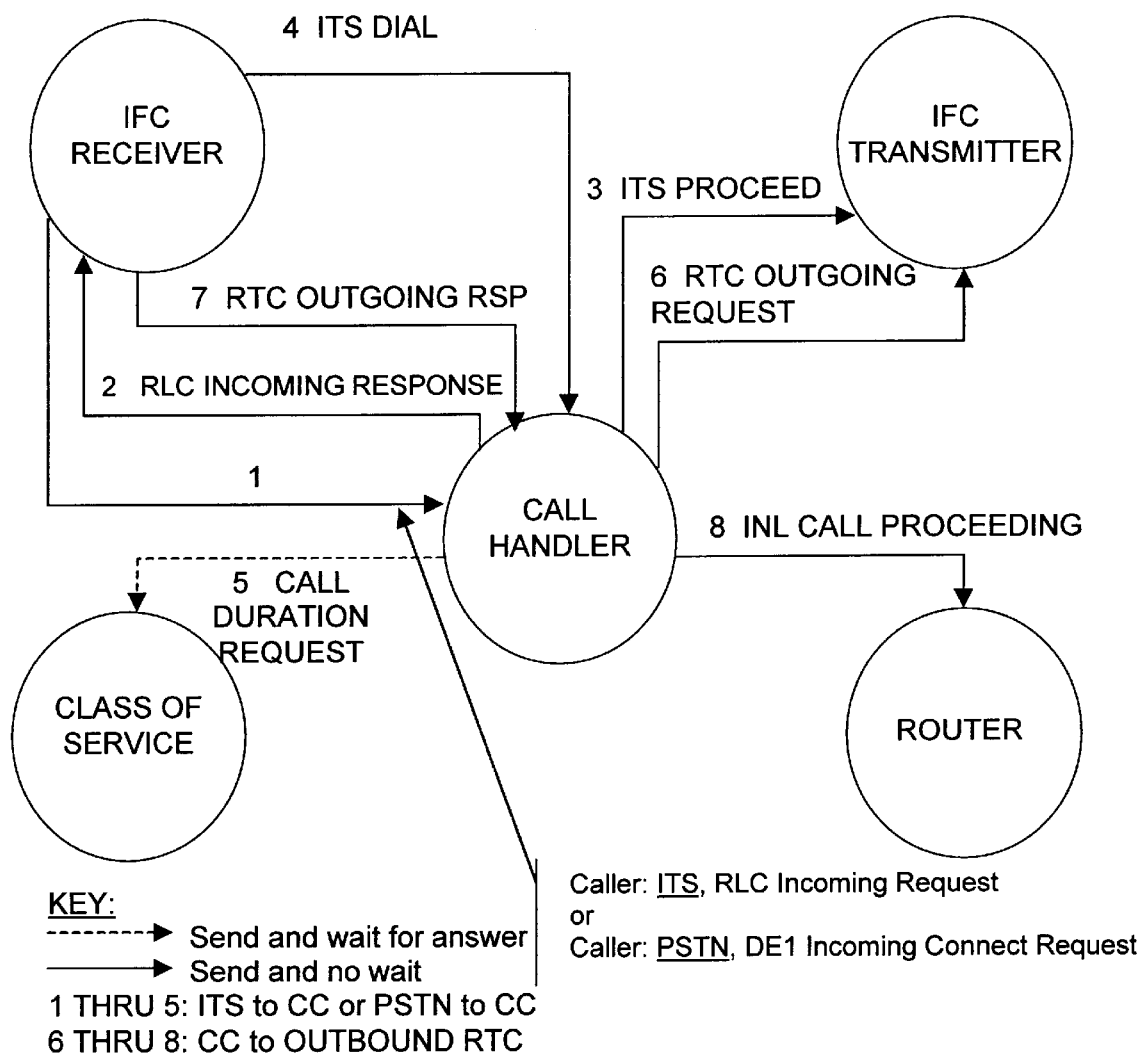
FIGS. 5A, 5B, and 5C are call flow diagrams exemplifying the call routing contemplated by the invention.
Figure 5B:
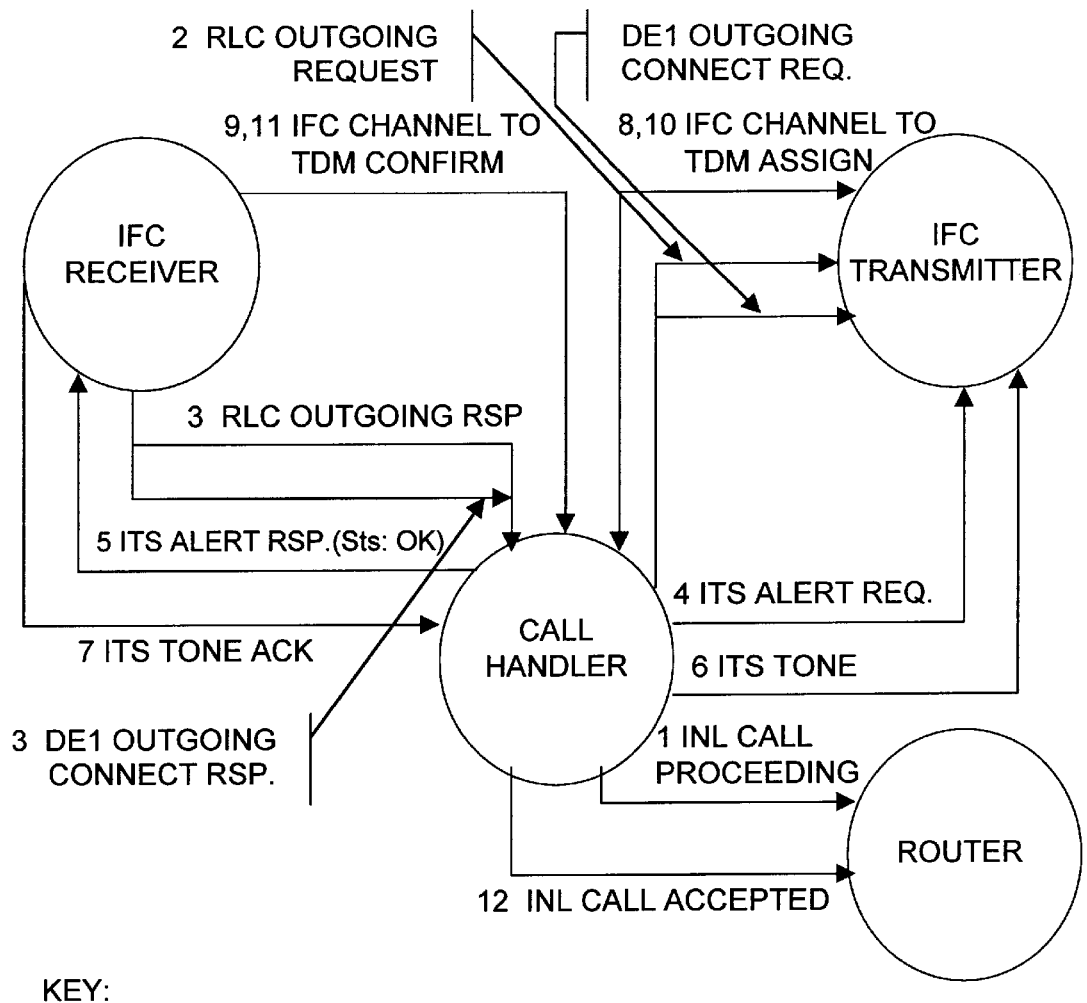
Figure 5C:
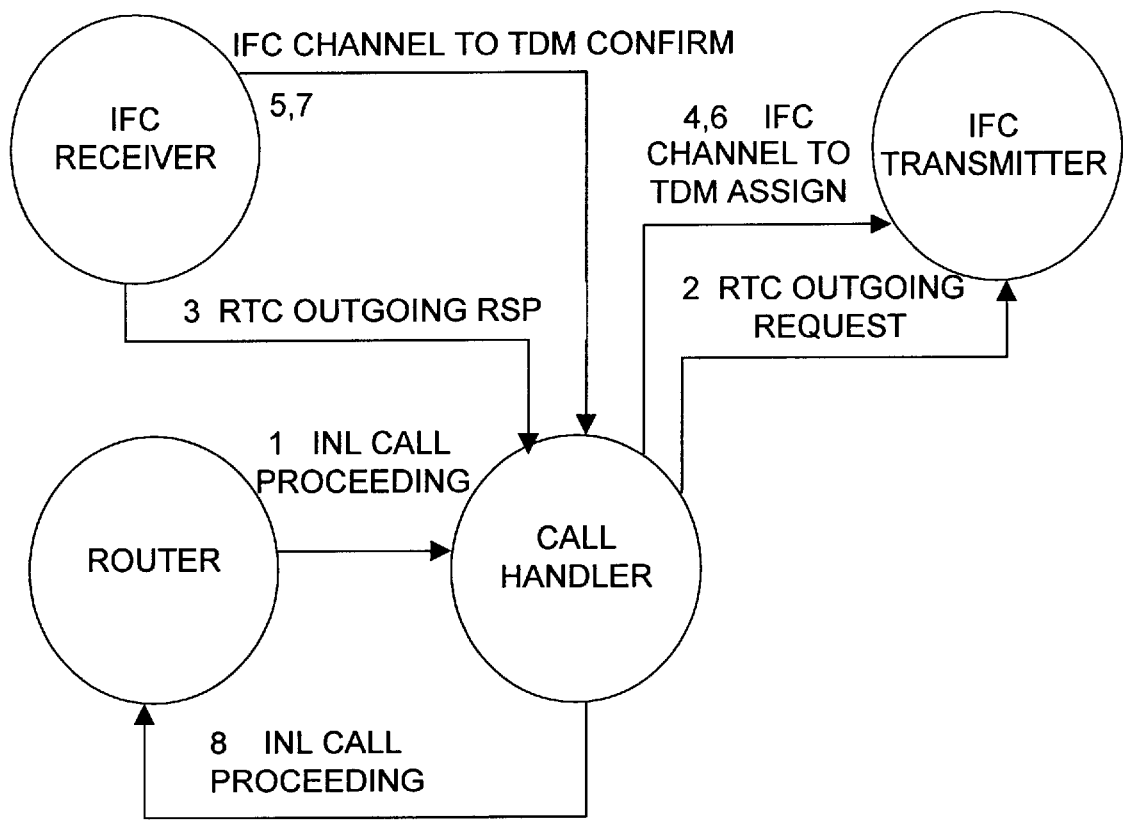

FIGS. 5A, 5B, and 5C are "call setup diagrams" which illustratively represent the message interchange between network nodes occurring during the establishment of a call connection through the network 10. The call setup of diagrams of FIGS. 5A–5C are representative of the setup operation performed when call routing between nodes is required, and thus highlight the unique inter-node routing capability of the present system.

The diagrams of FIGS. 5A–5C also provide insight into the operation of the various Common Control "tasks" executed at each RTX node during call setup, and hence may also be characterized as "intertask diagrams". In the diagrams of FIGS. 5A–5C, solid lines are used to represent those message transmissions not requiring the interruption of further call processing pending a message response. Dashed lines correspond to message transmissions resulting in the suspension of call processing until an acknowledging or confirmatory response is received (see, e.g., the "Call Duration Request" message of FIG 5A).

Turning now to FIG. 5A, there are shown the call setup steps initiated at the originating node in response to a Caller requesting service. That is, FIG. 5A is representative of the processing involved during call state "A" described above. The request is received by an RLC associated with the RTX and is passed through the interface circuit (IFC) receiver of the RTX Common Control, and is provided to the software module Call Handler Task included therein (Step 1). The Call Handler Task, working in conjunction with the Router Task, are primarily responsible for the routing of calls between network nodes. After messages are exchanged between the Call Handler Task and the RLC by way of the IFC Transmitter and Receiver (Steps 2–5), the call is routed to the destination node, or to another intermediary node, in accordance with the results of the Depth First Search of the node's adjacency list.

FIG. 5B provides an intertask diagram representative of the call set-up processing performed at a terminating node (call state "B"). Those incoming calls (Step 1) terminating at an NIX node seek a connection to the PSTN through the DE1 Outgoing Connect Request (Step 2). Similarly, those incoming calls terminating at an RTX unit seek a channel to the receiving SRT device by way of RLC Outgoing Request (Step 2). The calling node is notified that the call has been accepted, by a user within the PSTN or at the destination SRT/ITS unit, via an inter-node link (INL)

Call Accept message (Step 12).

Referring now to FIG. 5C, an intertask diagram is provided which shows the process by which an incoming call at an intermediary node is forwarded to the next intermediary or destination node (call state "C"). The inter-node link (INL) messages (Step 1 & 8) are sent to the Router Task, which results in inter-node messages being sent to the destination node via an intermediary node. Processing at each intermediary node is initiated by the RTC passing a message "INL Call Proceeding" over the bus to the IFC Receiver. Again, the Call Handler Task functions in conjunction with the Router Task to determine the next node to which the call will be routed. In addition, a Channel Allocation Task inherent within the Call Handler Task tracks TDM channel availability at the RTX and allocates an available TDM channel when so requested.

M. Frame Format and Signaling Structure

Figure 6A:
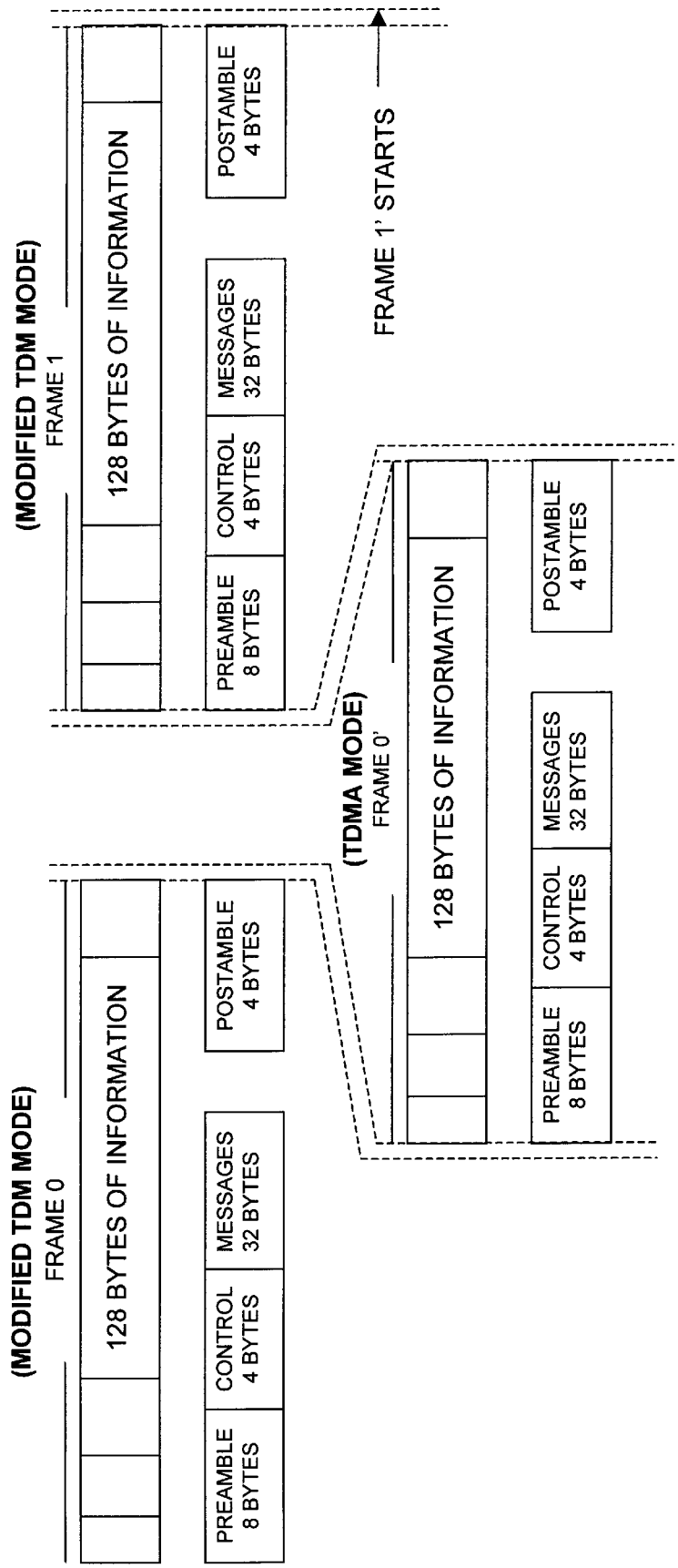
FIG. 6A is a diagrammatic representation of the frame format and signaling structure utilized in communications between remote telephone exchange (RTX) and intelligent telephone set (ITS) units.

FIG. 6A is a diagrammatic representation of the frame format and signaling structure utilized in communications between RTX and ITS units. As is indicated by FIG. 6A, in communications in a forward direction from an RTX unit to an ITS unit (i.e., Frame 0, Frame 1) the transmission format is time-division multiplexed (TDM, in which the channel information included within each frame is transmitted to a different ITS. That is, in the forward RTX/ITS link each frame position in the overall E1-like frame of FIG. 6A is supplied with traffic channel information. In "reverse-link" communications from an ITS to an RTX, i.e., Frames 0', 1', the format is time-division multiple access (TDMA) in that each frame is devoted to communication between a particular ITS and an RTX. Each frame includes 32 channel time slots (TS0–TS31) of 4 bits each, for a total of 128 bits per frame. In the preferred embodiment each pair of frames, e.g., Frames 0 and 0', is transmitted in approximately 125 microseconds.

Within each frame transmitted by an RTX unit the first is a preamble of 8 bytes used in signal acquisition and clock synchronization between the transmitting RTX unit and the receiving ITS unit. Then a 4 byte control signal is sent followed by a 32 byte message field. The next is a 128 byte voice channel information field over each forward transmission link between the RTX unit and an ITS unit. The message field is used as an interface signaling channel over which messages are transmitted between all the network elements.

Transmission over each reverse link between an ITS unit and the RTX unit is in a TDMA mode, with each frame (e.g., Frame 0', Frame 1') being transmitted by a single ITS unit. Accordingly, each operative ITS unit transmits voice information only once every 30th frame. In the preferred embodiment there exists a brief guard time between transmission in a TDMA frame (e.g., Frame 0'), and an adjacent TDM frame (e.g., Frame 1). The reverse link TDMA format allows any ITS unit to be assigned to any available TDMA frame slot.

Figure 6B:
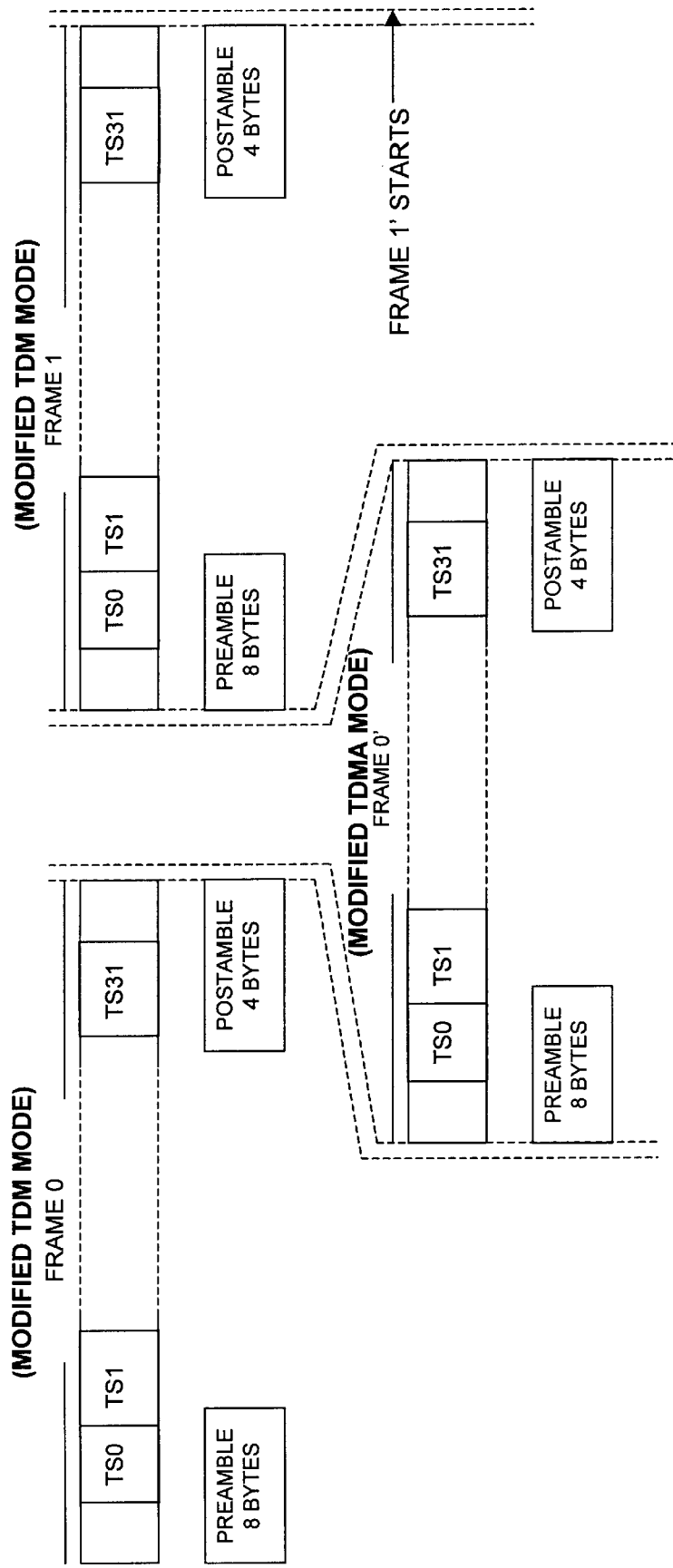
FIG. 6B is a diagrammatic representation of the frame format and signaling structure utilized in communications between system nodes, i.e., between a pair of RTX units or between a network interface exchange (NIX) unit and an RTX unit.

FIG. 6B is a diagrammatic representation of the frame format and signaling structure utilized in communications between system nodes, i.e., between a pair of RTX units or between an NIX unit and an RTX unit, over a set of 32 time-division multiplexed (TDM) trunk channels. The communications protocol between RTX and ITS units outlined in FIG. 6A is substantially similar to that depicted in FIG. 6B, with the exception that in FIG. 6B a TDM mode is used in both transmission directions. That is, a TDMA mode is not supported between pairs of RTX units, or between NIX and RTX units. In the preferred embodiment time assignment is made for the 32 time-division multiplexed (TDM) trunk channels of the TDM bus by way of the common channel interface signaling (CCIS).

In a preferred embodiment each of the 32 TDM channels of the TDM bus a 32 bit word, which results in there being the equivalent of 1024 simplex channels per TDM frame. Each of the interface cards (i.e., the RLC, RTC and DE1 interface cards) is capable of 32 active duplex channels. As is described below, each interface card accessing the TDM bus will include two registers per channel (i.e., 64 registers).

Accordingly, an interface card assigned to handle the maximum number (i.e. 32) of duplex calls will require access to all 32 transit time slots and all 32 receive time slots. Increased sectorization of the coverage area associated with a given RTX unit is achieved by implementing the unit with a plurality of hardware "shelves". In an exemplary realization the RTX unit may contain 4 shelves, with each shelf including up to 8 interface cards and a pair of Common Control module cards. The TDM and PCC buses of each shelf will typically be printed on the backplane thereof. The TDM and PCC buses of adjacent shelves are interconnected by way of shelf interface units (not shown), which provide buffering between the TDM and PCC buses of each shelf.

IV. System Communication Hardware

A. Rural Radio Transceiver (RRT)

Referring again to FIG. 4A, the NIX unit 24, the RTX unit 20, and the ITS unit 12 each require connection to a rural radio transceiver (RRT) in order to communicate with other network elements. In particular, each RRT functions to provide a radio interface for telecommunication traffic carried over both node-to-node (trunk) and node-to-subscriber (local loop) paths. The RRT units operate in pairs (e.g., RLC/RRT 48 and SRT/RRT 52) in a two-way burst i.e., "ping-pong", mode of digital radio transmission. This allows for full duplex communication between each RRT pair using only a single radio frequency. For example, RLC/RRT 48 transmits while SRT/RRT 52 receives, and vice versa.

As is indicated by FIG. 4A, each RRT is associated with one of three "host" interface cards. That is, each RRT operates in conjunction with either a Radio Trunk Card (RTC), a Radio Line Card (RLC) or a Subscriber Remote Terminal (SRT). During reception each RRT extracts a recovered clock signal from the received data stream. This clock signal is then delivered to the associated interface card for use in clocking in the received data. During transmission the interface card provides the RRT with a transmit clock. The subscriber interface, (SRT) derives its transmit clock from the received clock. The RLC and RTC interfaces derive their transmit clocks from a system master clock. The system master clock is in turn derived from a single source, either a direct trunk interface (DE1), a designated radio trunk card (RTC), or an internal clock source (e.g., a crystal). In the case of the system clock being derived from a designated RTC, a highly stable clock circuit is aligned to the RTC's received clock signal, with the clock circuit holding the clock frequency during transmission.

In addition, the subscriber radios (SRT/RRT) and base station radios (RLC/RRT and RTC/RRT) use a coded preamble to enable the specific radio receivers (RRTs) to discriminate between the various transmitter types, as an aid to the RRT locking on to the proper radio source during reception.

In the preferred embodiment each RRT is programmed to transmit at one of eight center frequencies by the Network Control Station 32 (FIG. 1). Four of the eight center frequencies are included in a first frequency band for links between ITS and RTX units (local distribution links), while the remaining center frequencies are included within a second frequency band reserved for communication between a pair of RTX units or between an RTX and an NIX unit (transfer links).

The RRT center frequency is programmed, to one of a set of predefined center frequencies mutually offset by 200 KHz, by downloading a serial data stream through the RRT interface connector. In addition, the particular frequency selected for each RRT will be dependent upon its potential for proximity to other RRT's operative to transmit on an identical frequency. More specifically, RTC/RRT's and RLC/RRT's are assumed to be proximate other RTC/RRT's and/or other RLC/RRT's.

SRT/RRT's can operate in one of three distinct modes: (i) Transmit Mode, (ii) Receive Mode, or (iii) Sleep Mode. RTC/RRT's and RLC/RRT's operate only in Transmit and Receive Modes. In an SRT/RRT, sleep mode is controlled through a signal provided by the host SRT card through a sleep enable (SLEEP_PE) line. When in Sleep Mode most circuits within the RRT are turned off to save power, but memory within the Control and Status Circuits retains the RRT center frequency setting. In all RRT's the Transmit and Receive Modes are governed by the host SRT, RLC, or RTC card through the interface lines.

Figure 7:
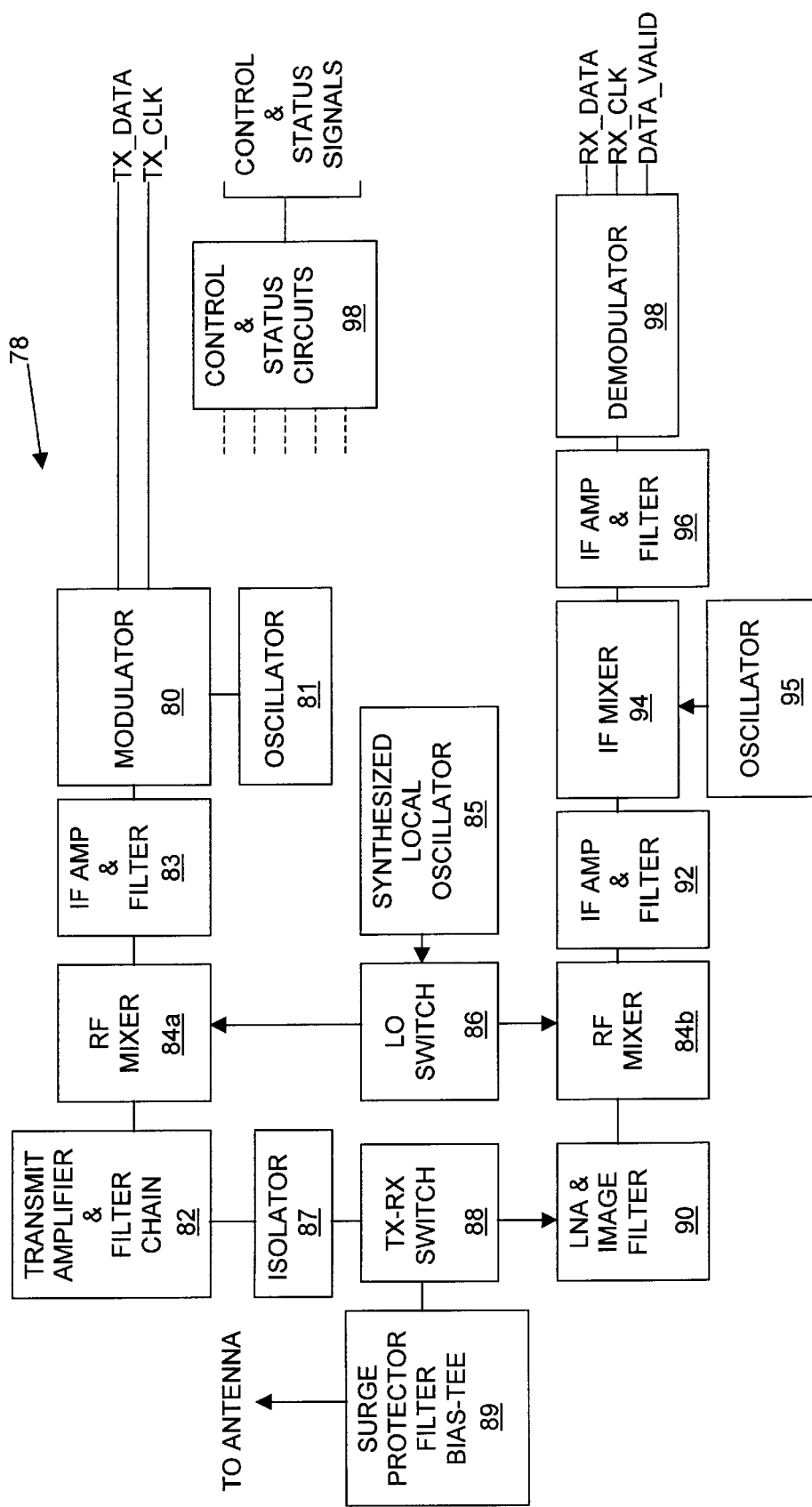
FIG. 7 is a block diagram of an exemplary implementation of a rural radio transceiver (RRT).

FIG. 7 is a block diagram of an exemplary implementation of a rural radio transceiver (RRT) 78. Referring to FIG. 7, in Transmit Mode the host card supplies transmit clock and data signals to the modulator 80 over the TX_Clk and TX_Data lines, respectively. The Tx_Clk is utilized to govern the latching of the data signal Tx_Data within the modulator 80. The modulator 80 scrambles the data signal with a predefined pseudo random (PN) sequence, and uses the resultant scrambled data signal to produce an intermediate frequency (IF) signal by modulating the phase of an RF carrier provided by the oscillator 81. In the preferred embodiment the modulator 80 includes scrambler, data encoder, and pulse shaper circuit elements capable of being conventionally realized using, for example, discrete digital logic in conjunction with read-only memory (ROM) look-up table. The modulation is preferably performed using a modified offset quadrature phase shift keying (MOQPSK) technique in which a data value of "0" causes no change in carrier phase, while a data value of "1" results in a phase shift of either +/- 90 degrees. This technique minimizes occupied bandwidth while maintaining a constant RF envelope, thus allowing the RF transmit amplifier 82 to be realized using a power-efficient Class C amplifier.

Referring again to FIG. 7, a transmitter IF amplifier and filter 83 amplifies the IF signal from modulator 80 to a specified magnitude, and also filters harmonics and other spurious signals created during modulation and IF amplification. RF mixer 84 operates to translates the IF frequency signal to an RF output frequency by mixing the IF signal with the signal from a synthesized local oscillator 85, which may be set in accordance with the desired transmit and receive frequencies of the RRT. During transmit mode operation an LO switch 86 relays the LO signal from synthesized local oscillator 85 to the RF mixer 84*a,* while during receive mode operation the LO switch is commanded by an RRT controller (not shown) to couple to the LO signal to an RF mixer 84*b* in the receive path. Within the transmit path, the RF transmit amplifier and filter chain 82 augments the signal power produced by RF mixer 84*a* to an appropriate level, and further filters harmonics and other spurious signals from the RF output signal. A ferromagnetic isolator 87 prevents RP signal energy reflected from the RRT antenna from reaching transmit amplifier 82 and presents a controlled load impedance to the transmit amplifier for improved performance.

As is indicated by FIG. 7, the output of isolator 87 is provided to Tx-Rx switch 88, which is preferably realized as a single-pole, double-throw RF switch operative to connect the antenna port to either the transmit or receive path. The switch 88 is set to the appropriate position in accordance with transmit/receive mode timing information provided by the RRT controller. The Tx-Rx switch 88 is coupled to the RRT antenna through a multi-purpose RF interface module 89 disposed to perform surge protection, filtering and antenna bias functions. The RF interface module 89 protects the receive and transmit path circuitry high-energy pulses received by the RRT antenna, and prevents transmission of frequency harmonics by RF amplifier 82. In an alternate implementation the RF interface 89 injects a bias current into the RRT antenna cable for use by optional remote amplifiers coupled thereto. The RRT antenna then radiates the transmit signal for reception by one or more companion RRTs tuned to the same RF frequency. In response, each companion RRT transmits a return signal for reception by the RRT of FIG. 7.

Each return signal received by the RRT antenna is passed by RF interface module 89 and Tx-Rx switch 88 to a low-noise amplifier (LNA) & image filter 90. The LNA and image filter 90 amplifies the low-level received signal, and suppresses RF energy at the image frequency of the RF mixer 84*b*. After being translated to the receiver intermediate frequency (IF), the resultant received IF signal is amplified and filtered by a first IF amplifier and filter network 92. The filtered IF signal is further frequency down-converted within IF mixer 94 using a reference signal from oscillator 95. Next, the output signal produced by IF mixer 94 is again amplified and filtered within a second IF amplifier and filter network 96, which sets the noise bandwidth seen by demodulator 98. In a preferred embodiment the demodulator 98 detects a predefined data sequence, or preamble, used to frame each received data packet. This effectively synchronizes the demodulator 98 to the received data stream, and thereby allows identification of phase transitions in the received data as well as recovery of the embedded clock signal. The recovered data and clock signals are then decoded, and the resultant Rx Data and Rx Clk bit streams provided to the interface card associated with the RRT for further processing. The demodulator 98 also produces a Data Valid signal, which marks the initial bit of each received data burst.

Figure 8:
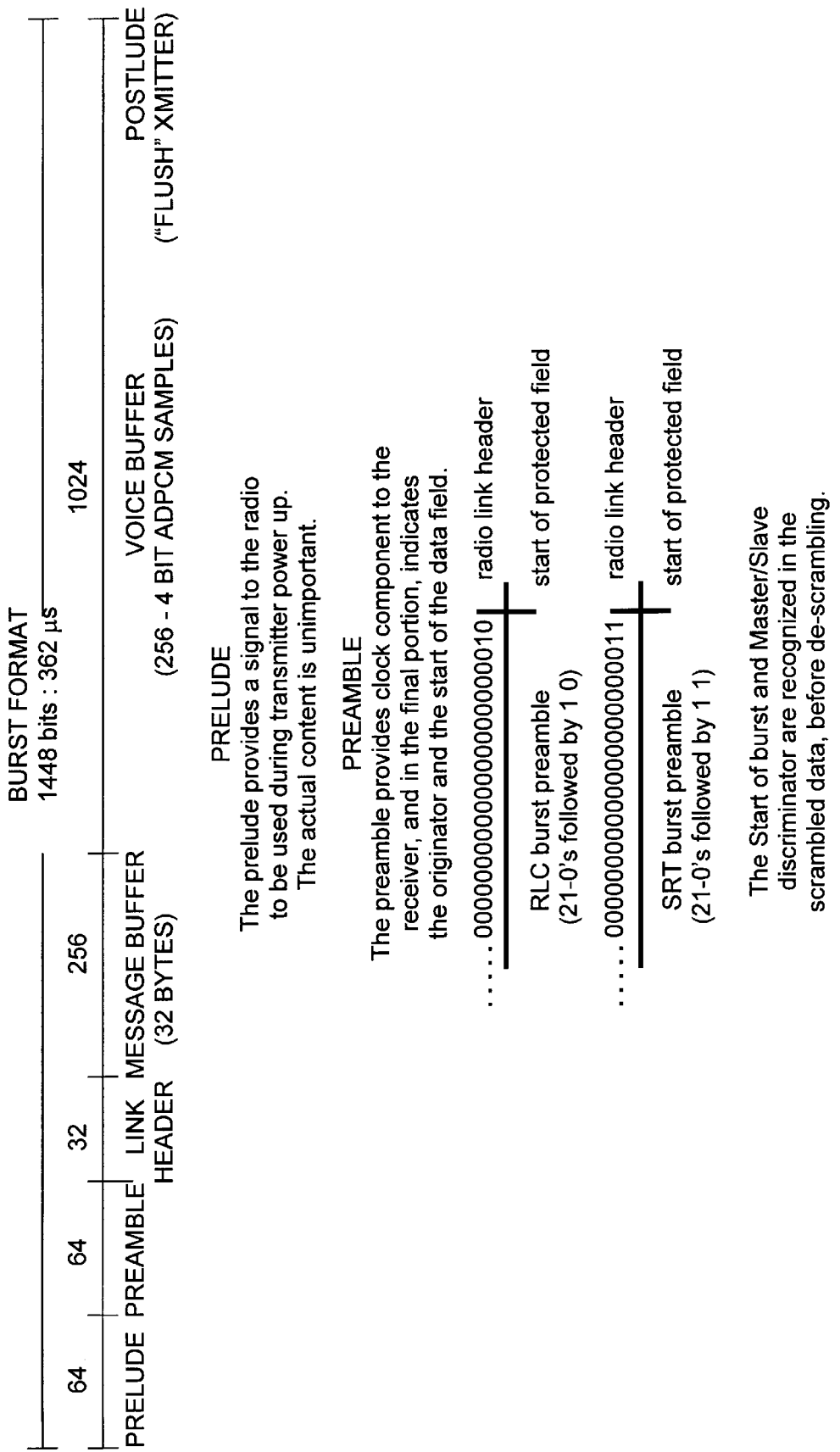
FIG. 8 is a diagram which depicts a burst format used in transmission between a subscriber remote terminal/rural radio transceiver (SRT/RRT) module and an RLC/RTX network node.

The RRT controller (not shown) interfaces with the RRT components depicted in FIG. 7 through RRT control and status circuits 98. For example, control data such as a frequency set point for the synthesized local oscillator 85, transmit/receive sleep mode control, and output power level control are forwarded by the control and status circuits 98 from the RRT controller. In addition, the control and status circuits 98 convey to the RRT controller status information such as transmit/receive signal power level, and a lock status indication provided by the synthesized local oscillator 85. As indicated by FIG. 8, the transmitted data burst includes a 128 bit prelude and preamble followed by approximately 1320 bits of "protected field", in which is included the data to be transmitted. In the preferred embodiment the data within the protected field is transmitted in 362 microsecond bursts.

Different preambles are employed for those transmitting RRT's configured as a MASTER (base station) and for those configured as a SLAVE (subscriber station). Each preamble is utilized to:

(i) facilitate the clock recovery process, (ii) identify the transmitted data as originating from either a MASTER (base station) or a SLAVE (subscriber station) RRT, and (iii) enable the RRT receiving the transmitted data to detect the beginning of the "protected field".

B. SRT/RRT Module

Figure 9:
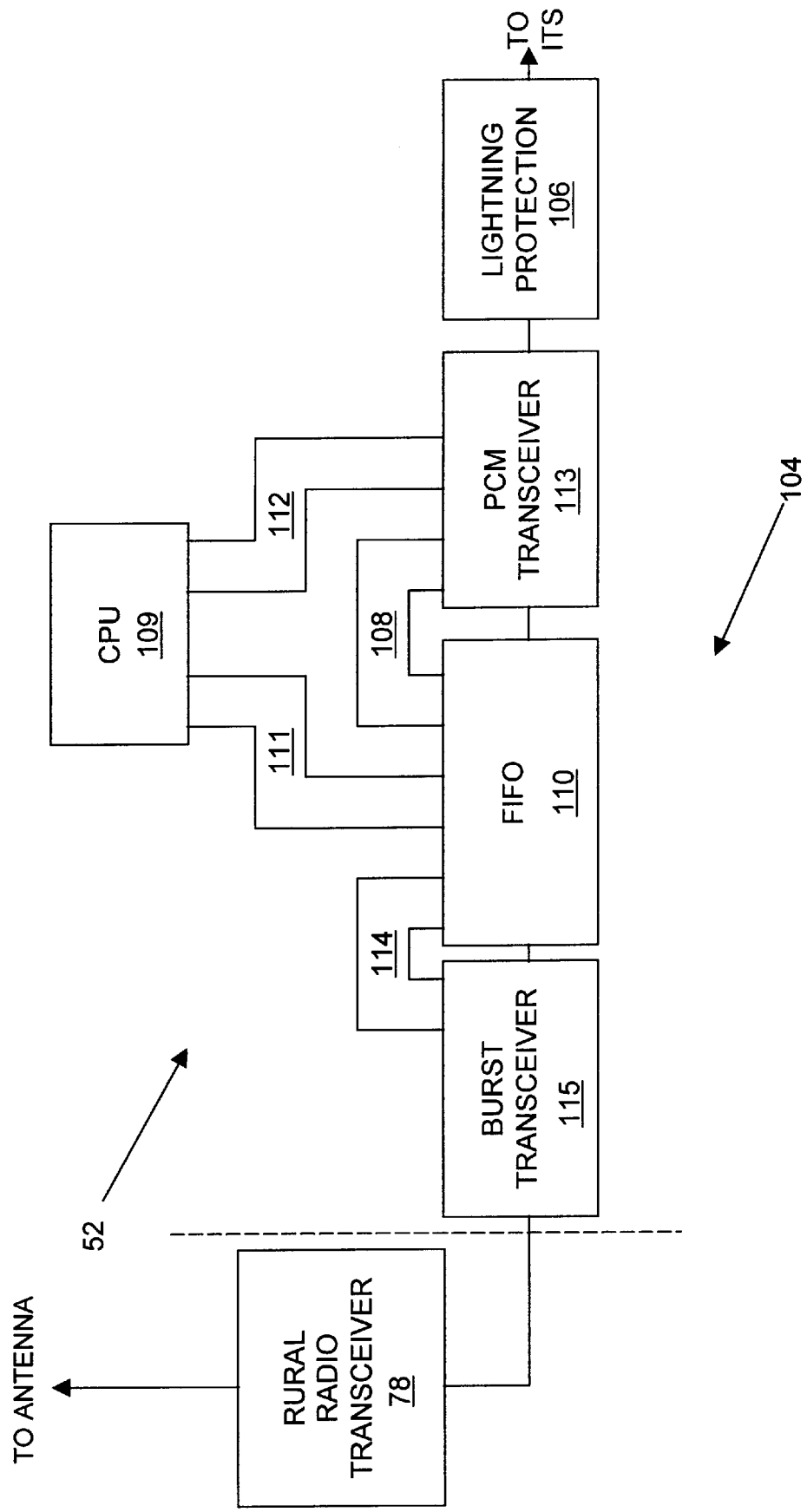
FIG. 9 shows a block diagram representation of a subscriber remote terminal/rural radio transceiver (SRT/RRT) module.

Referring to FIG. 9, there is shown a block diagram representation of the Subscriber Remote Terminal (SRT) 104 included within the SRT/RRT module 52 (FIG. 4A). A multiplicity of SRT units will typically be deployed about each RTX unit, with each SRT unit providing service to an ITS unit. As was described above with reference to FIG. 7, the RRT 78 of the SRT/RRT module 52 is operative to transmit and receive RF signal energy through an antenna (not shown), thereby establishing communication with the local RTX. Control information is provided to the Control and Status Circuits 98 (FIG. 7) of the RRT by a series of control leads connected to a number of circuits throughout the SRT.

The SRT 104 must provide for reliable radio communication between the one or more local ITS units associated therewith and the RTX unit responsible for covering the area in which the SRT is situated. An SRT is typically linked via twisted pair cable to each ITS for which it provides service. The SRT/ITS link, generally of a length of less than approximately 1 km, may comprise either a standard two-wire analog interface or an all digital interface. In the preferred embodiment the ITS is equipped with a CODEC (i.e., coder-decoder) for converting digital transmissions from the SRT into analog form. In addition, the ITS is designed to perform call initialization functions such as set ringing, tone decoding, echo cancellation, and the like. In systems including such digital ITS units, each companion SRT is designed to provide:

(i) battery level monitoring and "low-battery" alarm capability, (ii) signal strength measurement and "low-signal" alarm capability, and (iii) transmit power control.

In alternate implementations the SRT is designed to include the following for support of standard telephone sets:

(i) a generator for producing "battery" and ringing voltages, (ii) a CODEC for converting digital transmissions from the RTX into an analog form suitable for processing by a standard telephone, (iii) provision for generation of audible signaling tones (e.g., by way of the CODEC), and (iv) control of the CODEC, tone generator, and telephone ringer unit.

The SRT may also optionally be configured to perform the following on a per channel basis:

(i) tone decoding for signal acquisition, and (ii) switchable echo cancellation.

Referring again to FIG. 9, the voice signal from an ITS unit is coupled to the SRT 104 through lightning protection circuit 106. In a preferred implementation the SRT/RRT module is positioned on a mast or tower to facilitate radio communication, and hence relies upon the lightning protection circuit 106 to dissipate high-energy transients such as lightning and the like. The received voice signal is provided to a pulse code modulation (PCM) transceiver 113, which is preferably realized as a standard Universal Digital-Loop Transceiver such as a Motorola MC145422/26 Universal Digital-Loop Transceiver (UDLT). The radio transceivers will preferably be capable of providing full duplex synchronous 32 kbps ADPCM voice channel communication, as well as providing a pair of 8 kbps signaling channels. One of the signaling channels is reserved for serial messaging between the ITS and the RTX (via the SRT), and the other for handshaking between the ITS and SRT.

The resultant pulse code modulated digital signal is transferred from the PCM transceiver 113 over a PCM bus 108 into FIFO buffer 110. Message advance, call control and RRT control information are provided by a microcontroller (CPU) 109 (e.g., a Motorola 68 HC11) over a first 111 and a second 112 internal SRT bus. A third internal SRT bus 114 serves to digitized voice data and messages between FIFO 110 and a burst transceiver 115. In a preferred implementation the burst transceiver 115 packetizes the information provided by bus 114 into a form suitable for burst transmission by the RRT 78. As will be appreciated by those skilled in the art, the SRT 104 operates in a complementary manner to process packetized data/message information received from the RRT 78.

C. RLC/RRT Module

Figure 10A:
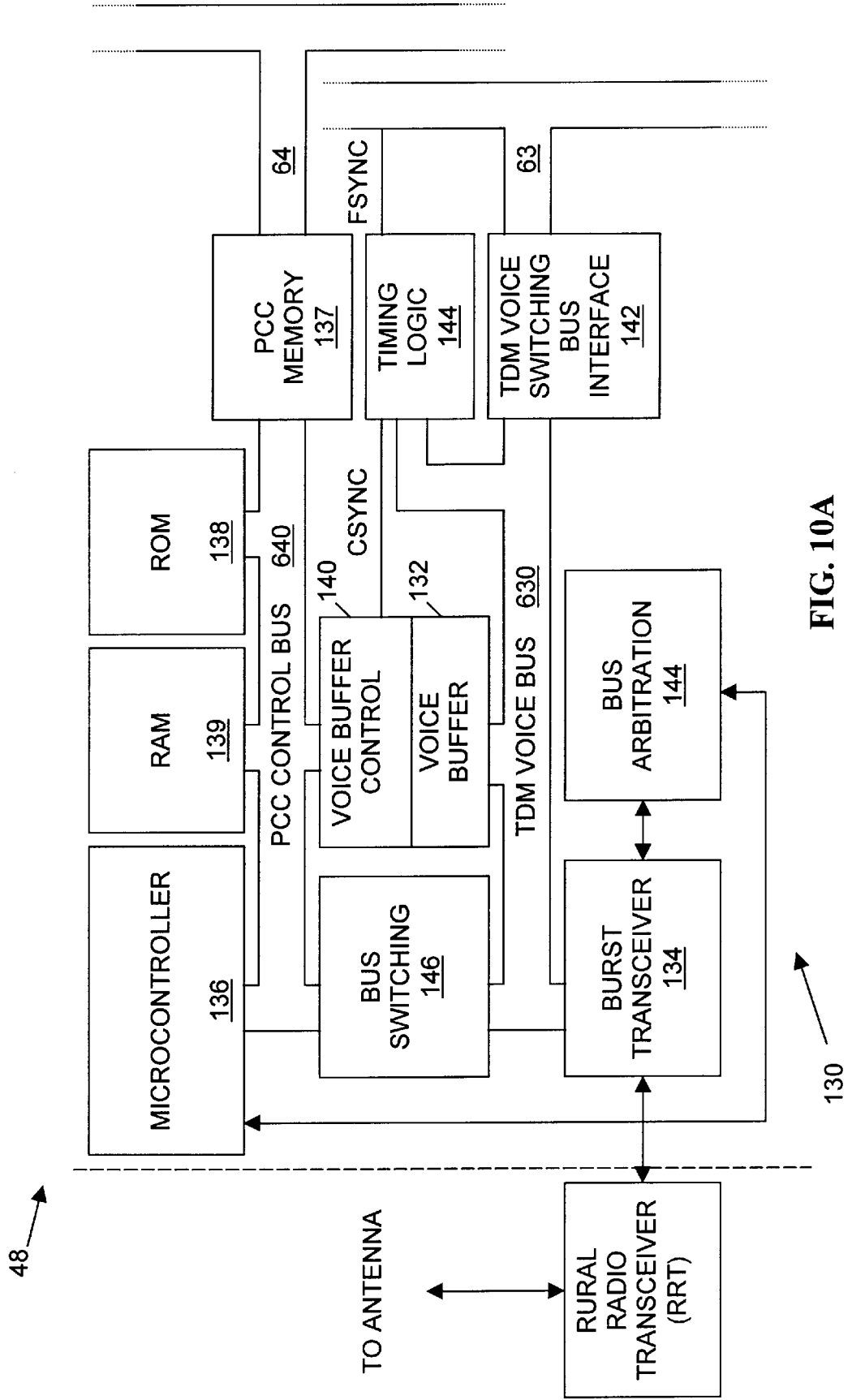
FIG. 10A shows a block diagram representation of a radio line card/rural radio transceiver (RLC/RRT) module.

Referring to FIG. 10A, there is shown a block diagram representation of the Radio Line Card (RLC) 130 included within the RLC/RRT module 48 (FIG. 4A). The RLC serves as an interface between an RTX and an associated RRT with respect local loop or subscriber access.

As is indicated by FIG. 10A, the RLC 130 includes a voice buffer 132 for storing voice data sent to, and received from, each ITS unit with which the RTX unit 20 (FIG. 4A) is in communication. In an exemplary implementation the voice buffer 132 is capable of storing a predetermined amount (e.g., 32 ms) of voice data, and includes 32 transmit mode and 32 receive mode entries. Each entry within the voice buffer is reserved for an ITS unit to which the RTX unit has assigned a communication channel (i.e., a TDMA time slot), and contains 32 bytes of information and 10 bytes of register data. Data is transferred, over the TDM bus 63 and through a burst transceiver 134, at an exemplary 8 kbps rate. The burst transceiver 134 may be implemented using, for example, a Motorola Dual channel Data Link Controller MC145488 or equivalent, and performs rate adaptation between the burst rate (e.g., 4.0 Mbps) of the RRT and the TDM bus.

The RLC 130 is seen to include a microcontroller 136, such as an 80C186 microprocessor or the like, operative to govern message relay between the RRT and the Common Control of the associated RTX unit. A PCC memory 137 is provided for exchanging message information between the Common Control PCC bus and an internal PCC control bus 640. An Interrupt Handler Routine stored within read-only memory (ROM) 138, and executed by microcontroller 136, is responsible for conducting this message exchange. The Interrupt Handler also directs:

(i) the loading and unloading of the voice buffer 132,
(ii) the provision of messages on a section by section basis to burst transceiver 134 for relay to the RRT, where the burst transceiver 134 uses Direct Memory Access (DMA) to transfer data to and from random access memory (RAM) 139, and
(iii) assembly of messages received from the RRT, and stored within PCC memory 137, for relay to the Common Control of the RTX.

Additional routines stored within ROM 138, and executed by micro-controller 136, also set the frequency and power level of the RRT, and poll each of the ITS units in communication with the RLC 130.

Referring again to FIG. 10A, the RLC 130 further includes a TDM voice switching bus interface 142 operative to connect the voice channels on the internal TDM voice bus 630 to the time slots of the TDM bus 63 of the Common Control. The bus interface 142 is preferably implemented as a crosspoint switch, and operates to write the data stored within the 32 entries of voice buffer 132 into the corresponding 1024 time slots of TDM bus 63. A bus arbitration unit 144 is provided for arbitrating among any competing requests, for access to the TDM voice bus 630, made by the TDM bus interface 142, the burst transceiver 134 and the microcontroller 136.

Figure 10B:
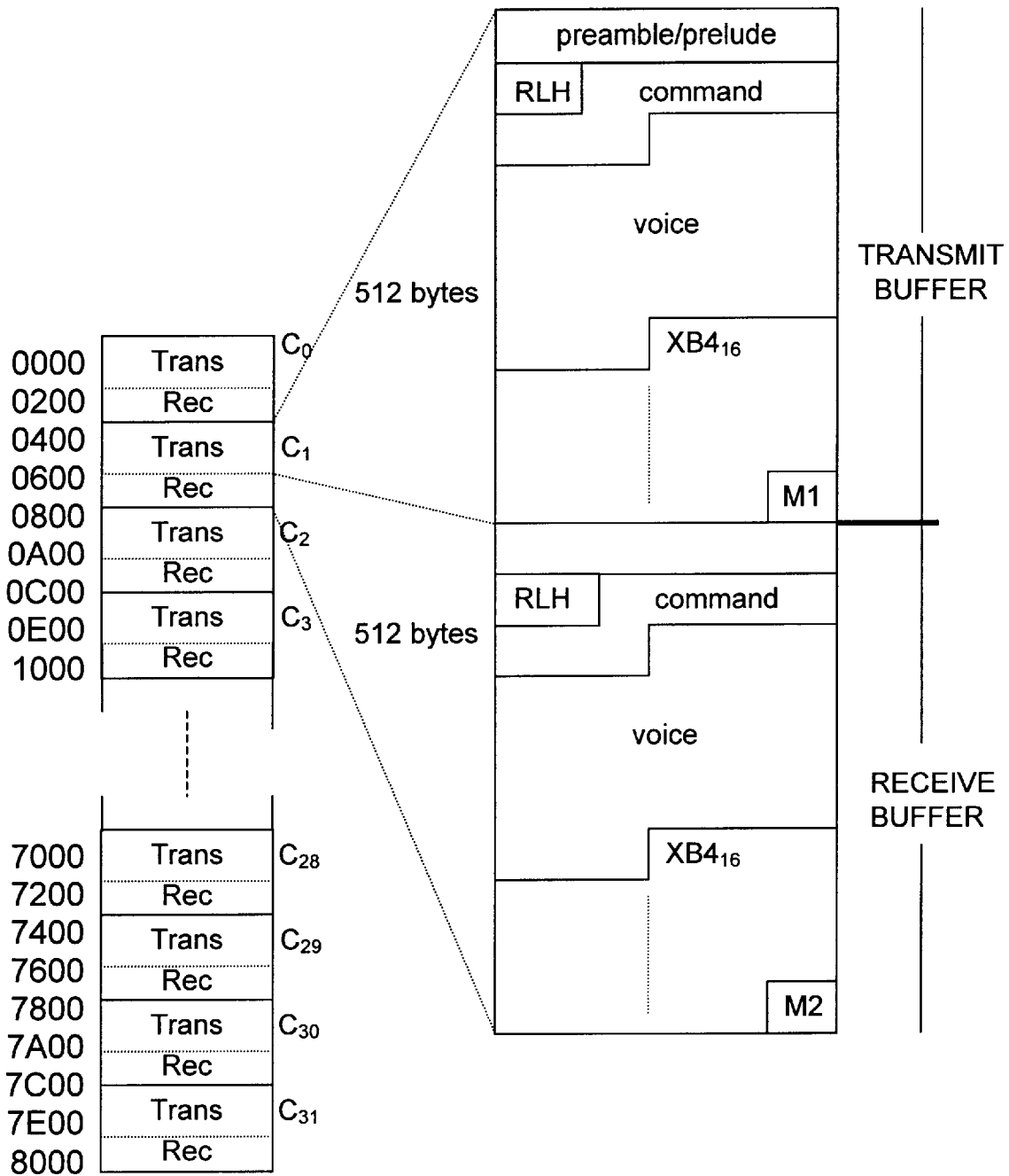
FIG. 10B provides an illustrative representation of the organization of a voice buffer included within the RLC of FIG. 10A.

Turning now to FIG. 10B, an illustrative representation is provided of the organization of the voice buffer 132. As is indicated by FIG. 10B, the voice buffer stores the contents of the 32 transmit and 32 receive channels ($C_0$–$C_{31}$) off the RLC carried by the TDM bus. Each of the transmit and receive channels is mapped to an assigned slot within the TDM bus by the microcontroller 136, under the direction of messages from the RTX Common Control conveyed over the PCC bus 64. The TDM time slot to which each transmit and receive channel is mapped is identified by a 16-bit word included within the last two bytes of each entry within the voice buffer 132.

In the exemplary representation of FIG. 10B, the contents of Transmit and Receive Channel $C_2$ is shown in further detail. The Preamble/Prelude is nominally of 16 bytes, and serves to synchronize the operation of the recipient SRT/ITS unit. Byte M1 of Transmit Channel $C_2$ indicates to which of the 32 TDM channels will be written the voice data stored within this transmit channel of the voice buffer 132. A separate bit in each voice buffer entry is set if the entry is "in use". An entry is in use if it is currently accepting data from, or supplying data to, the TDM bus 63. The command field includes three levels of call processing messages exchanged between an SRT/ITS unit and the RLC associated therewith. These include messages such as, for example, ITS Connect, ITS Disconnect, ITS Alert, ITS tone command, ITS Dial Ack, ITS Status, and other call processing messages of like type.

In the exemplary implementation of FIG. 10B, the voice field includes 256 bytes of voice payload followed by two bytes of trailing data. The entry identified as XB4 nominally includes 196 spare (unassigned) bytes. Finally, the Radio Link Header (RLH) typically comprises 4 bytes of information, and includes:

(i) an encoded SRT address,
(ii) status of the communications link between the RLC/RRT and a given SRT/ITS unit,
(iii) terminal routing information,
(iv) data packet length, and
(v) a redundant checksum.

Referring again to FIG. 10A, voice buffer control 140 operates to govern transfer of information between the voice buffer 132 and the TDM bus 630. Voice buffer control 140 is synchronized to the TDM bus 630 via a signal timing control logic 144, which is keyed to 4 kHz Frame Sync (FSYNC) signal provided by Common Control. In response to receipt of the PSYNC signal, the timing control logic 144 begins counting TDM time slots (beginning from slot 0) and provides the current TDM slot value to voice buffer control 140 by way of a Channel Sync (CSYNC) signal. The current slot number, as defined by CSYNC, serves as an index for the voice buffer control 140 into the voice buffer 132. Specifically, the CSYNC signal results in the voice buffer control 140 marking as "in use" the corresponding entry within the voice buffer 132. When an entry in the voice buffer is marked as "in use", data is transferred between the entry and the corresponding time slot of the TDM bus 63.

The RLC 130 is operative in either a "polling" mode or an "assignment" mode. In the polling mode, the RLC sends interrogatory messages to the SRT/ITS units in the coverage area of the RTX. A given ITS will respond only if it is in an "active mode", and looking for an available channel. As is discussed below, each ITS is capable of functioning in either a "sleep" mode (i.e., a low-power standby mode), or in an "active" mode. Active mode operation is triggered in response to, for example, detection of a burst transmission from the RTX or a handset "off-hook" condition.

During both polling and assignment modes the microcontroller 136 fetches, from microcontroller memory 138, an SRT number from a map of those SRT's disposed within the RTX coverage area. The fetched SRT number is then written into the "in use" address within the transmit portion of the voice buffer 132, and other control bits are written to the "in use" address specifying either polling or assignment mode operation. Any reply received from the polled SRT is then written into the address of the same number within the receive portion of the voice buffer 132.

D. RTC/RRT Module

Figure 11:
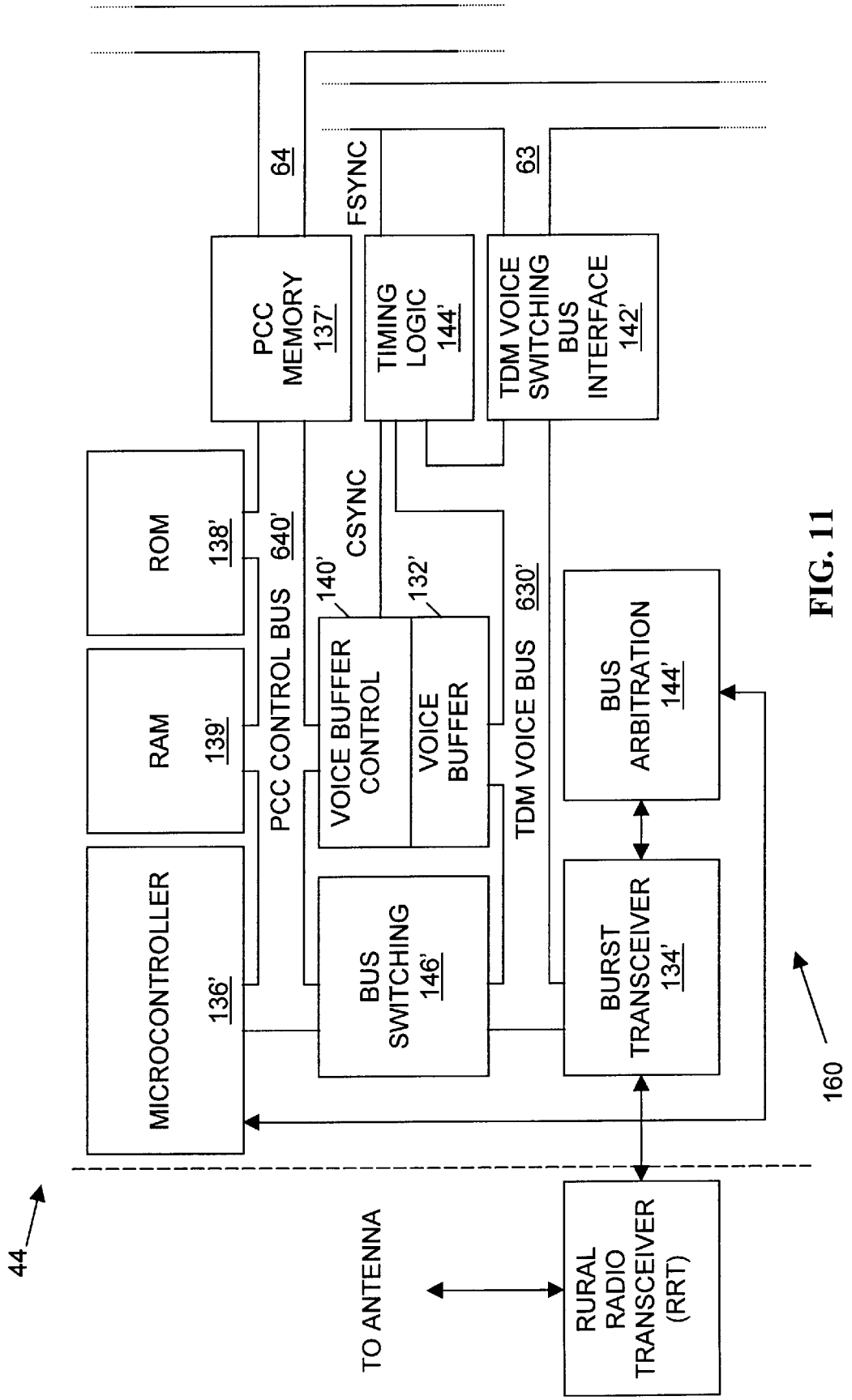
FIG. 11 shows a block diagram representation of a radio trunk card/rural radio transceiver (RTC/RRT).

Referring to FIG. 11, there is shown a block diagram representation of the Radio Trunk Card (RTC) 160 included within the RTC/RRT module 44 (FIG. 4A). As is evident from a comparison of FIGS. 10A and 11, the RTC 160 is implemented in a substantially similar manner as the RLC 130. Accordingly, primed reference numerals are used to identify network elements in FIG. 11 corresponding to those in FIG. 10A. The Interrupt Handler and other software routines governing operation of the RLC 130 and RTC 160 differ to the extent required to support the TDMA and TDM frame structures described with reference to FIGS. 3 and 4. In a preferred implementation the voice buffer 132' of the RTC need only be capable of storing approximately 1 ms of data, hence requiring approximately only 2 kb of memory space.

The RTC 160 facilitates communication between adjacent RTX units, or between an NIX and an RTX unit, by way of 31 digital voice channels and one Common Control signaling channel. Inter-node communications correspond to those time division multiplexed (TDM) communications between NIX and RTX units, as well to TDM communication between a pair of RTX units. In an exemplary embodiment the internode TDM bus includes 32 channels, of which 31 are typically used to support voice communication and one is utilized for internode communication. Channel zero serves as a dedicated high speed serial control channel for maintaining synchrony between the data buses of receiving and transmitting RTX and NIX units. Call routing, data transfer, program updating, alarm transfer, diagnostic procedures and other signaling information is transferred over channel zero.

The 32 channels are transmitted over RTX/RTX or RTX/NIX links at an overall rate of 32 kbps, and are buffered in the voice buffer 132 of the RTC 160. The RTC burst transceiver 134 transmits/receives data in 256-4 bit packets, at a rate of 31.25 packets per second (i.e., 4.0 Mbits/sec). An additional register (not shown) on the RTC 160 is used to select one of several clocking modes.

RTC/RLC Mute Mode

During certain conditions the RTC and RLC cards may be blocked from writing to either the TDM or PCC buses. This blocked-write mode, referred to as mute mode, is set automatically during system Power-on Or Reset (POR). During mute mode operation the local microcontroller will perform the requisite diagnostic and initialization functions. Once the interface card has been initialized, the microcontroller will again enable the TDM and PCC bus drivers for write access.

Mute mode may also be set by the microcontroller if an operational fault is detected, or if it is so directed by the Common Control. In the latter case, the microcontroller can continue to receive PCC messages and hence remains vigilant with respect to issuance of a reactivation message from the Common Control.

V. Detailed Description of Network Elements

A. Rural Telephone Exchange (RTX)

As was described with reference to FIG. 4A, the RTX unit 20 is connected to an RTC/RRT module 44 operative to communicate with the RTC/RRT 40 module. The RTX unit 20 is also connected to a radio line card (RLC), in combination with a rural radio transceiver (transmitter/receiver) (RRT), which collectively facilitate communication with the intelligent telephone set (ITS) 12.

Figure 12:
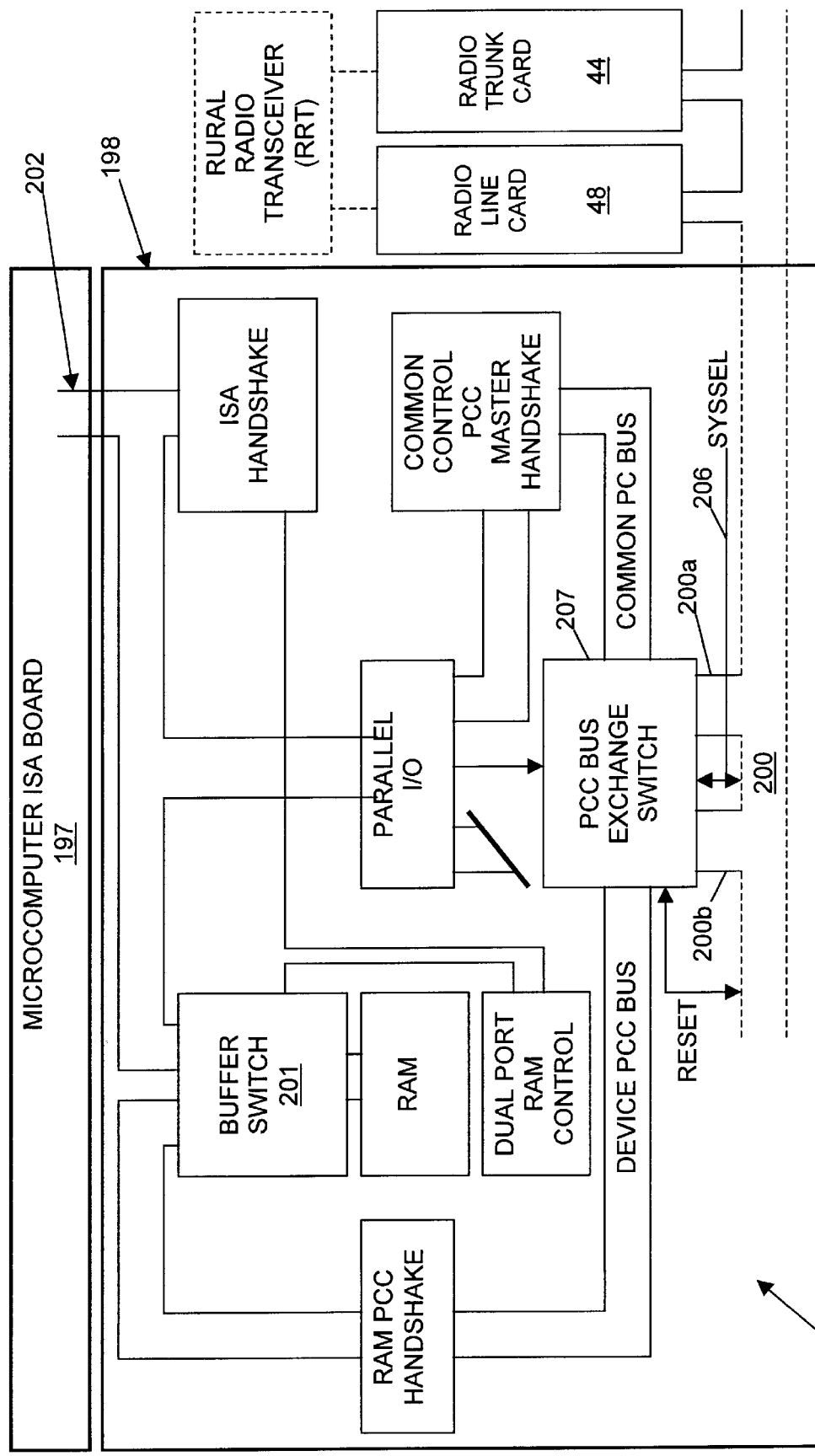
FIG. 12 provides a more detailed block diagram representation of a preferred implementation of an RTX Common Control unit.

FIG. 12 provides a more detailed block diagram representation of a preferred implementation of an RTX Common Control unit suitable for inclusion in the RTX unit 20. The RTX Common Control unit includes a Common Control interface circuit 196 for facilitating communication between Common Control microcomputer 197 and the RLC/RRT 42 and RTC/RRT 44. In an exemplary embodiment the microcomputer 197 is realized using the motherboard of an IBM PC/AT compatible microprocessor or similar computer microprocessor. The microcomputer 197 controls the operation (e.g., switching, call billing, etc.) of the RTX unit 20 via a selected one of dual Parallel Common Control (PCC) buses 200a and 200b. The PCC buses 200a and 200b communicate with the RLC/RRT and RTC/RRT units 42 and 44 by way of a PCC backplane bus 200. The backplane bus 200 contains the PCC and TDM buses into which all modules interface, and hence is shown in phantom in FIG. 12.

In a preferred embodiment a redundant Common Control unit, having a separate microcomputer (not shown), may be provided for the purpose of ensuring the system continues to function in the event that microcomputer 197 becomes inoperative. The redundant microcomputer will typically monitor system status should it be required to assume system control. Redundant PCC buses 200a and 200b are provided for establishing communication between the pair of Common Control microcomputers and the RLC/MT and RTC/RRT units 48 and 44, respectively.

The interface circuit 196 translates standard ISA signals received from the microcomputer ISA bus 202 into a predefined format supported by the PCC buses 200, 200a and 200b. In a preferred embodiment the PCC buses includes a single 1024 kbyte address space from which 16 bits (i.e., two 8-bit bytes) are accessible at any one time. The interface circuit 196 also provides a common RAM 204 for dual Common Control board communications, as well as reset, alarm, interfacing and Common Control switchover operations.

Each PCC bus 200a, 200b may be characterized as an unlocked, asynchronous data bus operative to transfer a complete data word (16 bits) between RTX Common Control unit and a single PCC device (e.g., the RLC 48 or RTC 44). The two PCC buses 200a and 200b are either controlled by a pair of redundant RTX Common Control units, or are controlled one at a time by a single Common Control unit. In a dual Common Control system, one Common Control unit is actively controlling the system through an "active" one of the PCC buses 200a, 200b, while the other waits in a standby mode and monitors system status via the "inactive" PCC bus should it be required to assume system control.

A SYSSEL line 206 activates a first pair of PCC and TDM buses, which are used by the active Common Control. A state change of the SYSSEL line 206 causes PCC bus exchange switch 207 to activate the second PCC/TDM bus, but in an RTX having dual Common Control this state change does not automatically result in switching between the active/inactive Common Control units. Should the SYSSEL line 206 change state independent of a change in Common Control, the Common Control units would need to swap connections to the PCC buses 200a and 200b. The SYSSEL line 206 is also supplied to the system PCC devices (e.g, the RLC 48 and RTC 44), and hence provides each interface card an indication of the appropriate PCC and TDM buses to be used. In an RTX having a single Common Control, either of the PCC buses 200a, 200b may be designated as active by the SYSSEL line 206.

Data is transferred between RTX Common Control during either a read cycle, a write cycle, or a read/write cycle. In a write cycle data is transferred from the RTX Common Control unit to a PCC device, in a read cycle data is transferred from a PCC device to the RTX Common Control unit, and in a read/write cycle data is transferred in both directions. In all cases the PCC device involved drives a READY line upon completion of the requisite action. Upon system initialization or reset an address cycle is performed in which the Common Control memory address to be involved in the first data transfer cycle is latched into each PCC device. Upon completion of the first data transfer operation (e.g. a read, write, or read/write), the address within each PCC device is incremented. This allows block data transfers to be performed without requiring address information to accompany each transferred data byte transferred, since in the following address cycle the RTX Common Control latches the next memory address into each PCC device.

B. Network Interface Exchange (NIX)

Figure 13:
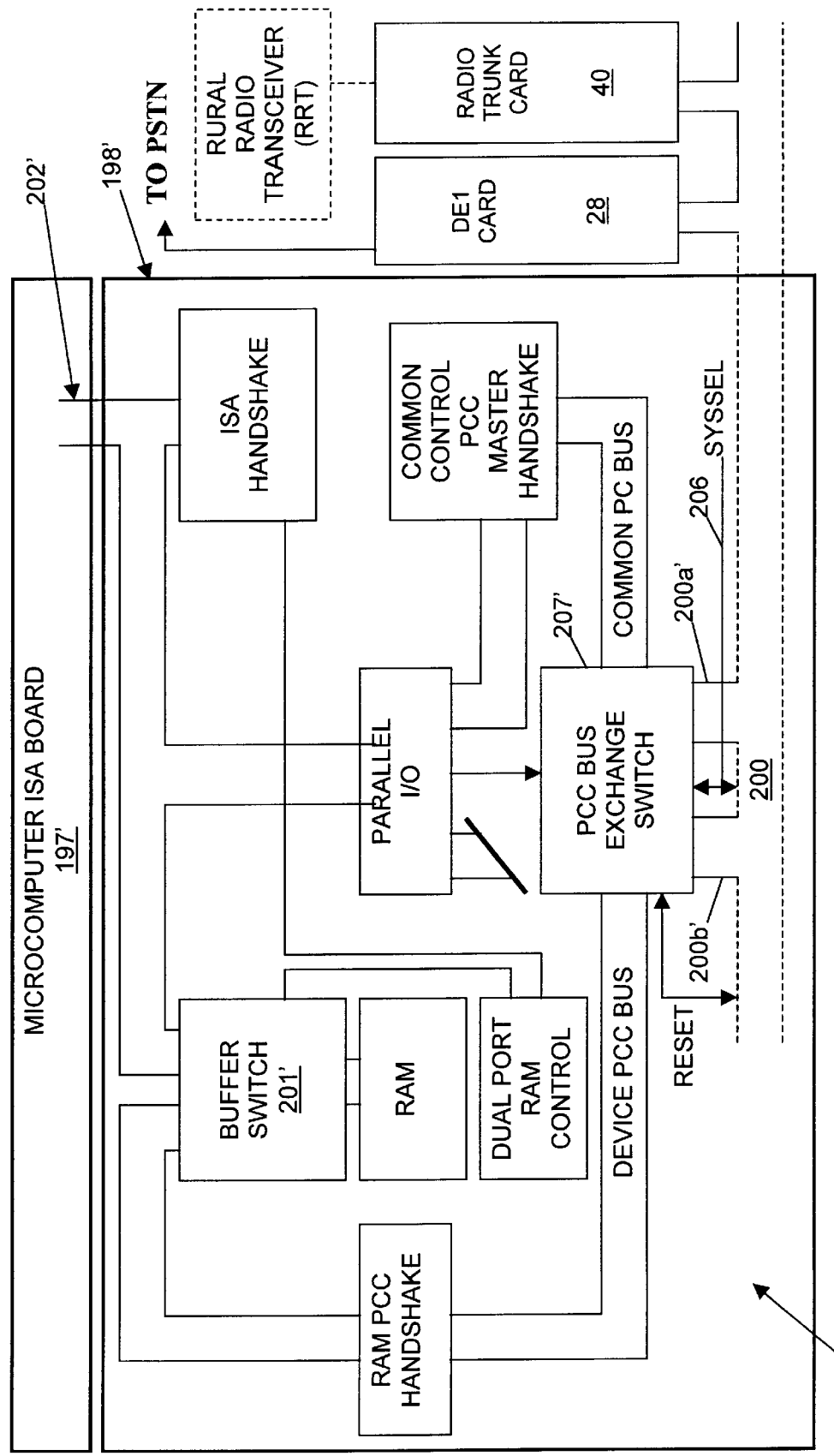
FIG. 13 provides a functional block diagram of a preferred implementation of an NIX Common Control unit.

Referring to FIG. 13, a functional block diagram is provided of a preferred implementation of an NIX Common Control unit. The NIX Common Control unit is seen to be substantially similar to the RTX Common Control unit, and hence like reference numerals are employed to identify like circuit elements. The NIX Common Control unit interfaces with the radio trunk card (RTC) 40, in combination with a rural radio transceiver (RRT), which collectively facilitate trunked radio communication with an RTX unit. The NIX is also operatively connected to the PSTN through the DEI interface card 28.

The NIX Common Control unit includes a Common Control interface circuit 196' for facilitating communication between Common Control microcomputer 197' and the DEI card 28, and between microcomputer 197' and RTC/RRT 40. In an exemplary embodiment the microcomputer 197' is realized using the motherboard of an IBM PC/AT compatible microprocessor or similar computer microprocessor.

The remaining elements of the NIX Common Control unit function in a manner substantially similar to that described above with reference to the corresponding elements of the RTX Common Control unit.

C. DEI Interface Unit

Figure 13A:
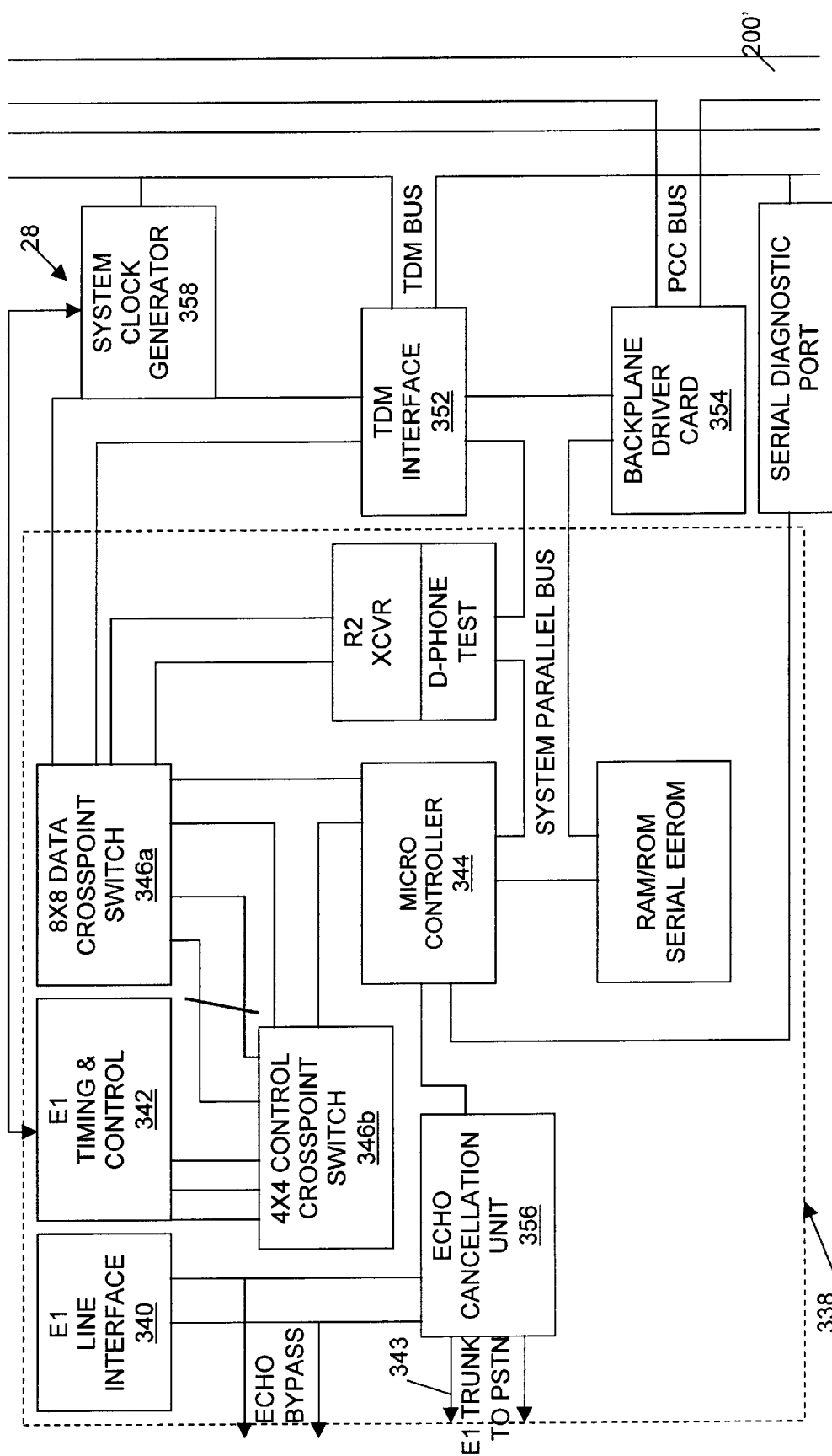
FIG. 13A shows a block diagram representation of a DE1 interface trunk unit.

Turning now to FIG. 13A, there is shown a block diagram representation of the DE1 interface trunk unit 28. The DE1 unit 28 serves as an interface for the trunk line connecting an NIX unit with the Public Switched Telephone Network (PSTN). The framing format, from the PSTN into the NIX, consists of a set 31 channels at rate of 64 kbps. Thirty of the channel time slots carry voice information, one channel (e.g., Channel 16) of each trunk is dedicated to carrying trunk signaling information, and one channel serves to communicate lower level protocols. From the NIX towards the PSTN, the CCITT standard E1 framing is employed (see, e.g., CCITT Recommendation G.703 & G.704 —E1 Specification), with channels 16 and 32 used for conveying signaling information.

Referring to FIG. 13A, an E1 interface 338 realized in compliance with CCITT Recommendation G.703 & G.704—E1 is seen to include the following functional areas:

a) E1 Line interface 340
b) E1 Timing and Control 342
c) DE1 Microcontroller 344
d) Non-blocking crosspoint switch 346a and 346b
e) Serial to Parallel TDM conversion 352
f) PCC interface 354
g) Echo cancellation unit 356

Referring to FIG. 13A, the DE1 microcontroller 344 manages and controls all functions performed within the DE1 interface module 28. A PCM data crosspoint switch 346a and control crosspoint switch 346b, in conjunction with a crosspoint switch (not shown) internal to the TDM interface 352, collectively perform the various channel switching functions executed by the DE1 interface 28.

The TDM interface 352 receives and stores channel assignments in a conventional Field Programmable Gate Array (FPGA). The TDM interface 352 receives channel switching instructions from the microcontroller 344 and the data crosspoint switch 346a. In addition, the TDM interface 352 also performs PCM voice formatting of signals communicated between system RTX units and the PSTN.

The Backplane Driver Card 354 serves as a shared memory interface between the E1 interface 338 and the system Common Control. In addition, the system clock generator 358 operates to extract system timing from the PSTN in order to generate timing for the TDM backplane when the DE1 is operative in a Master Mode.

D. Intelligent Telephone Set (ITS)

Figure 14:
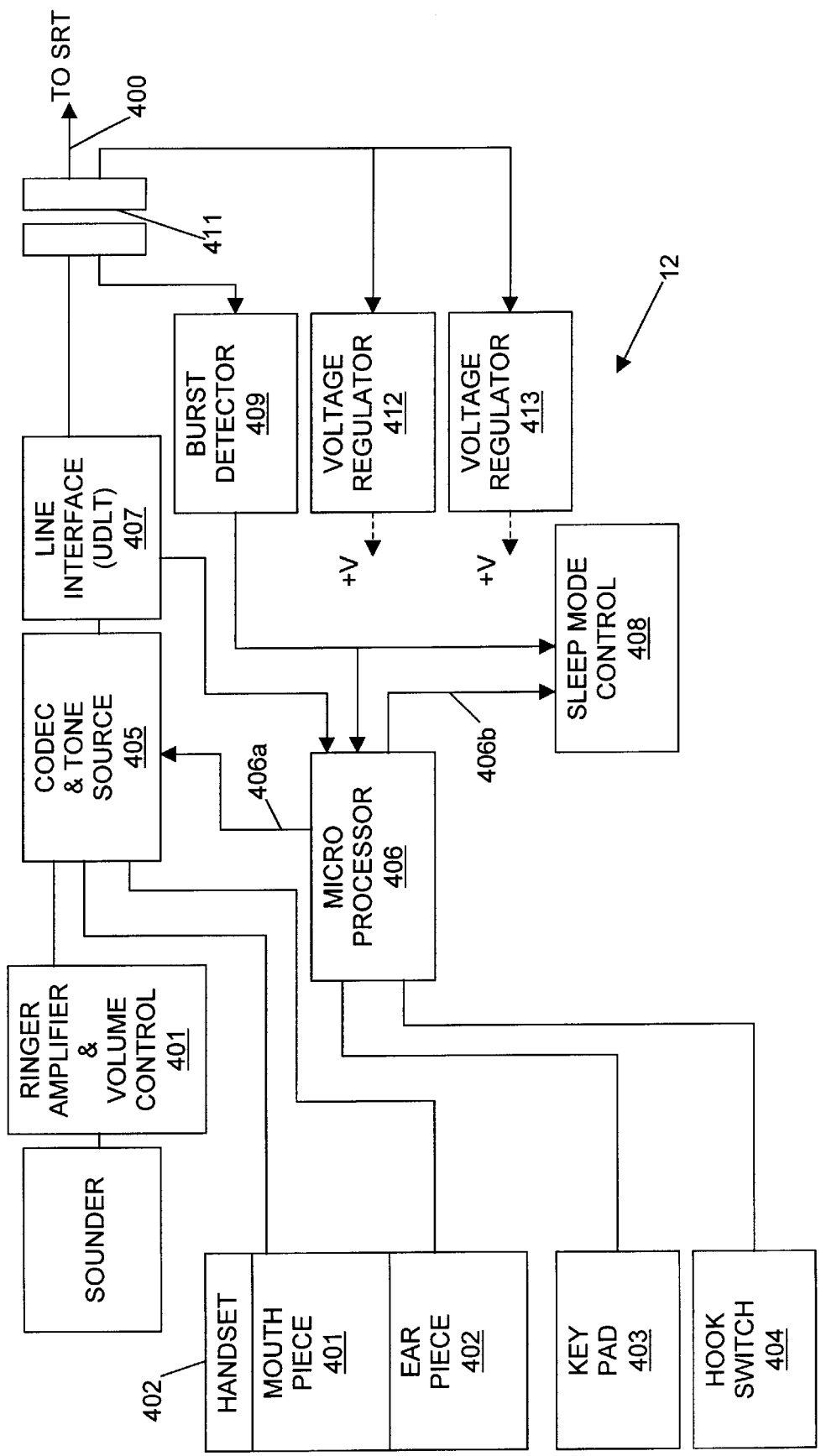
FIG. 14 provides a block diagrammatic representation of an intelligent telephone set (ITS) unit.

Turning now to FIG. 14, there is shown a functional block diagram of a preferred implementation of an intelligent telephone set (ITS) unit 12. The ITS unit 12 is used in place of an ordinary telephone, and serves as the means by which a given subscriber communicates with the user of another ITS or with a PSTN user. Each ITS unit converts the analog voice signal from a subscriber to a digitized PCM format, and arranges the signaling and processing of the telephone call for transmission, via the SRT/RRT 52 (FIG. 4A), to the local RTX unit. In addition, the ITS unit 12 advantageously internally generates a ringing voltage, supplies a dial-tone, and is capable of storing dialed digits, thereby obviating the need for the SRT to provide these functions. As is described below, the ability of each ITS to provide local dial-tone generation and storage of dialed digits preserves network resources by delaying channel allocation until after a call is dialed and transmission of information is required. This contrasts with conventional systems, in which channel resources are consumed from a much earlier time (e.g., upon the telephone handset being taken "off-hook"). In addition, the ITS conserves power by being operative in a quiescent state, or Sleep Mode, until service is requested either from the local RTX unit or from the ITS user.

Referring now to FIG. 14, the ITS communicates directly with an SRT unit (FIG. 9) via 26 AWG twisted pair cable 400. The ITS interfaces with a user through a microphone mouth piece 401 and an ear piece 402 of a handset 402. Mouth piece 401 couples the user's voice signal to a codec unit 405 (e.g., a Motorola MC145540 codec chip) disposed to perform analog to digital encoding using one of numerous conventional speech coding technologies. The resulting digital bit stream is fed to a line interface 407, which includes a transceiver (e.g., Motorola MC 145422/26 Universal Digital-Loop Transceiver, or UDLT) for communicating directly with a master transceiver (UDLT) within the SRT. The pair of UDLTs provide a full-duplex synchronous 32 kbps voice channel, as well as two 8 kbps signaling channels, thereby allowing the ITS to communicate with an SRT up to an exemplary range of approximately two kilometers. The codec 405 and line interface unit 407 are disposed within a main ITS housing unit (not shown).

The ITS 12 further includes a key pad 403 and hook switch 404, both of which are preferably located on top of the main ITS housing unit. Key pad 403 contains a conventional arrangement of pushbuttons corresponding to digits 0–9, and corresponding to the symbols # and *. When a button is pressed, a keypad signal is sent to an 8-bit microprocessor 406, which analyzes the keypad signal using conventional keypad scanning algorithms. The result of the analysis is then provided to a dual-tone multifrequency (DTMF) generator within the codec 405. In addition to controlling tone generation within the codec 405, the 8-Bit microprocessor 406 also processes messages from the RTX.

Hook Switch 404 determines the presence or absence of handset 402 at a predefined hook location upon the ITS main housing, and respectively provides logical off-hook and on-hook signals in response thereto. A logical state change of the off-hook signal initializes a call by awakening Sleep Mode Control 408, which in turn alerts the microprocessor 406 to send dial tone signals 406a to the tone generator in the codec 405. As each key is pressed on the keypad, the corresponding DTMF and the "dialed" digit is stored in a RAM buffer (not shown). After all phone number digits have been entered, a SEND key is pressed and the dialed digits in the RAM buffer are sent via the SRT for recognition and processing within the Common Control of the local RTX.

The ITS is also awakened from Sleep Mode if an incoming burst is detected by burst detector 409, which remains powered-up at all times. Upon being awakened h by burst detector 409, the microprocessor 406 will decode the message sent from the RTX via the Radio Line Card and radio signal. If it is a ringing command, the locally generated ringing generator will ring the ITS.

Similarly, the logical state of the on-hook signal is constantly monitored by the Sleep Mode Control 408 and the microcontroller 406. If on-hook indicates that the handset 402 is in place, microprocessor 406 awakens (406b) sleep mode control 408 upon Burst Detector 409 detecting an incoming call or valid data coupled through line transformer 411. In a preferred embodiment the line transformer 411 is realized as a full-wave bridge rectifier and transformer with built-in polarity protection. The presence of valid communication or decipherable messages upon burst line 409a is determined by the microprocessor 406.

The ITS unit 12 also includes a pair of voltage regulators 412 and 413 coupled to line transformer 411. Voltage regulator 412 provides a voltage +V (e.g., 5 Volts C) to all ITS components requiring power only after the ITS is awakened. Voltage regulator 413 provides a continuous source of voltage (+V) to those ITS components which remain functional even during Sleep Mode standby operation.

VI. Operational Overview

The distributed switching and call routing of the present invention may be conveniently described with reference to the call state diagrams of FIGS. 15–17. These diagrams represent the message exchange involved in the establishment of a connection from a calling ITS to an originating RTX node, as well as the messaging accompanying the subsequent transfer of the call to a terminating network node via an intermediary node.

Figure 15A:
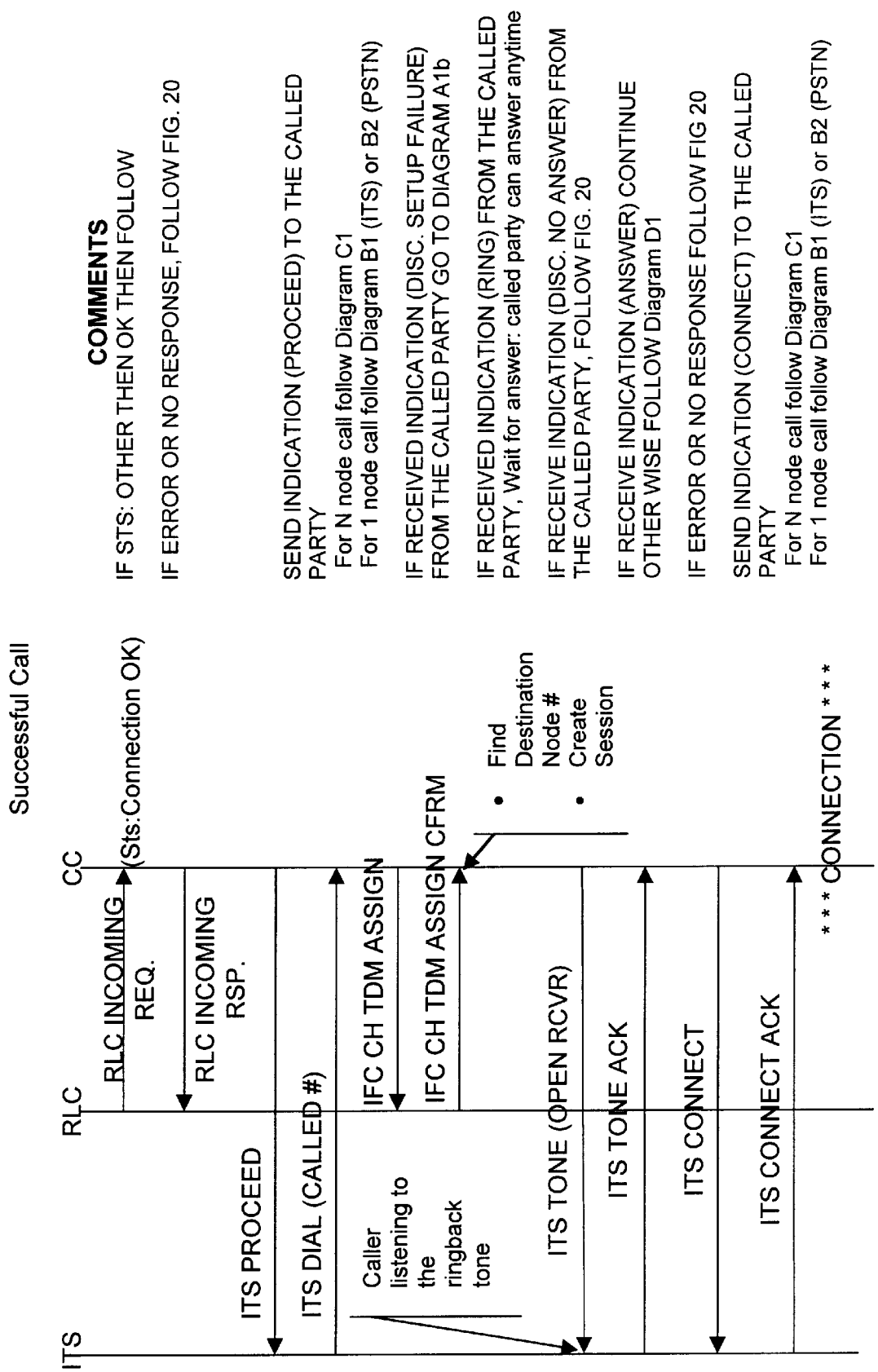
FIG. 15A shows an exemplary message sequence occurring upon initiation of a call by an ITS within the system of the invention.
Figure 15B:
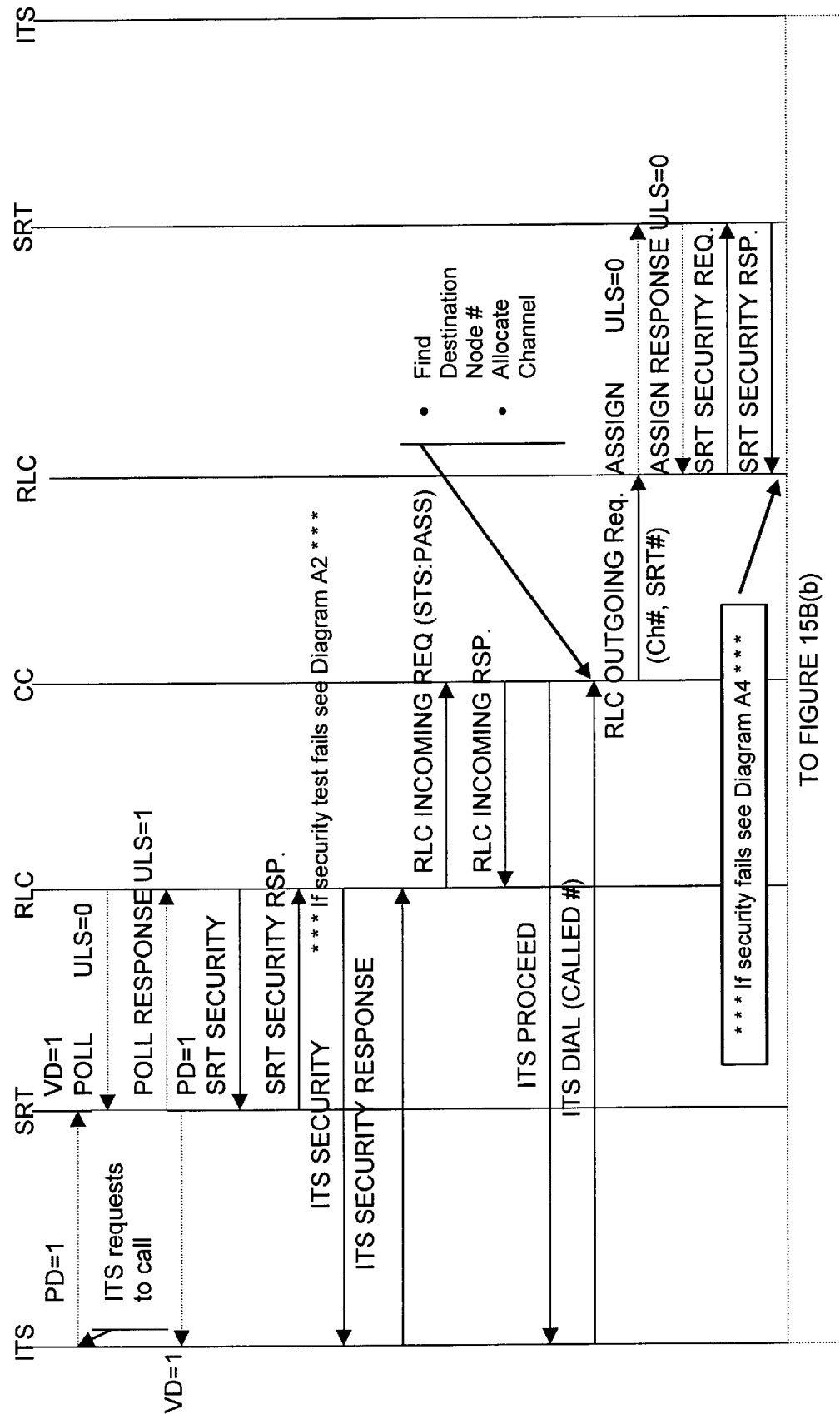
FIG. 15B illustratively represents the message exchange occuring between an ITS and a system node during an ITS Security Check.
Figure 15B:
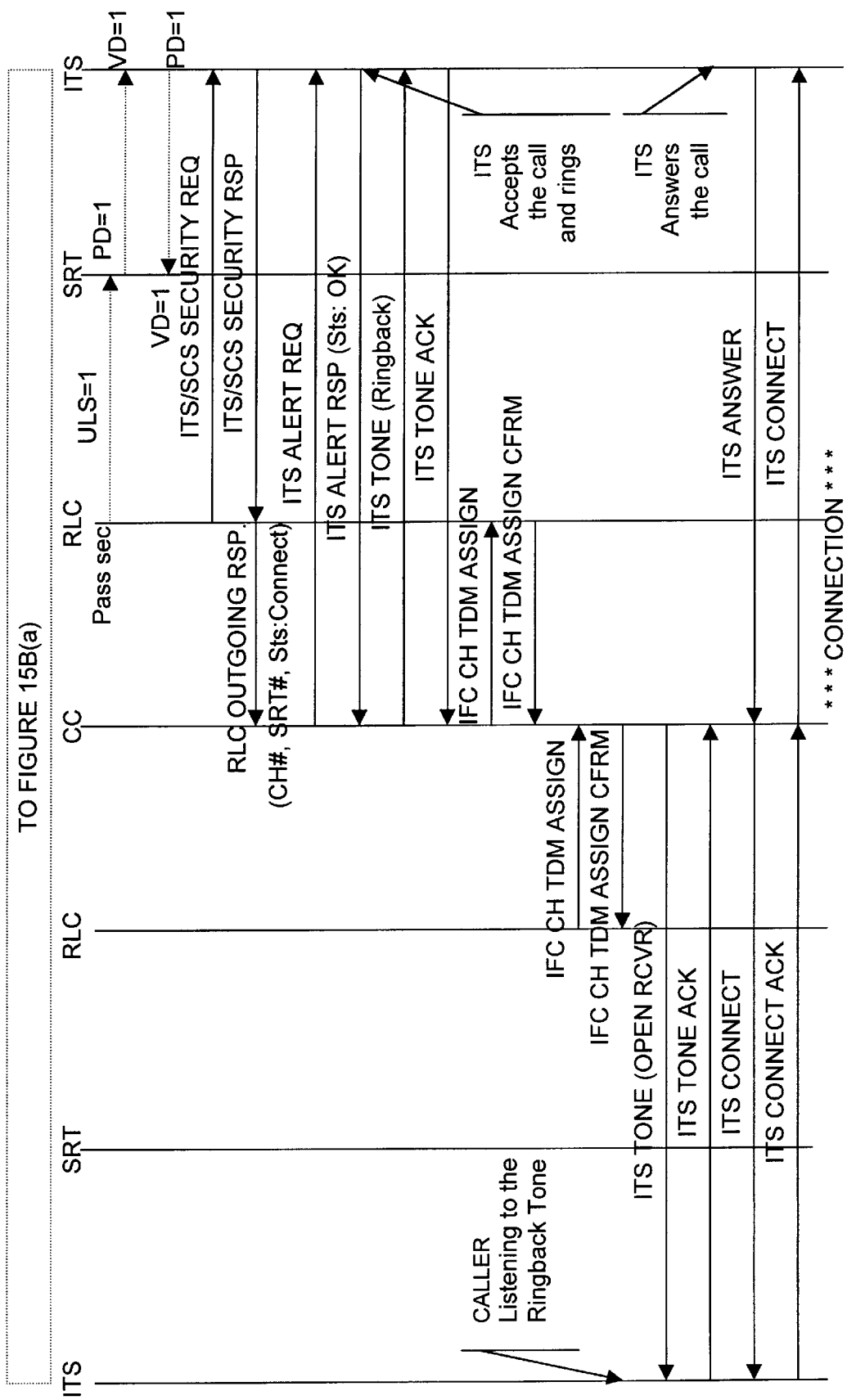
Figure 16:
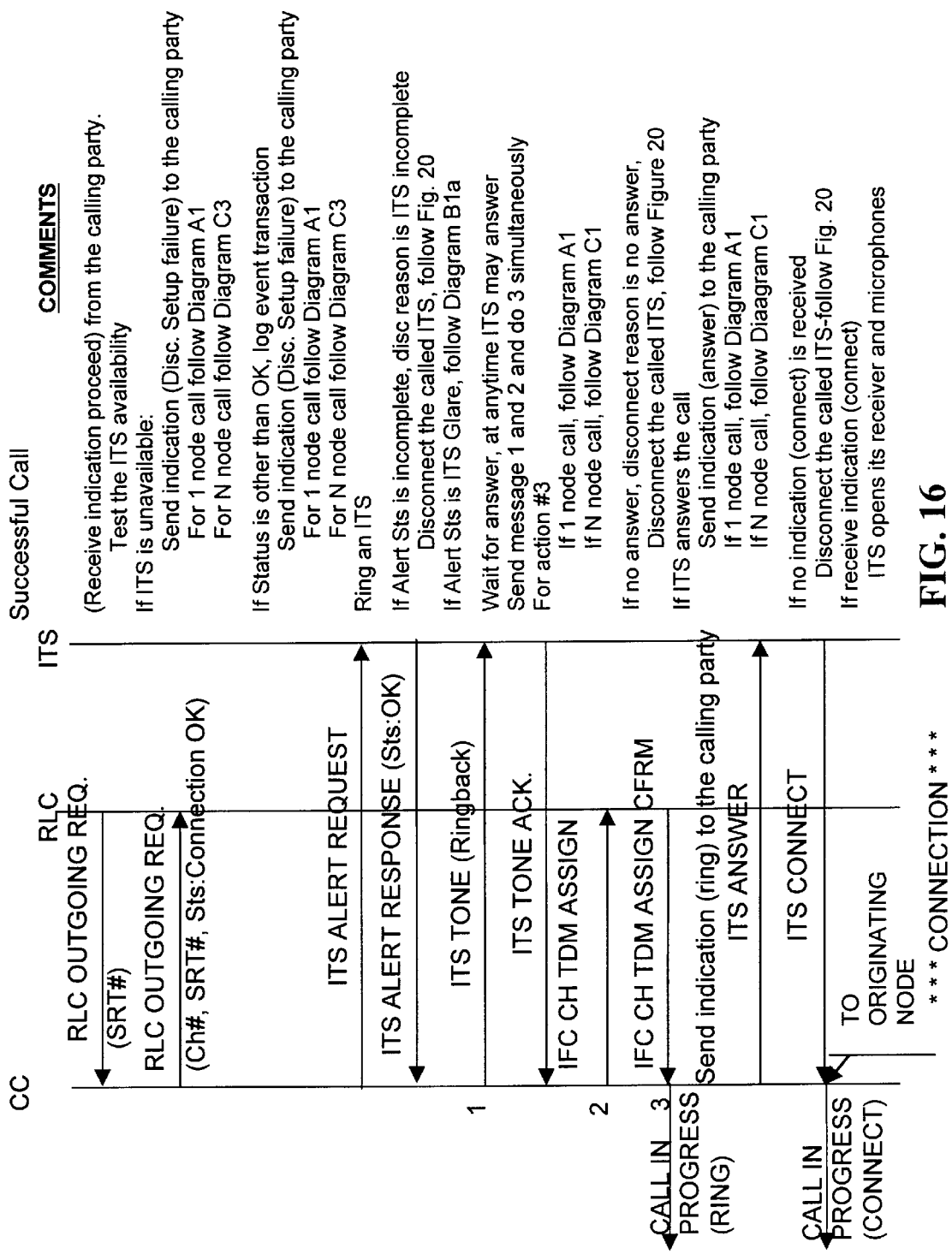
FIG. 16 shows an exemplary message sequence occurring subsequent to call termination to an ITS within the system of invention.
Figure 17A:
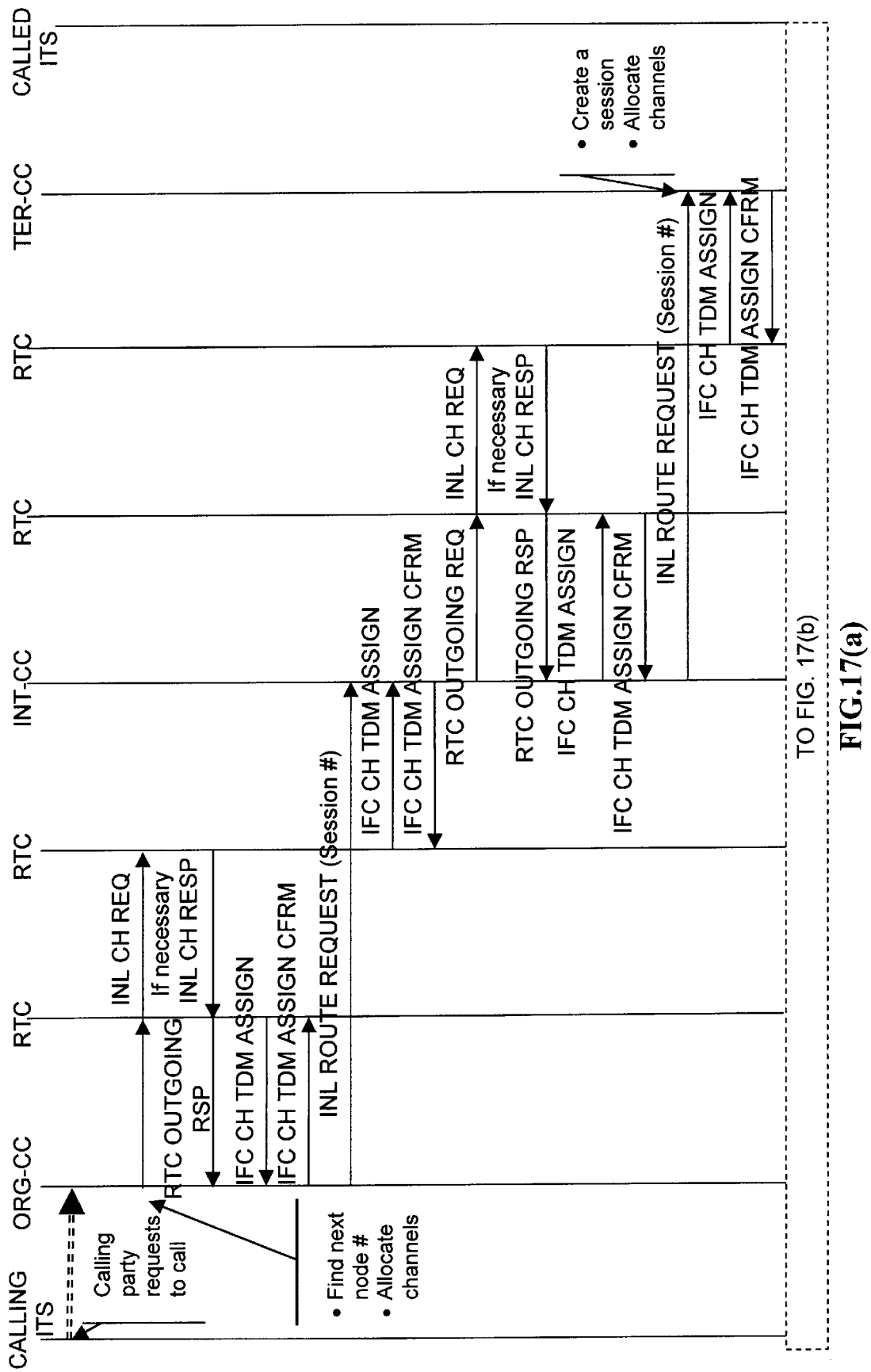
FIG. 17 depicts the message flow occurring upon placement of a call by an ITS unit to another ITS unit included within the network.
Figure 17B:
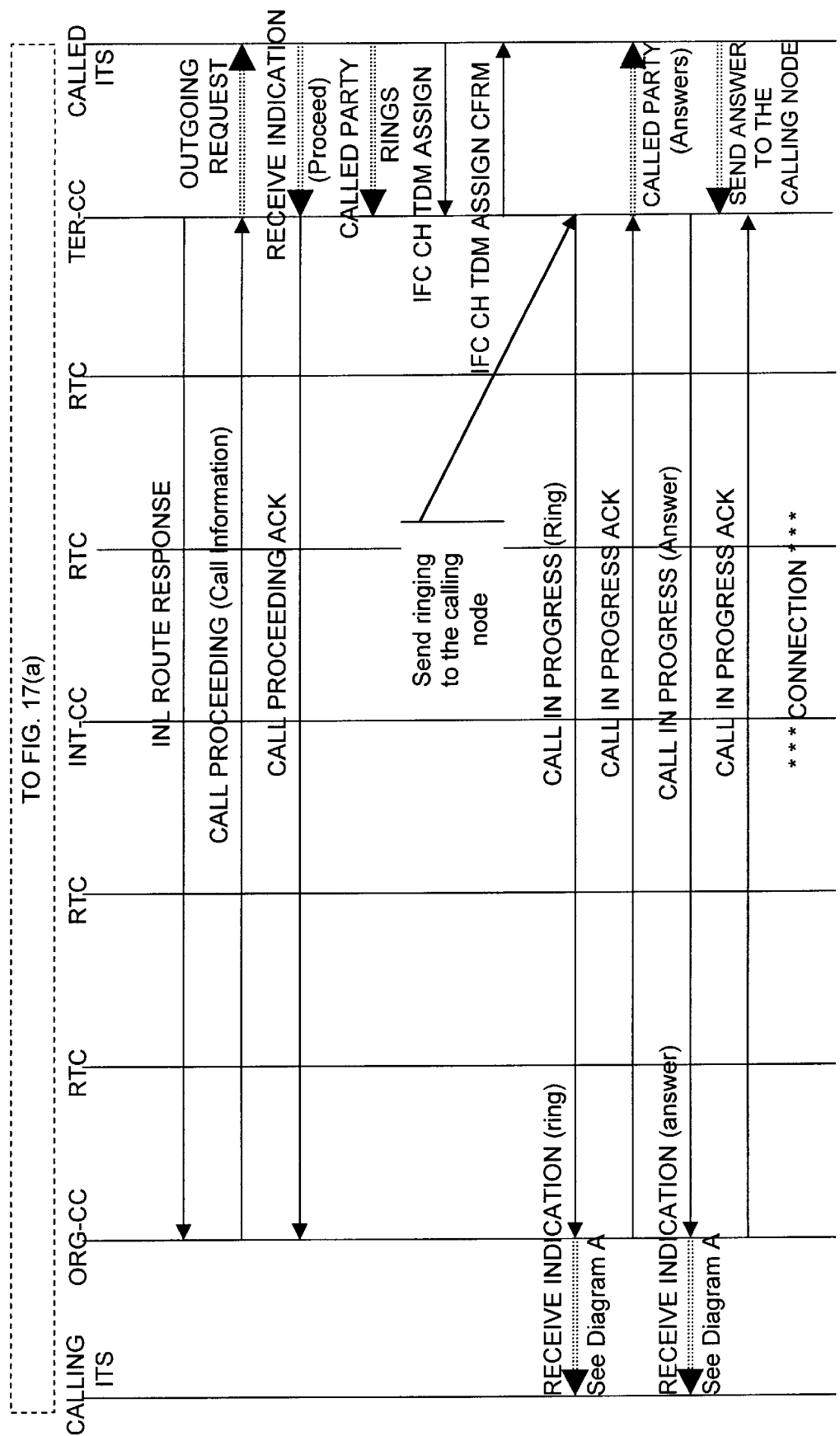

The messages depicted in FIGS. 15–17 are transmitted between network nodes over the 16th channel, i.e., the CCIS channel, of the 32 time-division multiplexed (TDM) trunk channels utilized in communication between network nodes. In the preferred embodiment the CCIS channel does not carry voice data, but is instead reserved for inter-node messaging of the type shown in FIGS. 15–20.

Figure 18:
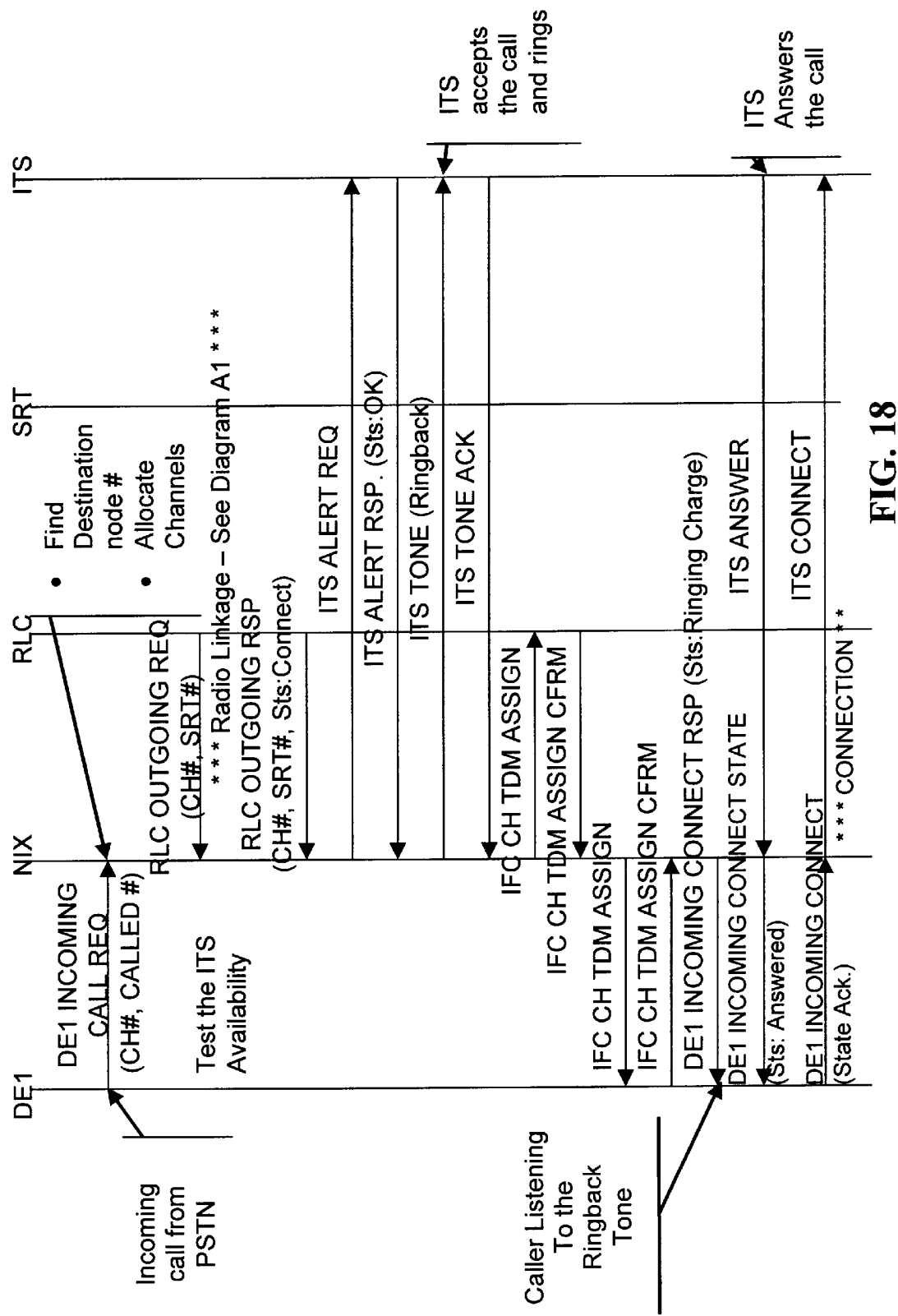
FIG. 18 provides a diagram of the messaging occurring during the setup of a call initiated within the PSTN and received by an ITS.
Figure 19:
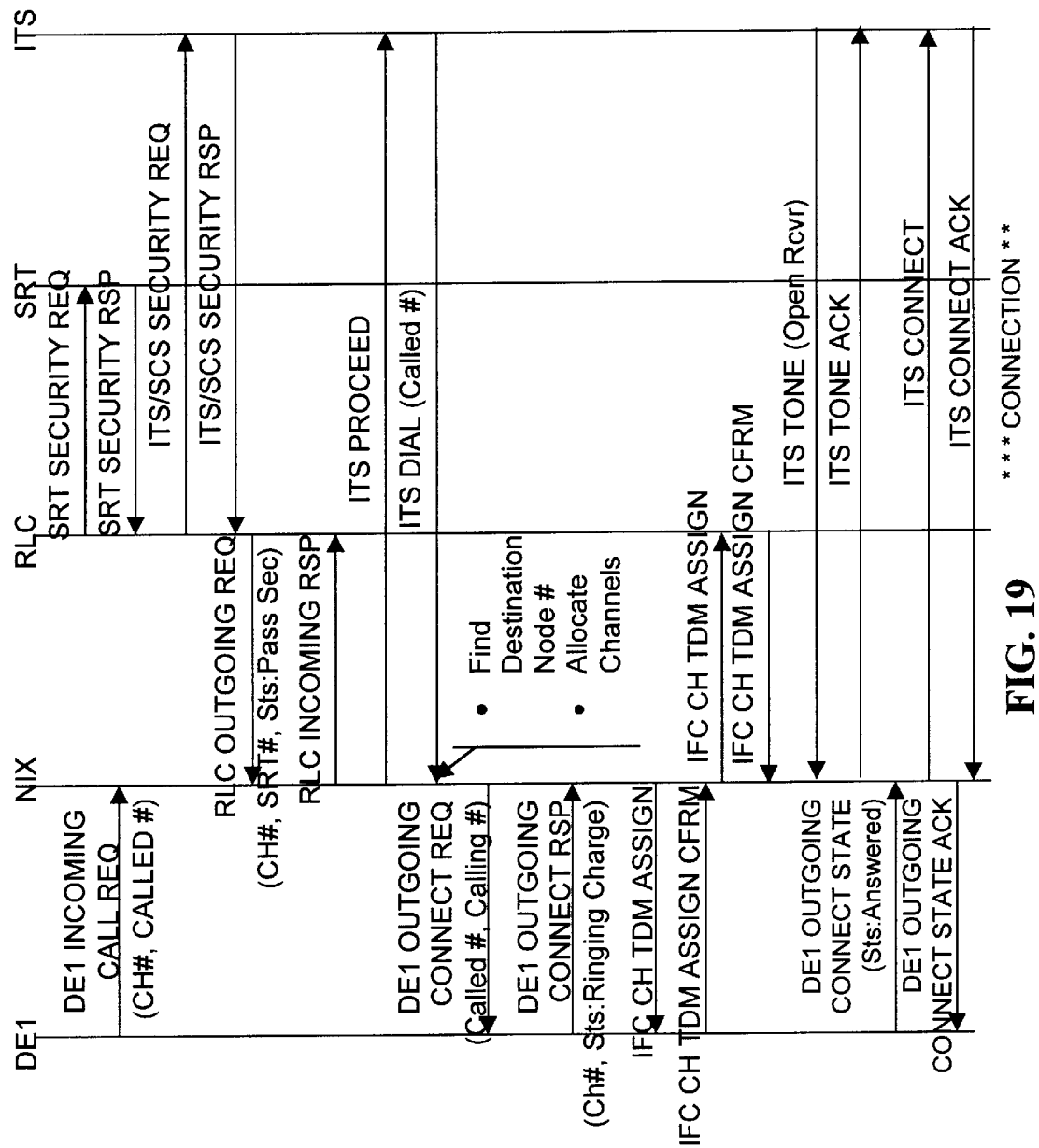
FIG. 19 illustrates the messaging occurring during the setup of a call from an ITS to the PSTN.
Figure 20:
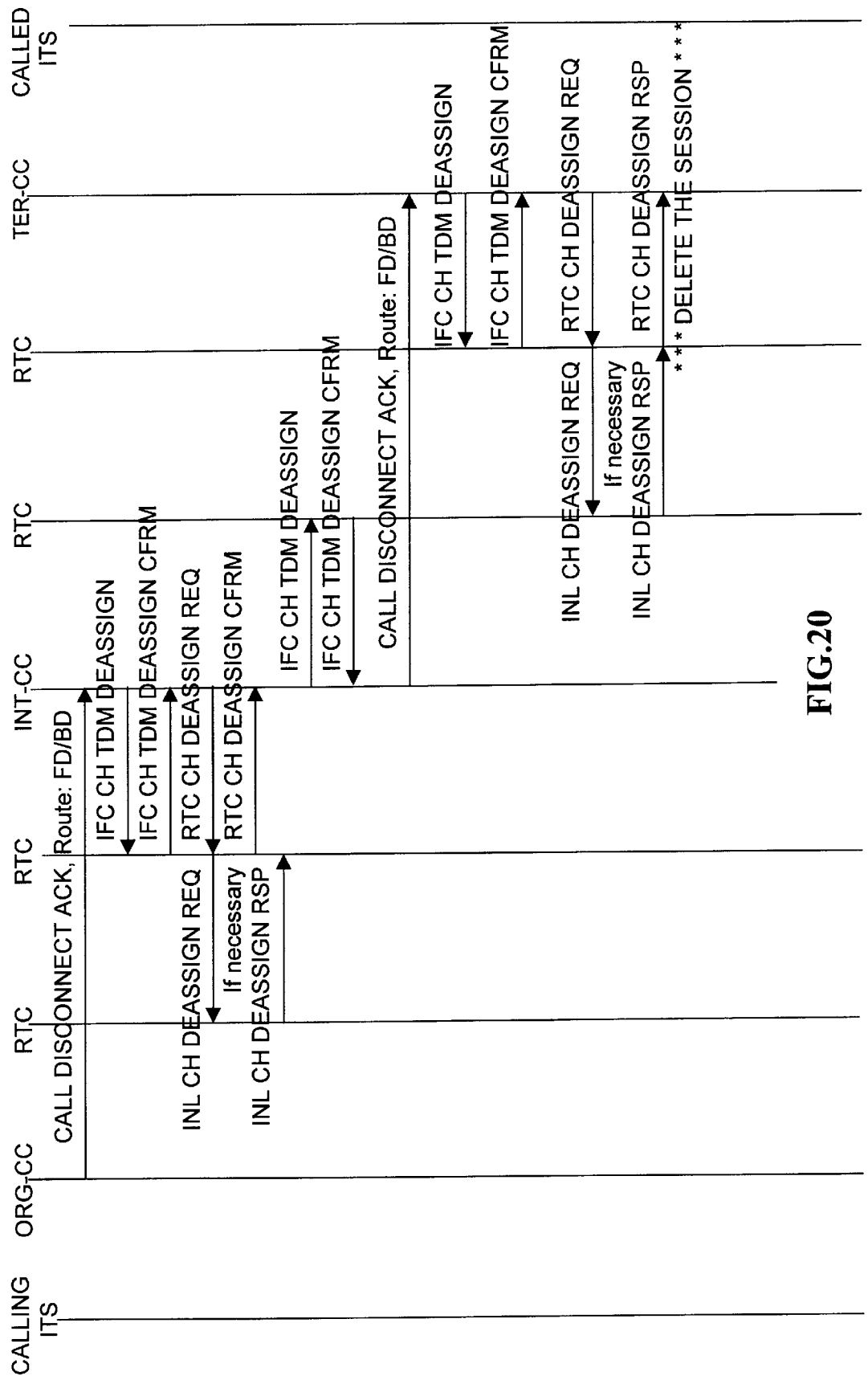
FIG. 20 illustrates the process of call disconnection within the system of the invention.

In FIG. 15A, the call state "A" messaging which occurs at an originating node during receipt of a call request from a calling ITS is shown in detail. FIG. 16 represents the call state "B" message exchange involved during connection of the called ITS to the terminating node; and FIG. 17 is representative of the call state "C" messaging involved during call transfer from the originating node to the terminating node via an intermediary node. In FIG. 18, a diagram is provided of the messaging occurring during the setup of a call initiated within the PSTN and received by an ITS. FIG. 19 illustrates the messaging occurring during the setup of a call in the reverse direction, namely, from an ITS to the PSTN. Finally, FIG. 20 illustrates the process of call disconnection within the system of the invention.

A glossary of acronyms and abbreviations employed in the call state diagrams of FIGS. 15–20 is set forth below.

| ACRONYM/ABBREVIATION | DEFINITION |
| --- | --- |
| ACK | Positively Acknowledged |
| ADPCM | Adaptive Pulse Code Modulation |
| CC | Common Control |
| Org-CC | Originating Common Control |
| Int-CC | Intermediate Common Control |
| Ter-CC | Terminating Common Control |
| Cfrm | Confirm |
| Ch# | Channel number |
| DE1 | Direct E1 Trunk Interface |
| Disc. | Disconnect |
| IFC | Interface Card |
| INL | Internode Link |
| ITS | Intelligent Telephone Set |
| NIX | Network Interface Exchange |
| NIX/CC | Common Control of NIX |
| NIX/RTC | Radio Trunk Card of NIX |
| PCM | Pulse Code Modulation |
| PSTN | Public Switched Telephone Network |
| Rcv. | Receiver |
| Req. | Request |
| Rsp. | Response |
| RLC | Radio Line Card |
| RTC | Radio Trunk Card |
| RTX | Rural Telephone Exchange |
| RTX/CC | Common Control of RTX |
| RTX/RTC | Service Control Station |

-continued

| ACRONYM/ABBREVIATION | DEFINITION |
|---|---|
| SRT | Subscriber Remote Terminal |
| Sts | Status |
| TDM | Time Division Multiplexing |

Call Setup—Origination Node

FIG. 15A illustratively represents the message exchange which occurs between an ITS and an originating node (i.e., the originating RTX) upon initiation of a call by the ITS. Upon the ITS handset being taken off-hook, the ITS indicates via the signaling channel that it desires to originate a call. If an ITS Security Check is successfully completed (see FIG. 15B), the RTX/RLC informs the Common Control of the originating RTX (RTX/CC) of the serial number of the SRT associated with the originating ITS and the intended recipient's phone number (RLC Incoming Req.). In response, the RTX/CC acknowledges receipt of the RLC Incoming Req. message by providing an RLC Incoming Rsp. message to the RTX/RLC. After the user has dialed the telephone number associated with the intended recipient user, the called number, RTX/RLC requests the ITS to transmit the accumulated dialed digits (ITS Proceed). Next, RTX/CC examines the called number and consults its adjacency list to identify the appropriate destination node and, if necessary, one or more intermediary nodes. The RTX/CC then allocates TDM slot assignments to be used during transmission between nodes, and instructs the RTX/RLC to initiate transmission of this information to the identified destination node and any required intermediary nodes (IFC Ch TDM Assign). In the exemplary embodiment the originating RTX consults an adjacency list to determine the appropriate intermediate node in view of the call destination.

RTX/CC then requests RTX/RTC to obtain a channel for an outgoing call (RTC Outgoing Request, FIG. 17). Call charging starts upon the ITS acknowledging that it has activated two-way voice communication (ITS Connect Ack.).

Within each node comprising an RTX or NIX unit, there will exist both "Supervisor" (i.e., Master) RTCs, and "Subsidiary" (i.e., Slave) RTCs. The RTC's within adjacent nodes are, paired, at the time of network installation, into "Supervisor RTC" and "Subsidiary RTC" pairs. Channel allocation is controlled by the Supervisor RTC, and Channel Maps are only stored within Supervisor RTCs. If a Subsidiary RTC desires to initiate channel setup or tear down, the Subordinate requests that the change be made by the Supervisor RTC. The Supervisor RTC will then inform the Subsidiary RTC of the results of the attempt to change the Channel Map.

FIG. 15B illustratively represents the message exchange which occurs during the setup of a call between a pair of ITS units serviced by the same RTX node. That is, in the example of FIG. 15B the same RTX node serves as both the originating RTX and as the terminating RTX. It is a feature of the invention that a single RTX may be used to effect local call routing without recourse to a central switching facility.

As is indicated by FIG. 15B, upon the originating ITS handset being taken off-hook, the originating ITS indicates via the signaling channel that it desires to originate a call. This indication is detected by the RLC during polling of each of the ITS units associated therewith (POLL RESPONSE). An SRT Security Check Request is then issued by the RLC to the SRT associated with the originating ITS. The SRT responds by encrypting its serial number using a six byte random key provided in the RLC Outgoing Request message (SRT Security Response). If the encrypted serial number is correct the RLC sends a security check request to the ITS (ITS Security), which responds (ITS Security Response) by encrypting its serial number using the six byte random key provided in the request message. The messaging between the originating ITS and the common control (CC) at the originating RTX node then proceeds in a manner substantially similar to that described above with reference to FIG. 15A. The remaining messaging between the common control (CC) of the RTX node and the terminating ITS which is required to complete the establishment of the call connection between the originating and terminating ITS units is also set forth in FIG. 15B.

Call Setup—Termination Node

Referring to FIG. 16, there is shown an exemplary sequence of messages processed by the Common Control of the "termination" network node associated with the SRT/ITS to which a call is being directed. The termination node common control (Ter-CC), upon recognizing the called telephone number as corresponding to an SRT/ITS within the service area of its network node, assigns an RLC to communicate with the called SRT/ITS. An RLC Outgoing Req., which includes the SRT serial number (SRT #) associated with the called telephone number, is then issued by Ter-CC to the appropriate RLC. The RLC responds to the Ter-CC in the form of an RLC Outgoing Rsp., which:

(i) specifies the number of the assigned TDM channel (Ch #), (ii) confirms the serial number of SRT being called (SRT #), and (iii) indicates the status (e.g., Sts: Connection OK) of the SRT being called. If the RLC Outgoing Rsp. indicates an acceptable connection status (Sts: Connection OK), the Ter-CC signals the called ITS that a call is waiting by sending (via the SRT) an ITS Alert Req. The ITS Alert Req message initiates the ringing process at the ITS. Upon initiating the ringing process, the ITS sends a ITS Alert Rsp (Sts: OK) message to Terr-CC. This, in turn, causes the Terr-CC to provide a "ringing signal" to the originating node in the form of a CALL IN PROGRESS (Ring) message. When the call is answered by the ITS, the ITS sends an ITS Answer signal the Ter-CC. In response, the Terr-CC relays a CALL IN PROGRESS (Answer) message back through the network to the originating node. The call then proceeds until either the calling or called party terminates the call, at which time a call tear-down routine (FIG. XX) is carried out.

Intra-Network Call Setup

FIG. 17 depicts the message flow occurring between an originating (Org), an intermediate (Int) and a terminating (Ter) network node during the call setup process. The internode messaging (call state "C") depicted in FIG. 17 occurs after a call has been setup at the originating node, as described above with reference to FIG. 15.

After the call has been setup at the originating node (FIG. 15), the Common Control at originating node (Org-CC) identifies the destination RTX node with which the phone number. Upon identification of the destination RTX node, a depth first search is then performed at the originating node in order to determine an adjacent node to which the call is to be routed.

After an intermediate node has been identified, the Org-CC consults the version of the system Channel Allocation Table stored therein in order to identify an available channel to the identified intermediate node. The Org-CC the requests the RTC at the originating node to obtain an outgoing channel for transfer of the call to the intermediate node (RTC Outgoing Request). The originating node RTC requests this outgoing channel (INL Channel Request) from the RTC at the intermediate node, and if this channel is available the RTC at a confirmatory assignment message (INL Channel Response) is provided by the RTC at the intermediate node to the RTC at the originating node. The RTC at the originating node then informs Org-CC of the channel number, if any, which was allocated to the call (RTC Outgoing Response).

The Org-CC then instructs the RTC at the originating node to connect one or more specified TDM Bus slots to the allocated channel (IFC Channel to TDM Assign). Next, the results of the attempt by the RTC at the originating node to implement the IFC Channel to TDM Assign instruction are reported to the Org-CC. If the requested TDM Bus slot(s) have already been assigned, an error message is reported to the Org-CC. In the event an error message is received, another RTC Outgoing Channel Request is made to the originating node RTC. Once TDM bus slot(s) are successfully assigned, an IFC Channel to TDM Confirm message is provided to the Org-CC by the originating node RTC.

The Org-CC transmits the session Number (INL ROUTE REQUEST—Session #) to the intermediate node over the assigned TDM bus slot(s). The intermediate node Common Control (Int-CC) extracts the called number from INL ROUTE REQUEST, and determines the call's destination node therefrom. The Int-CC then instructs the RTC at the intermediate node (Int-RTC) to obtain a channel (RTC Outgoing Channel Request). This results in the Int-RTC informing the Int-CC of the channel number allocated to the call (RTC Outgoing Response). Next, the Int-CC instructs Int-RTC to assign one or more specified TDM Bus slots to the allocated channel (IFC Channel to TDM Assign). If the assigned time slot is available, the Int-RTC confirms the assignment (Channel to TDM Assign Confirm).

The Common Control at the terminating node (Ter-CC) then instructs the RTC at the terminating node (Ter-RTC) to connect one or more specified TDM Bus slots to the allocated channel (IFC Channel to TDM Assign). The results of the attempt to implement this instruction are reported to the Ter-CC (IPC Channel to TDM Confirm). A series of messages are then exchanged between the Ter-CC and the originating common control Org-CC. Included among theses messages is an inter-nodal link route response (NL ROUTE RESPONSE), which is sent by the Ter-CC to the Org-CC. The Org-CC then returns a CALL PROCEEDING message (Call Information) to the Ter-CC, to which the Ter-CC responds with a CALL PROCEEDING ACK (acknowledge) message.

When the intelligent telephone set (ITS) to which the call is directed begins to ring, a CALL IN PROGRESS (Ring) is transmitted from the Ter-CC to the Org-CC. This makes the calling party aware that the called ITS is ringing, and the Org-CC then acknowledges the ringing action with a CALL IN PROGRESS ACK message. When the called party answers the ringing ITS, a CALL IN PROGRESS (Answer) signal is sent from the Ter-CC to the Org-CC. The call connection is completed upon the Org-CC signaling the Ter-CC by way of a CALL IN PROGRESS ACK signal.

H. Common Control (CC) Software

Figure 21:
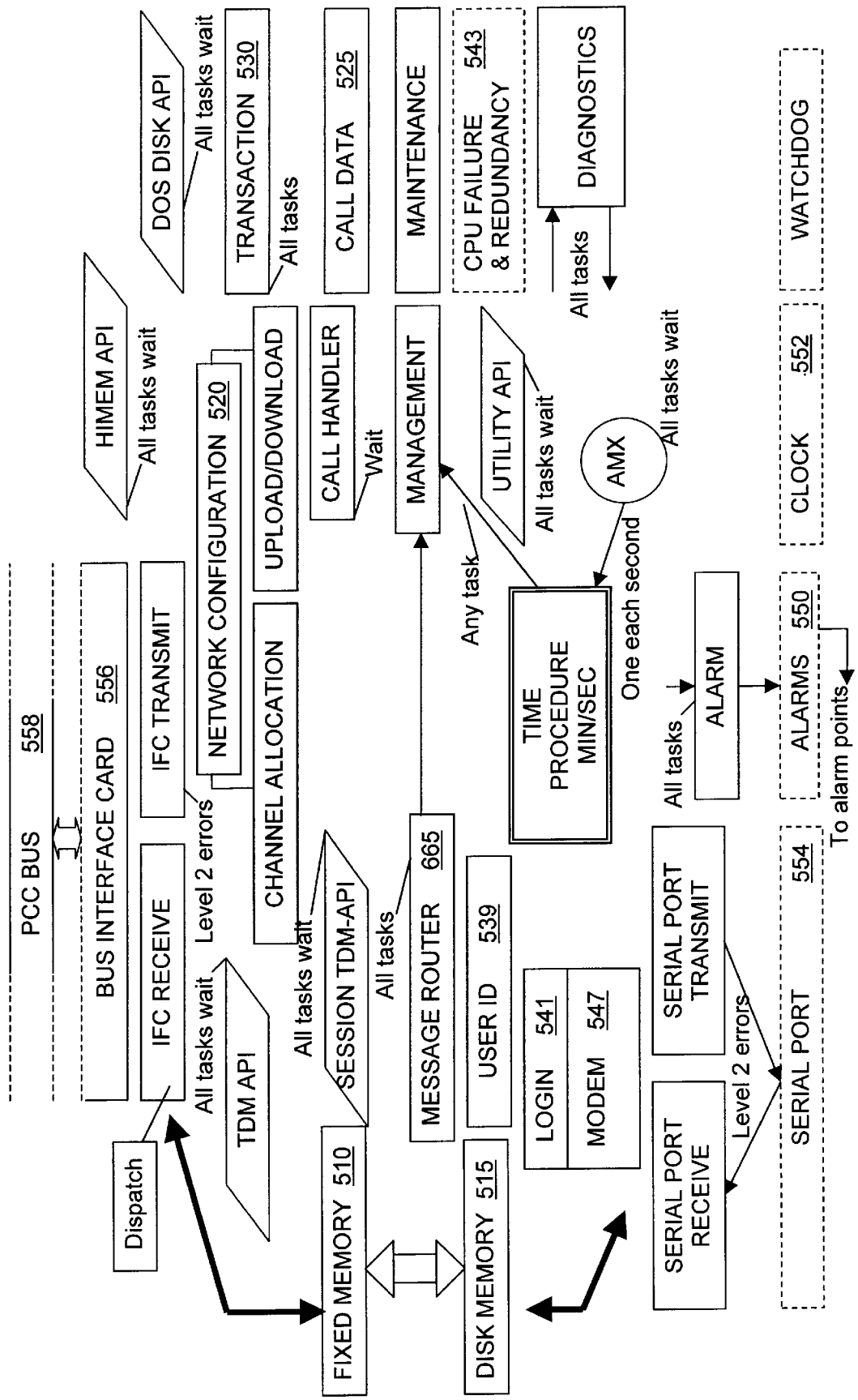
FIG. 21 is a block diagram of a Common Control (CC) software program resident within each NIX and RTX unit.

FIG. 21 is a block diagram of the common control (CC) software program, generally indicated by reference numeral 500, resident within each NIX and RTX unit. Also shown in FIG. 21 is certain processing hardware (dashed lines) typically included within each RTX and NIX unit. The CC program 500 will typically be stored in a 0 read-only memory (ROM) unit connected to the CPU and memory circuits of each RTX and NIX. Although the CC programs resident within NIX and RTX units are substantially similar, the several software functions unique to the CC programs governing operation of RTX units are described below.

Each NIX and RTX unit will typically include fixed hard disk memory 510. The fixed disk 510 is utilized to store the CC software 500, network configuration data 520, call record data 525, call transaction data 530, as well as alarm 537, user-identification data 539 and log-in data 541.

Referring to FIG. 21, each RTX and NIX unit includes an optionally redundant central processing unit (CPU) 543. The ROM storing the CC software will typically be utilized in conjunction with a host Intel 80486 motherboard configured with ISA industry Standard Architecture) bus connection slots (not shown). Connected to the ISA bus is an IDE disk controller (not shown) and a 9.6 kbps modem 547. In the preferred embodiment the host motherboard is customized to include a relay connection to an external alarm 550, a date/time clock 552, serial port 554 and a bus interface card 556 in communication with a Parallel Common Control (PCC) bus 558.

By way of introduction, various permanent files relating to Common Control operating software 500 are stored on fixed disk 510. Permanent files are also used to store information relating to, for example, network configuration 520, alarm-handling configurations 537, as well as information relating to PSTN interconnection and modem dial-back numbers (not shown). Updating of permanent files is accomplished via connection through serial port 554 to an NCS unit (for updating NIX unit permanent files) or to an SCS unit (for updating RTX permanent files). File modification may also be effected through the modem 547, or by way of data transfer from disk memory 515 to fixed memory 510.

Temporary files stored on fixed memory 510 include those relating to call record data 525, transaction data 530, and statistical data 535. In the preferred embodiment each NIX unit receives call record data from an associated group of RTX units approximately once every 24 hours. Call record data may be transferred from RTX to NIX units across TDM channels nominally allocated to phone conversations. Upon confirmation by an NIX of successful reception of call record data from an RTX, the RTX clears the transferred call record data from its local storage.

System Alarms

Various event-triggered alarms may lead to operation in the lowest three levels being suspended and emergency level operation being invoked. In a preferred implementation examples of event-triggers include, for example, RF Power Output low and Receive Signal Strength Below Threshold. Alarm signals are transported via the CCIS messaging channel (i.e., Common Control Interface Signaling Channel), which nominally corresponds to Channel #16 of the 32 inter-node TDM channels. Alarm messages are sent via the CCIS from a network element being monitored to the Network Control Station 32 for display. The transmission is via a digital message identifying the NIX or RTX unit in which the alarm was triggered, and specifies an alarm status condition.

Transaction Data

In the preferred embodiment transaction data 530 relating to the processing tasks is executed at each RTX or NIX unit is recorded in chronological order. For example, transaction data concerning specific processing events, error conditions, system diagnostic information and the like may be accumulated for transfer from an NIX unit to its associated network control station (NCS), or for transfer from an RTX unit to its associated service control station (SCS). Each transaction record includes a 32-bit transaction number, the date and time of the event being logged, the number of the NIX or RTX unit, the transaction type, and the bit length of the accumulated transaction data.

Message Router

Referring to FIG. 21, a message router routine 665 is utilized to deliver internode messages based on the routing information on the message packet. A message from node 1 destined to node N, may travel to several intermediary nodes. At each node the message router is responsible to forward the message toward the destination.

Depending on the routing information in the packet, the message router may forward the packet to the next node as the path specified on the routing information.

If the path is not included in the routing information field, the message router may discover the path by consulting the local routing tables of each node.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A radio communication system for processing information signals received from telephone trunk lines for transmission over a plurality of RF subscriber channels, comprising:

network interface exchange means for sampling the received information signals and for sequentially combining the resultant plurality of sampled information signals into a one or more multiplexed transmit channel bit streams, said network interface exchange means further including:

processor means for dynamically assigning a first of said sampled information signals from one of said trunk lines to an available repetitive slot position of a first of said transmit channel bit streams provided to a first destination node associated with said first of said sampled information signals, said first destination node being determined in accordance with subscriber unit identification information received over said one trunk line;

means for transmitting a forward interface signal to said first destination node over a network interface channel in response to the first multiplexed channel bit stream;

and remote telephone exchange means in RF communication with said network interface exchange means over said network interface channel, said remote telephone exchange means corresponding to first said destination node and being located distal from said network interface exchange means, for extracting the first sampled information signal from said forward interface signal and for generating a first subscriber signal on the basis of said extracted first sampled information signal, said remote telephone exchange means including means for transmitting said first subscriber signal over a first RF subscriber channel to a first intelligent subscriber unit, said remote telephone exchange means further including means for routing reverse link signals from said first intelligent subscriber unit to a second destination node;

wherein a call request signal has accompanied therewith a subscriber identification signal associated with said first intelligent subscriber unit, said processor means further including means for assigning said first sampled information signal to the repetitive slot position corresponding to said first RF subscriber channel at least partially on the basis of said subscriber identification signal;

wherein said remote telephone exchange means includes a master telephone exchange for generating a first inter-exchange signal on the basis of said first extracted information signal and said subscriber identification signal, said master telephone exchange including master transceiver means for transmitting said inter-exchange signal over an inter-exchange channel; and wherein said remote telephone exchange means further includes a slave telephone exchange for providing said first subscriber signal in response to receipt of said inter-exchange signal over said inter-exchange channel.

2. A radio communication system for processing information signals received from telephone trunk lines for transmission over a plurality of RF subscriber channels, comprising:

network interface exchange means for sampling the received information signals and for sequentially combining the resultant plurality of sampled information signals into a one or more multiplexed transmit channel bit streams, said network interface exchange means further including:

processor means for dynamically assigning a first of said sampled information signals from one of said trunk lines to an available repetitive slot position of a first of said transmit channel bit streams provided to a first destination node associated with said first of said sampled information signals, said first destination node being determined in accordance with subscriber unit identification information received over said one trunk line;

means for transmitting a forward interface signal to said first destination node over a network interface channel in response to the first multiplexed channel bit stream;

and remote telephone exchange means in RF communication with said network interface exchange means over said network interface channel, said remote telephone exchange means corresponding to first said destination node and being located distal from said network interface exchange means, for extracting the first sampled information signal from said forward interface signal and for generating a first subscriber signal on the basis of said extracted first sampled information signal, said remote telephone exchange means including means for transmitting said first subscriber signal over a first RF subscriber channel to a first intelligent subscriber unit, said remote telephone exchange means further including means for routing reverse link signals from said first intelligent subscriber unit to a second destination node;

wherein a call request signal has accompanied therewith a subscriber identification signal associated with said first intelligent subscriber unit, said processor means further including means for assigning said first sampled information signal to the repetitive slot position corresponding to said first RF subscriber channel at least partially on the basis of said subscriber identification signal;

wherein said remote telephone exchange means includes a master telephone exchange for generating a first inter-exchange signal on the basis of said first extracted information signal and said subscriber identification signal, said master telephone exchange including master transceiver means for transmitting said inter-exchange signal over an inter-exchange channel wherein said remote telephone exchange means includes a plurality of slave exchanges, said master telephone exchange including a subscriber identification map for associating each of said slave exchanges with one or more of said RF subscriber channels;

wherein a first of said slave telephone exchanges is selected in accordance with said subscriber identification map to serve as a relay between said master exchange and a second slave exchange associated with said first RF subscriber channel;

wherein said first slave telephone exchange includes means for forwarding said first inter-exchange signal to said second slave exchange, said first slave telephone exchange further including means for transmitting said first inter-exchange signal over a second inter-exchange channel to said second slave telephone exchange; and wherein said second slave exchange includes means for providing said first subscriber signal on the basis of said second inter-exchange signal received thereby.

3. A radio communication system for processing information signals received from telephone trunk lines for transmission over a plurality of RF subscriber channels, comprising:

network interface exchange means for sampling the received information signals and for sequentially combining the resultant plurality of sampled information signals into a one or more multiplexed transmit channel bit streams, said network interface exchange means further including:

processor means for dynamically assigning a first of said sampled information signals from one of said trunk lines to an available repetitive slot position of a first of said transmit channel bit streams provided to a first destination node associated with said first of said sampled information signals, said first destination node being determined in accordance with subscriber unit identification information received over said one trunk line;

means for transmitting a forward interface signal to said first destination node over a network interface channel in response to the first multiplexed channel bit stream;

and remote telephone exchange means in RF communication with said network interface exchange means over said network interface channel, said remote telephone exchange means corresponding to first said destination node and being located distal from said network interface exchange means, for extracting the first sampled information signal from said forward interface signal and for generating a first subscriber signal on the basis of said extracted first sampled information signal, said remote telephone exchange means including means for transmitting said first subscriber signal over a first RF subscriber channel to a first intelligent subscriber unit, said remote telephone exchange means further including means for routing reverse link signals from said first intelligent subscriber unit to a second destination node;

wherein a call request signal has accompanied therewith a subscriber identification signal associated with said first intelligent subscriber unit, said processor means further including means for assigning said first sampled information signal to the repetitive slot position corresponding to said first RF subscriber channel at least partially on the basis of said subscriber identification signal; and wherein said first intelligent subscriber unit includes means for receiving and processing said first subscriber signal to replicate the first information signal received from said one trunk line.

4. A radio communication system for processing information signals received from telephone trunk lines for transmission over a plurality of RF subscriber channels, comprising:

network interface exchange means for sampling the received information signals and for sequentially combining the resultant plurality of sampled information signals into a one or more multiplexed transmit channel bit streams, said network interface exchange means further including:

processor means for dynamically assigning a first of said sampled information signals from one of said trunk lines to an available repetitive slot position of a first of said transmit channel bit streams provided to a first destination node associated with said first of said sampled information signals, said first destination node being determined in accordance with subscriber unit identification information received over said one trunk line;

means for transmitting a forward interface signal to said first destination node over a network interface channel in response to the first multiplexed channel bit stream;

and remote telephone exchange means in RF communication with said network interface exchange means over said network interface channel, said remote telephone exchange means corresponding to first said destination node and being located distal from said network interface exchange means, for extracting the first sampled information signal from said forward interface signal and for generating a first subscriber signal on the basis of said extracted first sampled information signal, said remote telephone exchange means including means for transmitting said first subscriber signal over a first RF subscriber channel to a first intelligent subscriber unit, said remote telephone exchange means further including means for routing reverse link signals from said first intelligent subscriber unit to a second destination node;

wherein said processor means includes means for assigning ones of said sampled information signals other than said first sampled information signal to repetitive slot positions corresponding to RF subscriber channels associated with call request signals received over said trunk lines, said network interface exchange means including slot memory means for maintaining a memory of which ones of said repetitive slot positions have been so assigned and means for examining said slot memory means in order to provide additional slot assignments in response to additional call request signals.

5. A radio communication system for processing information signals received from telephone trunk lines for transmission over a plurality of RF subscriber channels, comprising:

network interface exchange means for sampling the received information signals and for sequentially combining the resultant plurality of sampled information signals into a one or more multiplexed transmit channel bit streams, said network interface exchange means further including:

processor means for dynamically assigning a first of said sampled information signals from one of said trunk lines to an available repetitive slot position of a first of said transmit channel bit streams provided to a first destination node associated with said first of said sampled information signals, said first destination node being determined in accordance with subscriber unit identification information received over said one trunk line;

means for transmitting a forward interface signal to said first destination node over a network interface channel in response to the first multiplexed channel bit stream;

remote telephone exchange means in RF communication with said network interface exchange means over said network interface channel, said remote telephone exchange means corresponding to first said destination node and being located distal from said network interface exchange means, for extracting the first sampled information signal from said forward interface signal and for generating a first subscriber signal on the basis of said extracted first sampled information signal, said remote telephone exchange means including means for transmitting said first subscriber signal over a first RF subscriber channel to a first intelligent subscriber unit, said remote telephone exchange means further including means for routing reverse link signals from said first intelligent subscriber unit to a second destination node; and a plurality of intelligent subscriber units, each of said subscriber units including means for generating a reverse subscriber signal and means for converting the reverse subscriber signal generated thereby into a sampled reverse subscriber signal;

wherein each of said intelligent subscriber units includes means for transmitting its sampled reverse subscriber signal over one of said RF subscriber channels associated with the subscriber unit;

wherein said remote exchange means includes means for providing a receive channel bit stream by assigning each of said sampled reverse subscriber signals received over said associated RF subscriber channels to a repetitive slot position in said receive channel bit stream; and wherein said remote exchange means includes means for transmitting said receive channel bit stream to said network interface exchange over a reverse interface channel, said network interface exchange including means for segregating the separate sampled reverse subscriber signal from the receive channel bit stream and means for recovering the reverse subscriber signals from the sampled reverse subscriber signals for transmission over said telephone trunk lines.

6. A method for processing information signals received from at least one telephone trunk line for transmission over a plurality of RF subscriber channels, comprising the steps of:

sampling the received information signals and for sequentially combining the resultant plurality of sampled information signals into one or more multiplexed transmit channel bit streams, and assigning a first of said sampled information signals from said at least one trunk line to an available repetitive slot position of a first of said transmit channel bits streams provided to a destination node associated with said first of said sampled information signals, said destination node being determined in accordance with subscriber unit identification information received over said one trunk line;

transmitting a forward interface signal to said destination node over an RF network interface channel in response to the multiplexed channel bit stream, said destination node being located distal said at least one telephone trunk line; and extracting, at said destination node, the first sampled information signal from said forward interface signal and for generating a first subscriber signal on the basis of said extracted first sampled information signal, and transmitting said first subscriber signal over said first RF subscriber channel to a first intelligent subscriber unit;

wherein each of a plurality of call request signals has accompanied therewith a subscriber identification signal associated with said first intelligent subscriber unit;

the method further including the steps of;

assigning said first sampled information signal to the repetitive slot position corresponding to said first RF subscriber channel at least partially on the basis of said subscriber identification signal;

generating, within a master telephone exchange, a first inter-exchange signal on the basis of said first extracted information signal and said subscriber identification signal;

transmitting said inter-exchange signal over an inter-exchange channel; and within a slave telephone exchange, providing said first subscriber signal in response to receipt of said inter-exchange signal over said inter-exchange channel.

7. A method for processing information signals received from at least one telephone trunk line for transmission over a plurality of RF subscriber channels, comprising the steps of:

sampling the received information signals and for sequentially combining the resultant plurality of sampled information signals into one or more multiplexed transmit channel bit streams, and assigning a first of said sampled information signals from said at least one trunk line to an available repetitive slot position of a first of said transmit channel bits streams provided to a destination node associated with said first of said sampled information signals, said destination node being determined in accordance with subscriber unit identification information received over said one trunk line;

transmitting a forward interface signal to said destination node over an RF network interface channel in response to the multiplexed channel bit stream, said destination node being located distal said at least one telephone trunk line; and extracting, at said destination node, the first sampled information signal from said forward interface signal and for generating a first subscriber signal on the basis of said extracted first sampled information signal, and transmitting said first subscriber signal over said first RF subscriber channel to a first intelligent subscriber unit;

wherein each call request signal has accompanied therewith a subscriber identification signal associated with said first intelligent subscriber unit;

the method further including the steps of;

assigning said first sampled information signal to the repetitive slot position corresponding to said first RF subscriber channel at least partially on the basis of said subscriber identification signal;

generating, within a master telephone exchange, a first inter-exchange signal on the basis of said first extracted information signal and said subscriber identification signal;

transmitting said inter-exchange signal over an inter-exchange channel; and utilizing a subscriber identification map, to associate each of a plurality of slave telephone exchanges with one or more of said RF subscriber channels;

selecting, in accordance with said subscriber identification map, a first of said slave telephone exchanges to serve as a relay between said master exchange and a second slave exchange associated with said first RF subscriber channel;

within said first slave telephone exchange, generating a second inter-exchange signal on the basis of said first inter-exchange signal, and transmitting said second inter-exchange signal over a second inter-exchange channel to said second slave telephone exchange; and providing, within said second slave exchange, said first subscriber signal on the basis of said second inter-exchange signal.

8. A method for processing information signals received from at least one telephone trunk line for transmission over a plurality of RF subscriber channels, comprising the steps of:

sampling the received information signals and for sequentially combining the resultant plurality of sampled information signals into one or more multiplexed transmit channel bit streams, and assigning a first of said sampled information signals from said at least one trunk line to an available repetitive slot position of a first of said transmit channel bits streams provided to a destination node associated with said first of said sampled information signals, said destination node being determined in accordance with subscriber unit identification information received over said one trunk line;

transmitting a forward interface signal to said destination node over an RF network interface channel in response to the multiplexed channel bit stream, said destination node being located distal said at least one telephone trunk line;

extracting, at said destination node, the first sampled information signal from said forward interface signal and for generating a first subscriber signal on the basis of said extracted first sampled information signal, and transmitting said first subscriber signal over said first RF subscriber channel to a first intelligent subscriber unit;

wherein each call request signal has accompanied therewith a subscriber identification signal associated with said first intelligent subscriber unit;

the method further including the steps of:

assigning said first sampled information signal to the repetitive slot position corresponding to said first RF subscriber channel at least partially on the basis of said subscriber identification signal; and within said first intelligent subscriber unit, receiving and processing said first subscriber signal to replicate the first information signal received from said one trunk line.

9. A method for processing information signals received from, at least one telephone trunk line for transmission over a plurality of RF subscriber channels, comprising the steps of:

sampling the received information signals and for sequentially combining the resultant plurality of sampled information signals into one or more multiplexed transmit channel bit streams, and assigning a first of said sampled information signals from said at least one trunk line to an available repetitive slot position of a first of said transmit channel bits streams provided to a destination node associated with said first of said sampled information signals, said destination node being determined in accordance with subscriber unit identification information received over said one trunk line;

transmitting a forward interface signal to said destination node over an RF network interface channel in response to the multiplexed channel bit stream, said destination node being located distal said at least one telephone trunk line;

extracting, at said destination node, the first sampled information signal from said forward interface signal and for generating a first subscriber signal on the basis of said extracted first sampled information signal, and transmitting said first subscriber signal over said first RF subscriber channel to a first intelligent subscriber unit assigning ones of said sampled information signals other than said first sampled information signal to repetitive slot positions corresponding to RF subscriber channels associated with call request signals received over said trunk lines;

maintaining a memory of which ones of said repetitive slot positions have been so assigned; and examining said memory in order to provide additional slot assignments in response to additional call request signals.

10. A method for processing information signals received from at least one telephone trunk line for transmission over a plurality of RF subscriber channels, comprising the steps of:

sampling the received information signals and for sequentially combining the resultant plurality of sampled information signals into one or more multiplexed transmit channel bit streams, and assigning a first of said sampled information signals from said at least one trunk line to an available repetitive slot position of a first of said transmit channel bits streams provided to a destination node associated with said first of said sampled information signals, said destination node being determined in accordance with subscriber unit identification information received over said one trunk line;

transmitting a forward interface signal to said destination node over an RF network interface channel in response to the multiplexed channel bit stream, said destination node being located distal said at least one telephone trunk line;

extracting, at said destination node, the first sampled information signal from said forward interface signal and for generating a first subscriber signal on the basis of said extracted first sampled information signal, and transmitting said first subscriber signal over said first RF subscriber channel to a first intelligent subscriber unit;

within each of a plurality of intelligent subscriber units, generating a reverse subscriber signal and converting the reverse subscriber signal into a sampled reverse subscriber signal;

transmitting each of said sampled reverse subscriber signals over one of said RF subscriber channels;

providing a receive channel bit stream by assigning each of said sampled reverse subscriber signals received over said associated RF subscriber channels to a repetitive slot position in said receive channel bit stream;

transmitting said receive channel bit stream to said network interface exchange over a reverse interface channel; and segregating the sampled reverse subscriber signals from the receive channel bit stream and recovering the reverse subscriber signals from the sampled reverse subscriber signals for transmission over said telephone trunk lines.

\* \* \* \* \*